United States Patent [19]
Lennen

[11] Patent Number: 5,621,416
[45] Date of Patent: Apr. 15, 1997

[54] OPTIMIZED PROCESSING OF SIGNALS FOR ENHANCED CROSS-CORRELATION IN A SATELLITE POSITIONING SYSTEM RECEIVER

[75] Inventor: Gary R. Lennen, San Jose, Calif.

[73] Assignee: Trimble Navigation Limited, Sunnyvale, Calif.

[21] Appl. No.: 491,415

[22] Filed: Jun. 16, 1995

Related U.S. Application Data

[63] Continuation-in-part of Ser. No. 382,889, Feb. 2, 1995.

[51] Int. Cl.$^6$ .................................................. G01S 5/02
[52] U.S. Cl. .............................. 342/357; 342/352
[58] Field of Search ............................ 342/357, 352, 342/81; 455/12.1

[56] References Cited

U.S. PATENT DOCUMENTS

| | | | |
|---|---|---|---|
| 4,485,383 | 11/1984 | Maher | 343/352 |
| 4,928,106 | 5/1990 | Ashjaee et al. | 342/352 |
| 5,390,207 | 2/1995 | Fenton et al. | 375/1 |

Primary Examiner—Thomas H. Tarcza
Assistant Examiner—Dao L. Phan
Attorney, Agent, or Firm—Boris G. Tankhilevich

[57] ABSTRACT

The optimum SPS receiver is described that allows to optimize the demodulation of the unknown W-code generated by the Global Positioning System (GPS). The assumed timing and the spectrum structure of W-code are used for selecting the optimum digital filter that optimizes the signal-to-noise (STN) ratio of the received satellite signals.

20 Claims, 22 Drawing Sheets

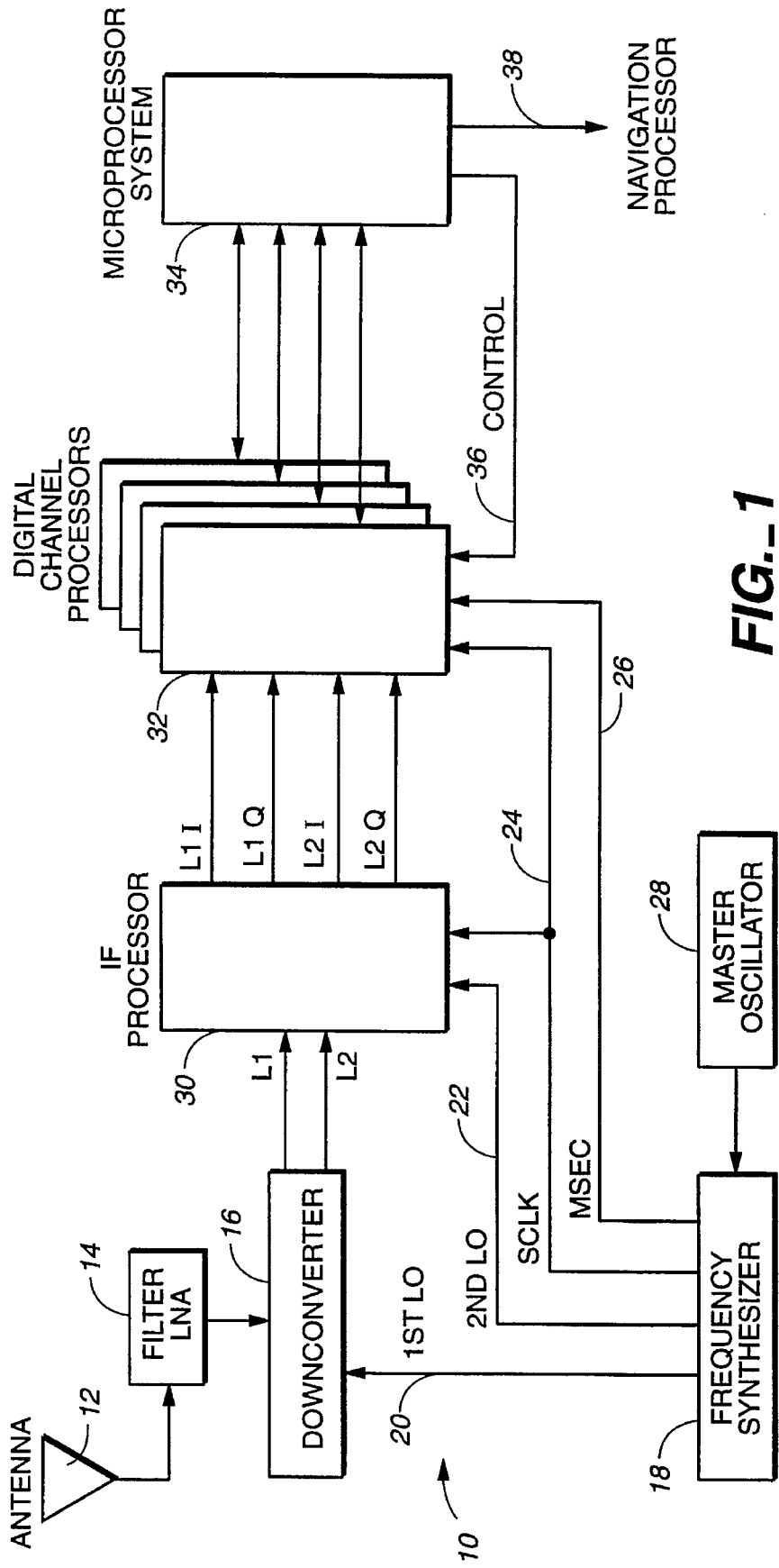
FIG._1

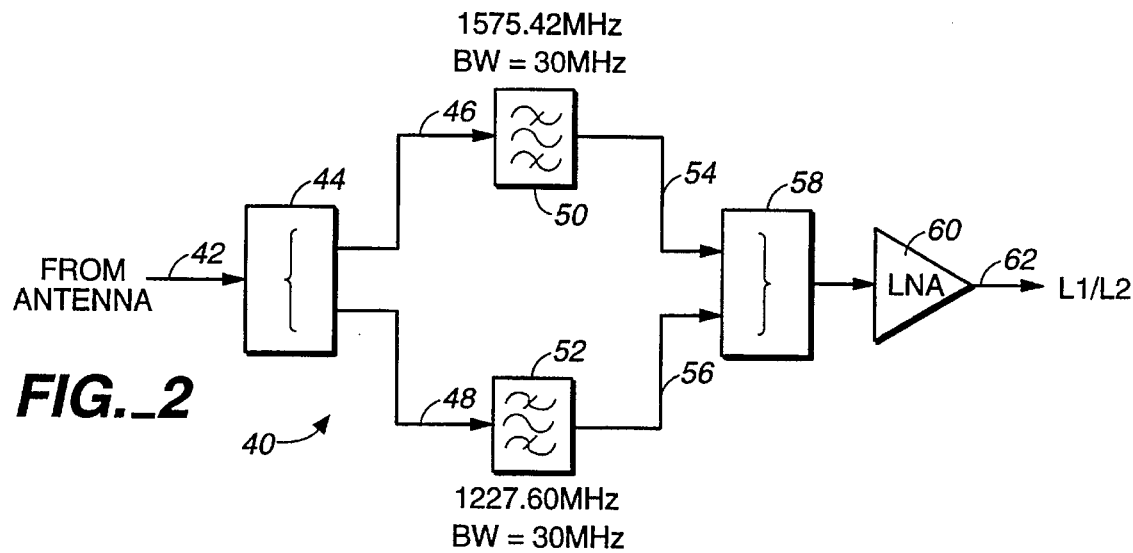
FIG._2
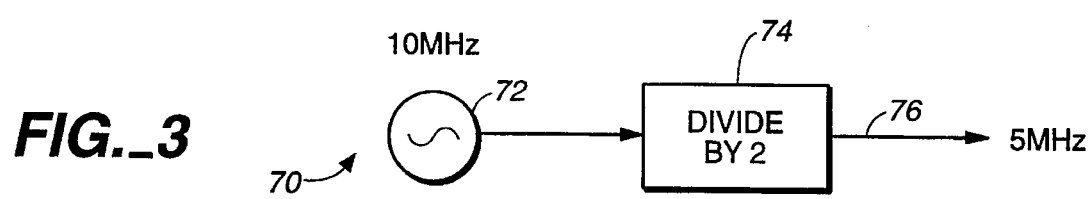
FIG._3
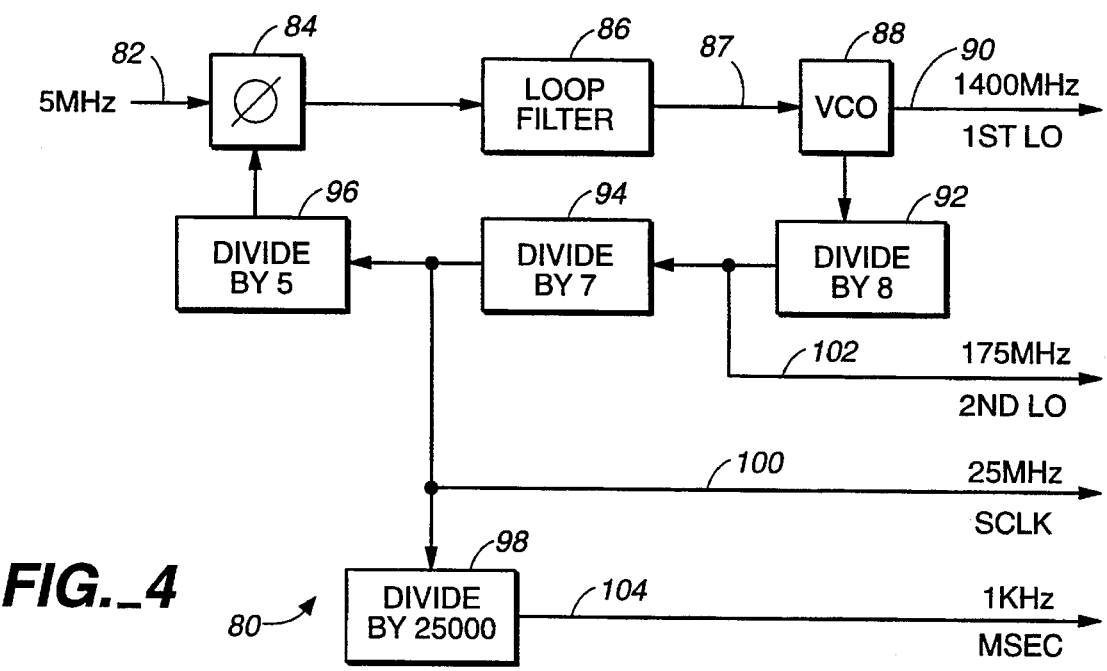
FIG._4

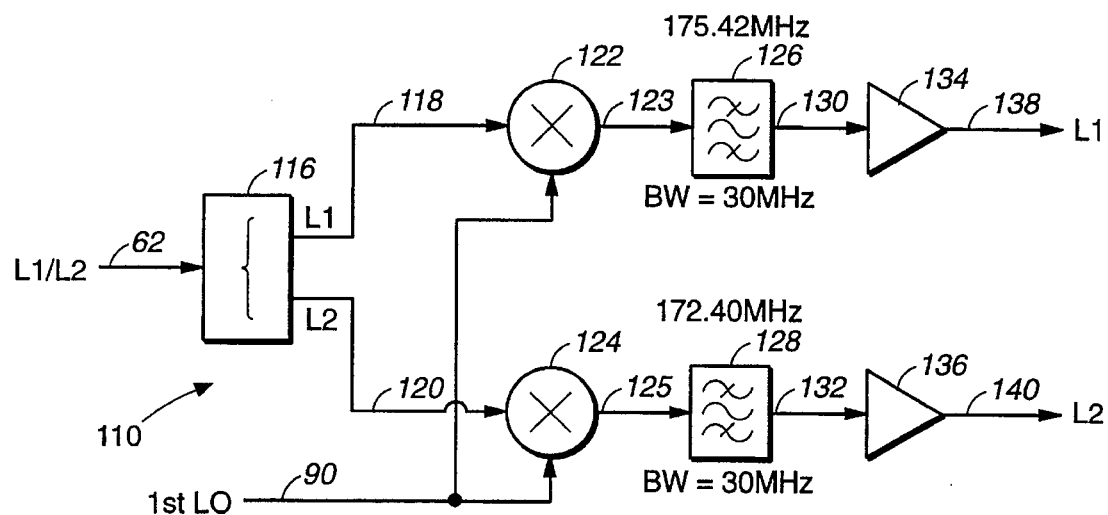
FIG._5
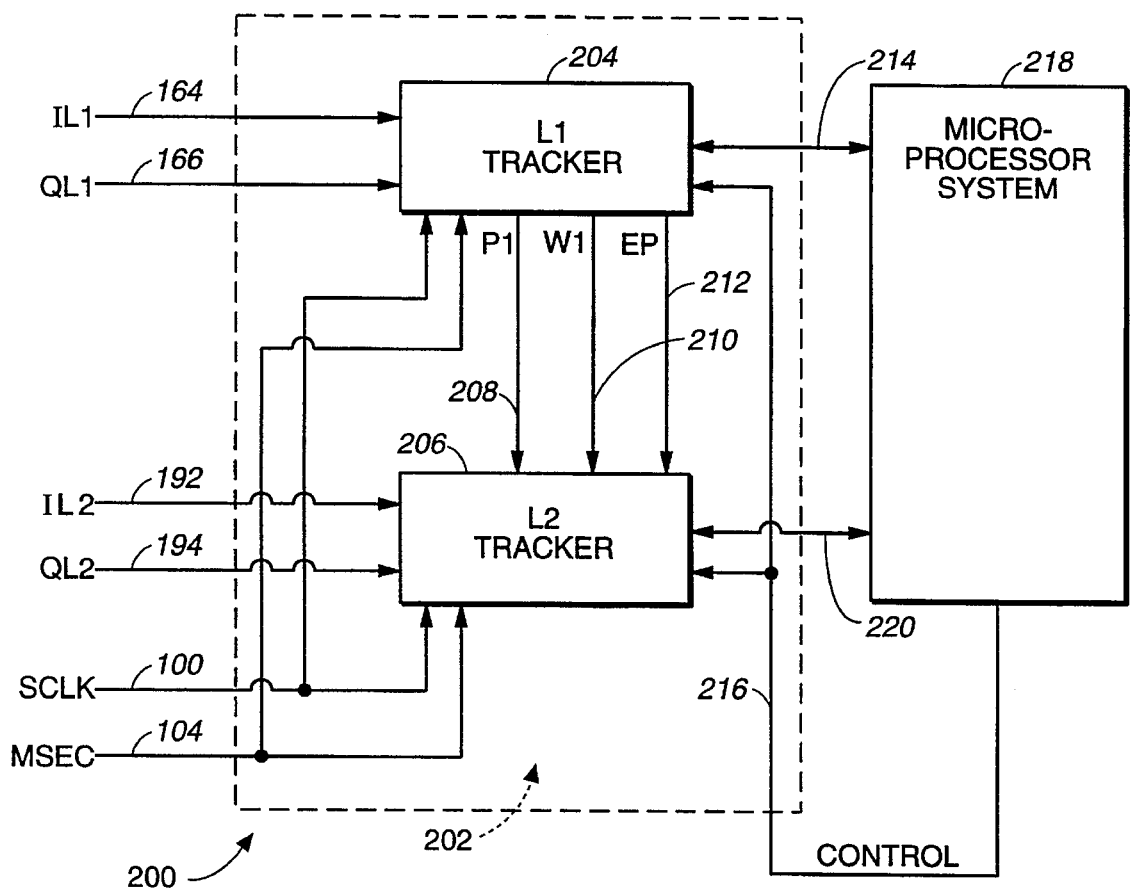
FIG._7

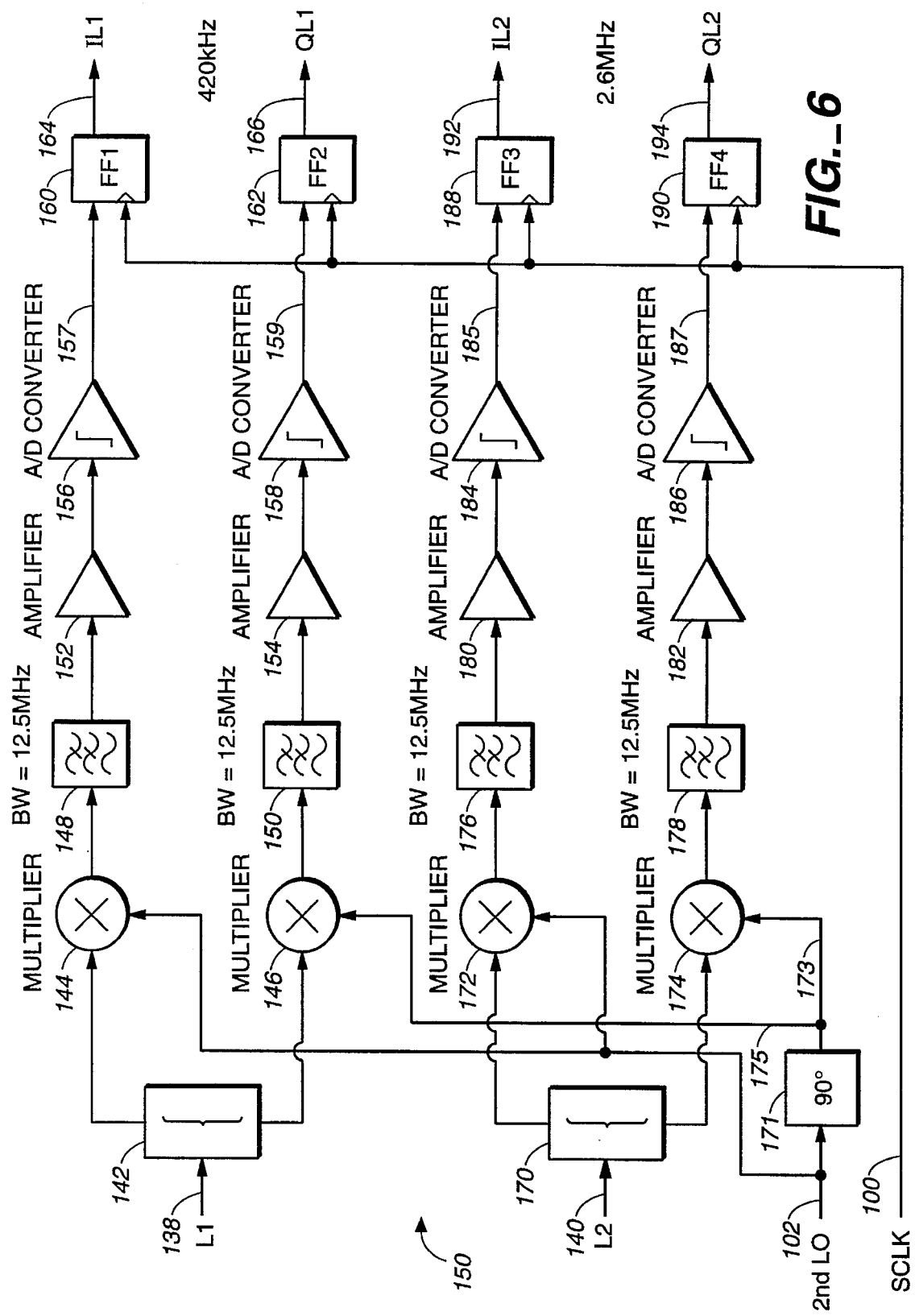
FIG._6

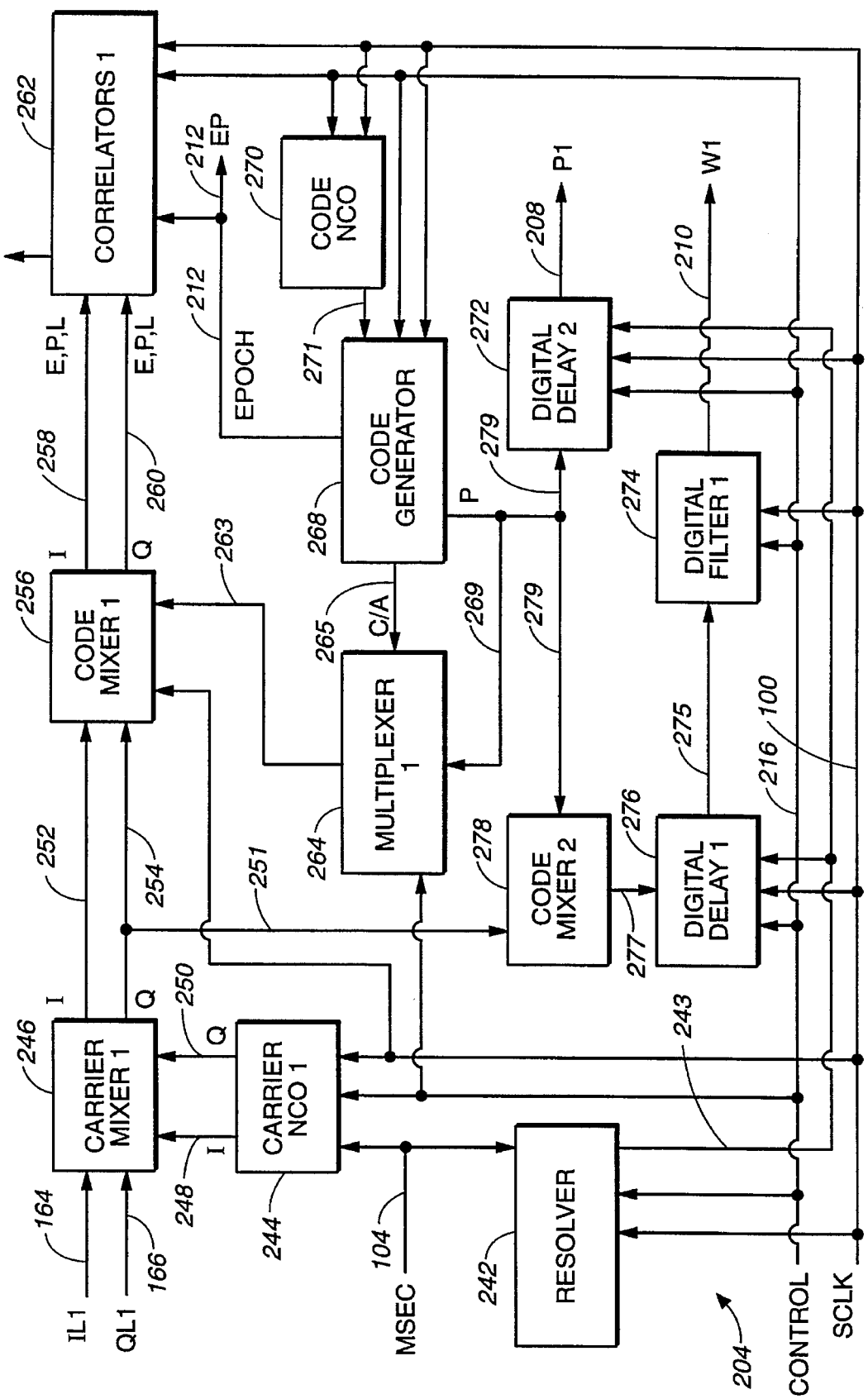
FIG._8

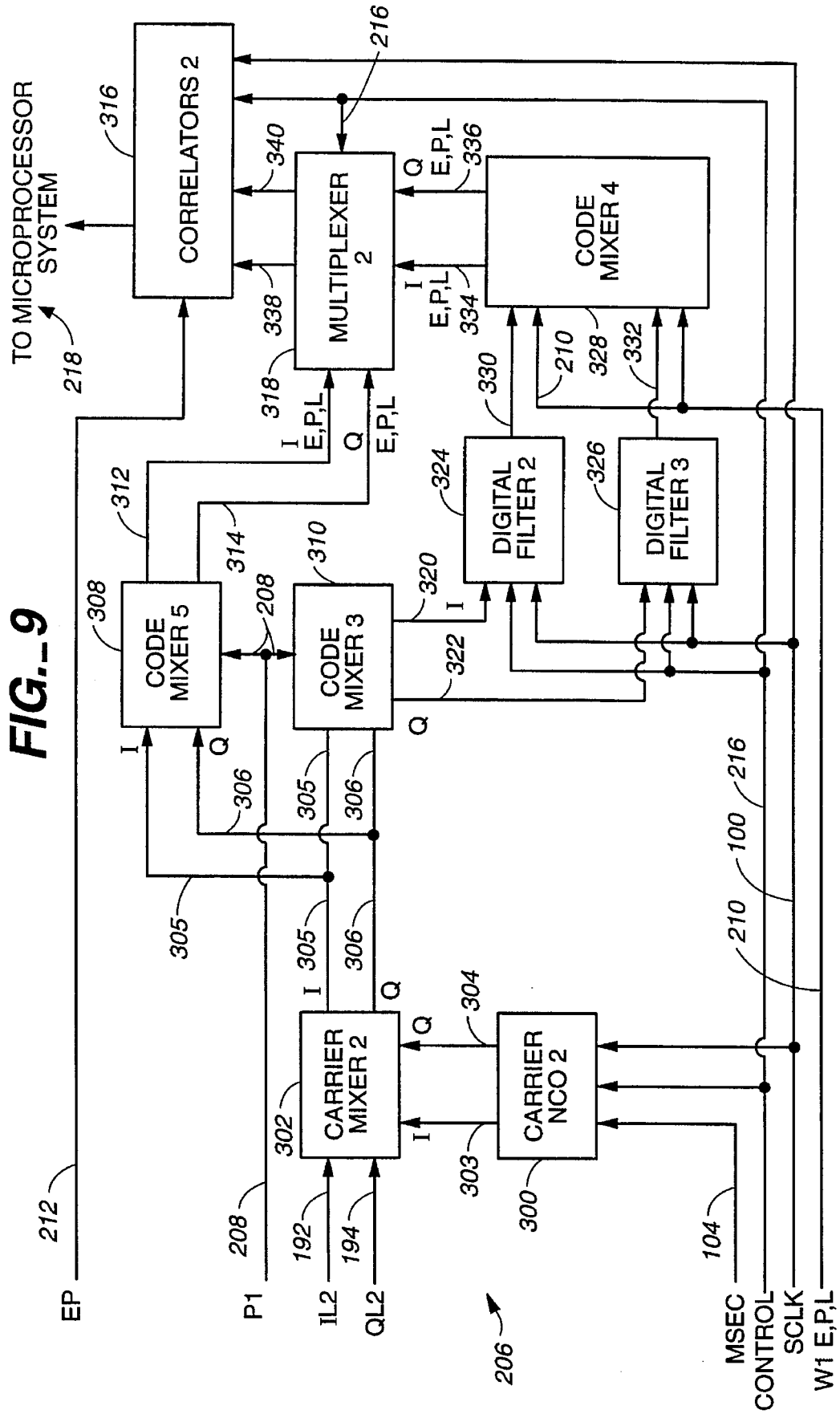
FIG._9

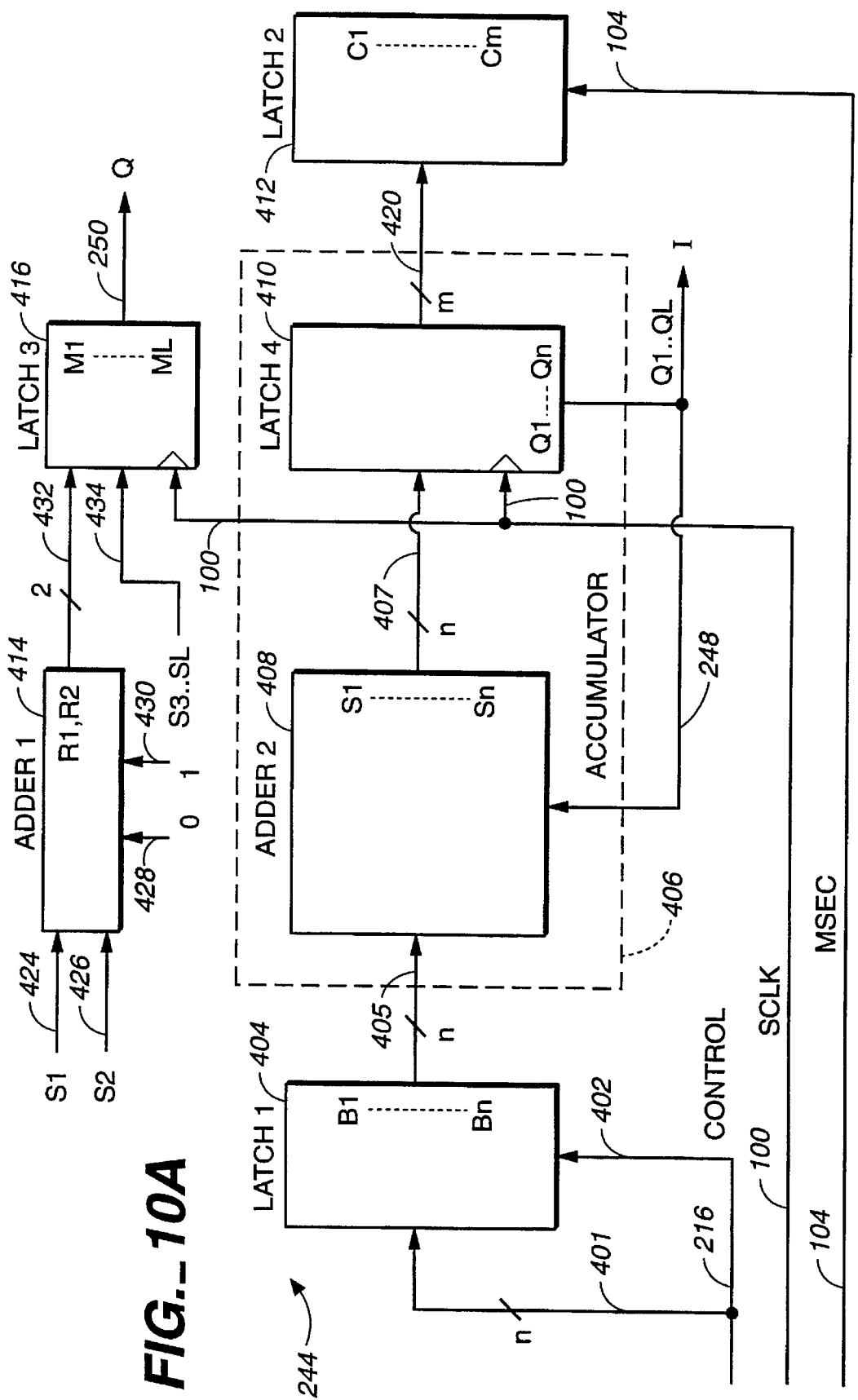
FIG._10A

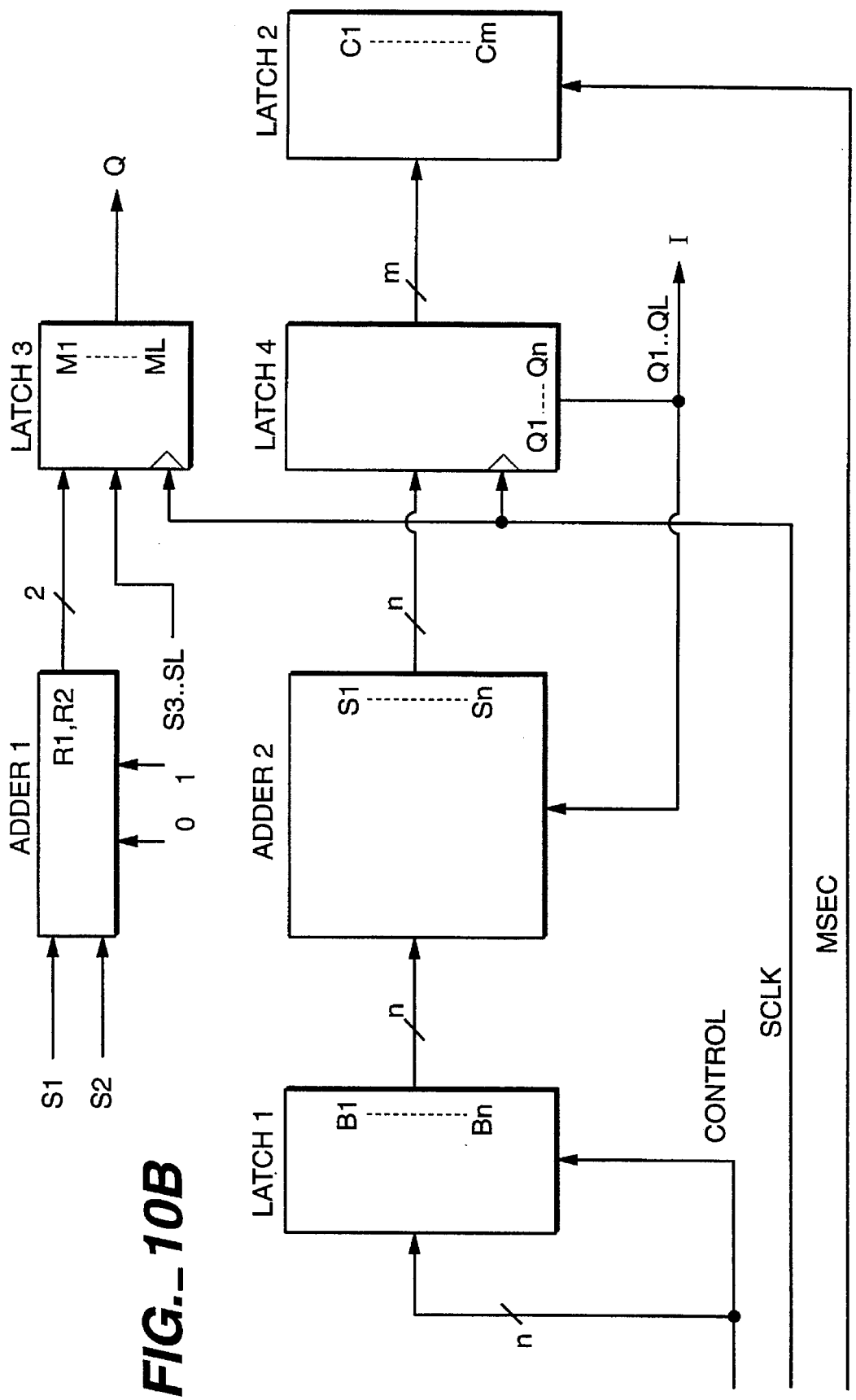
FIG._10B

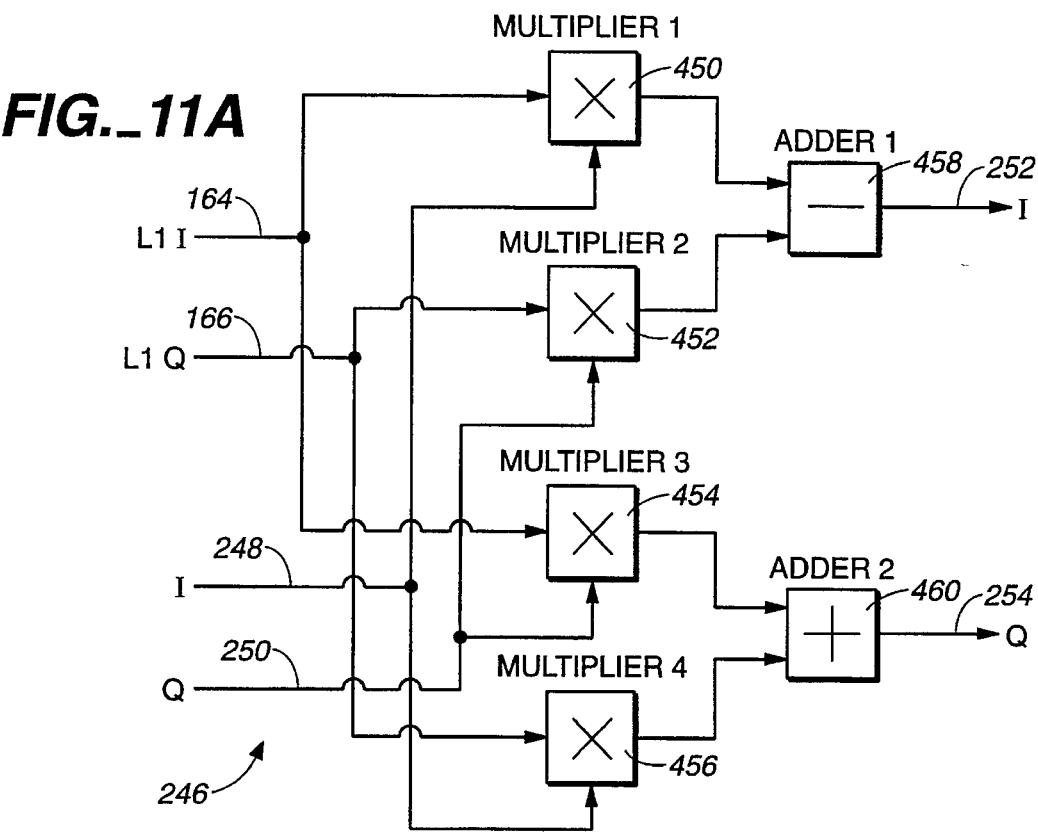
FIG._11A
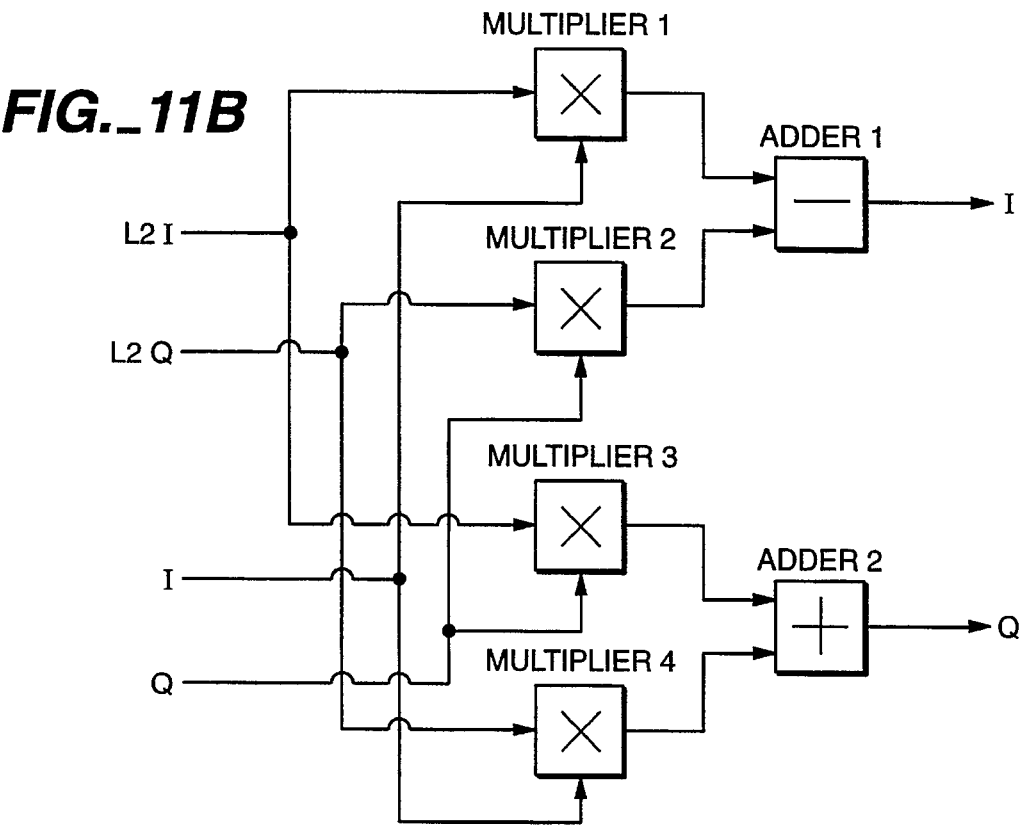
FIG._11B

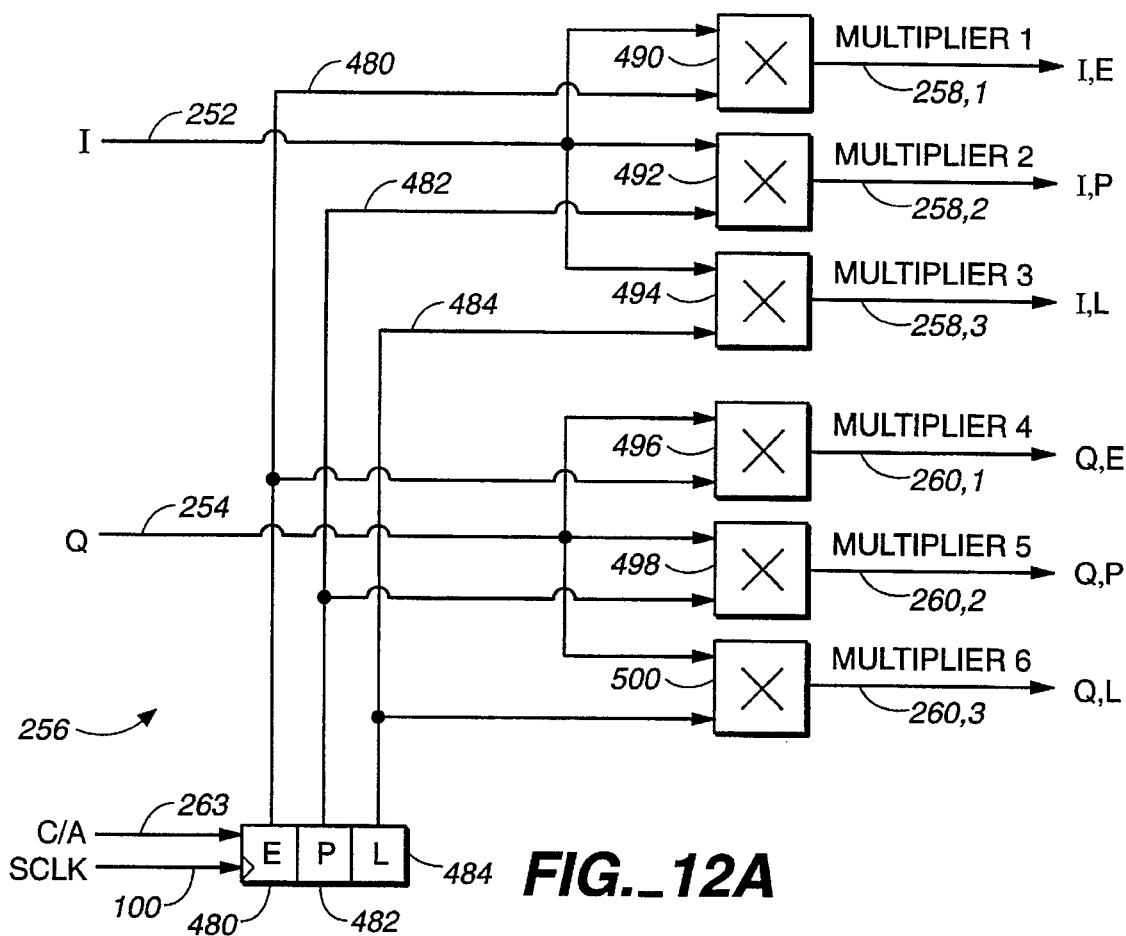
FIG._12A
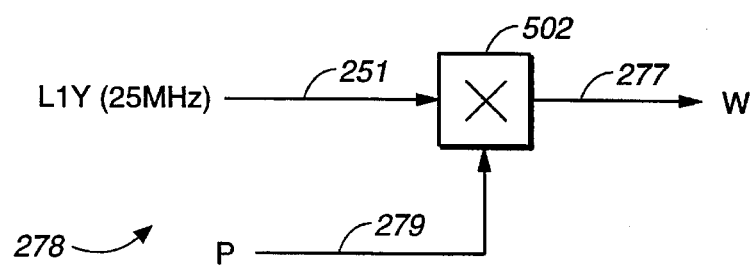
FIG._12B

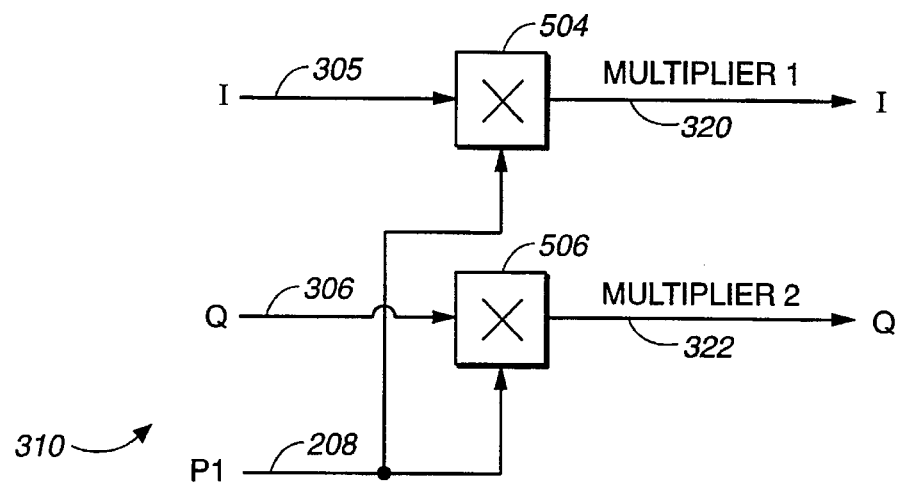
FIG._12C
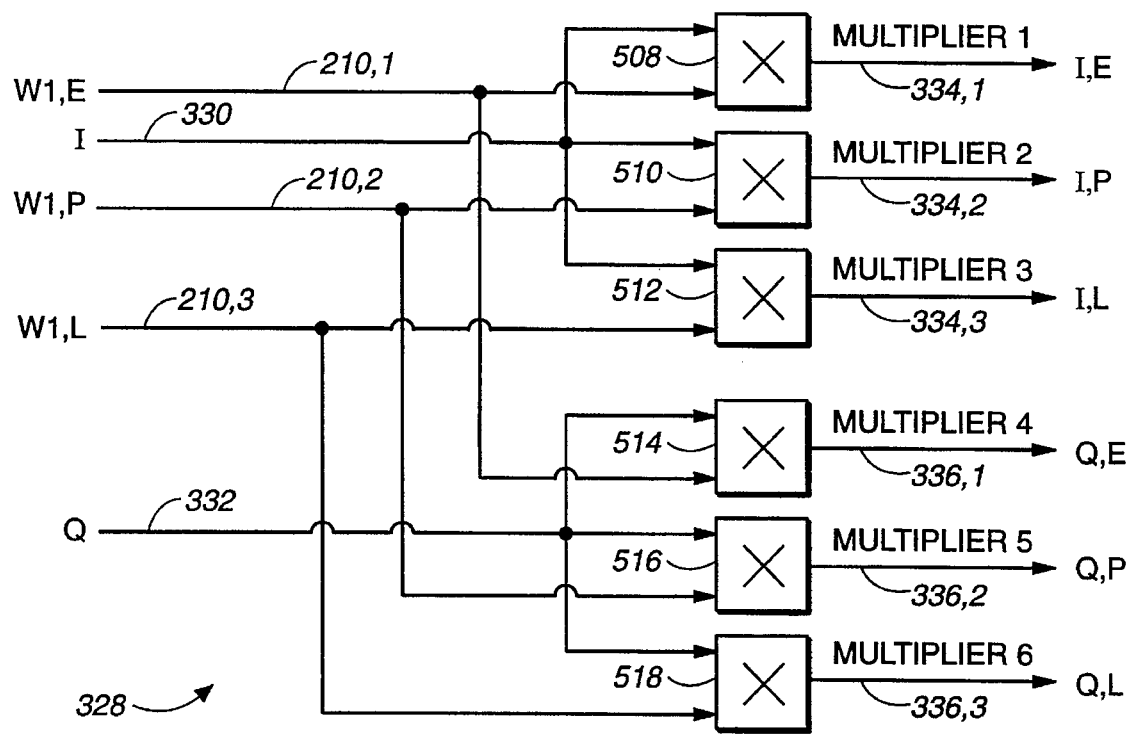
FIG._12D

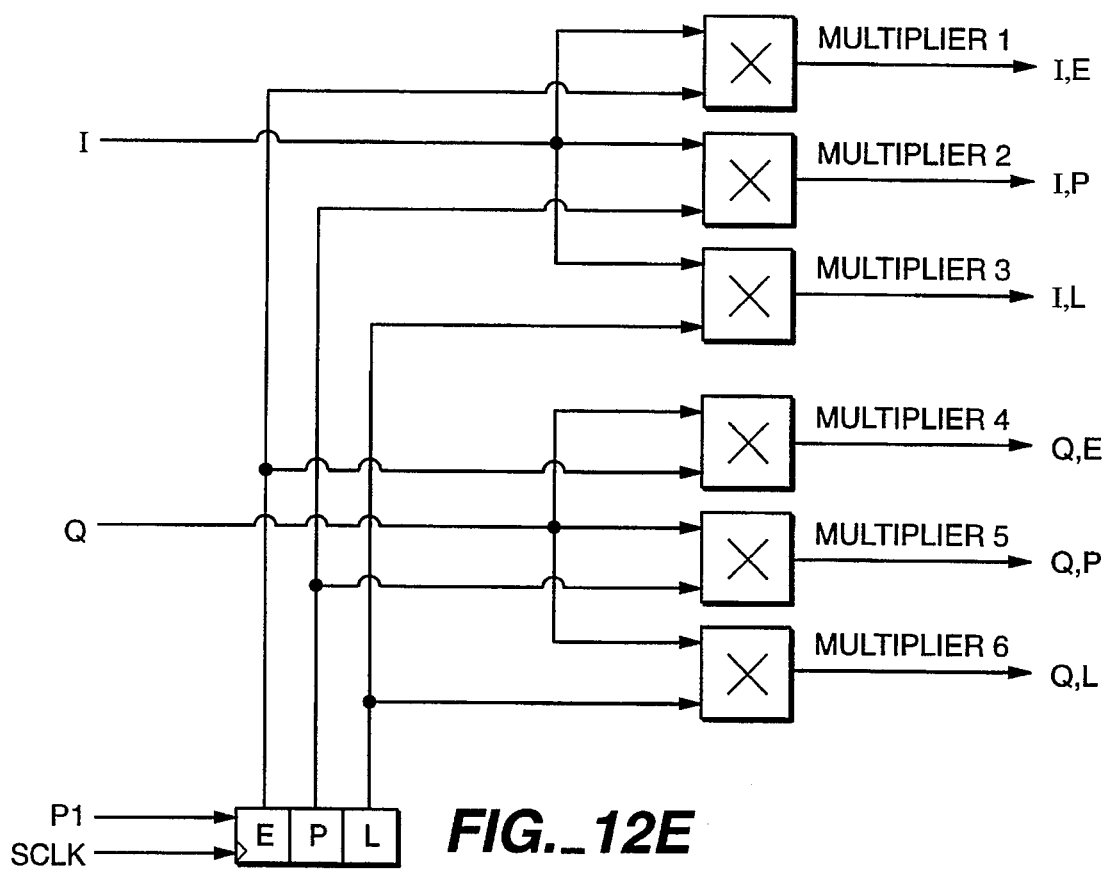
FIG._12E
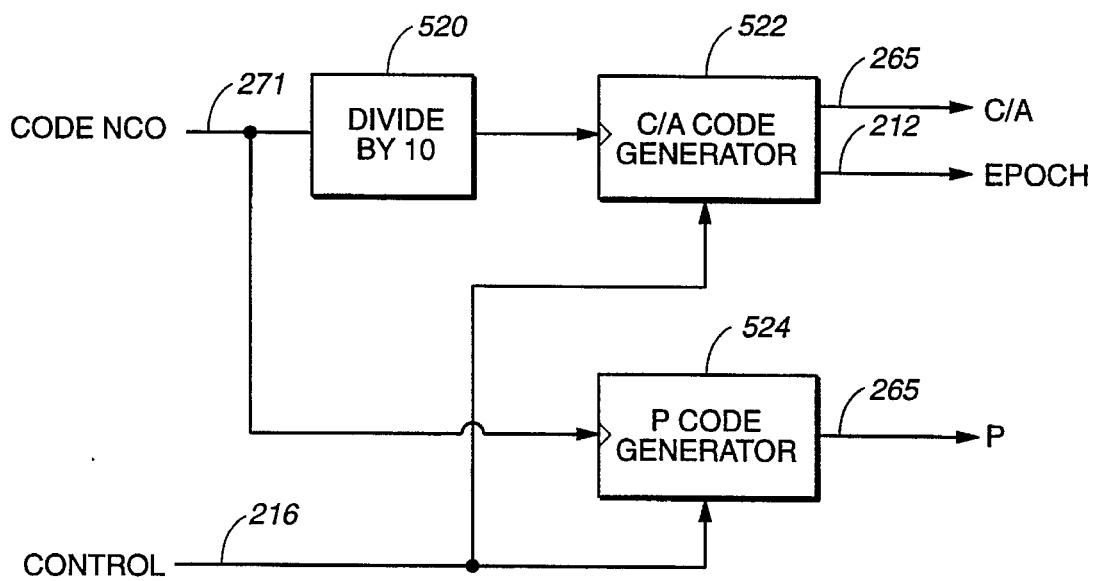
FIG._13

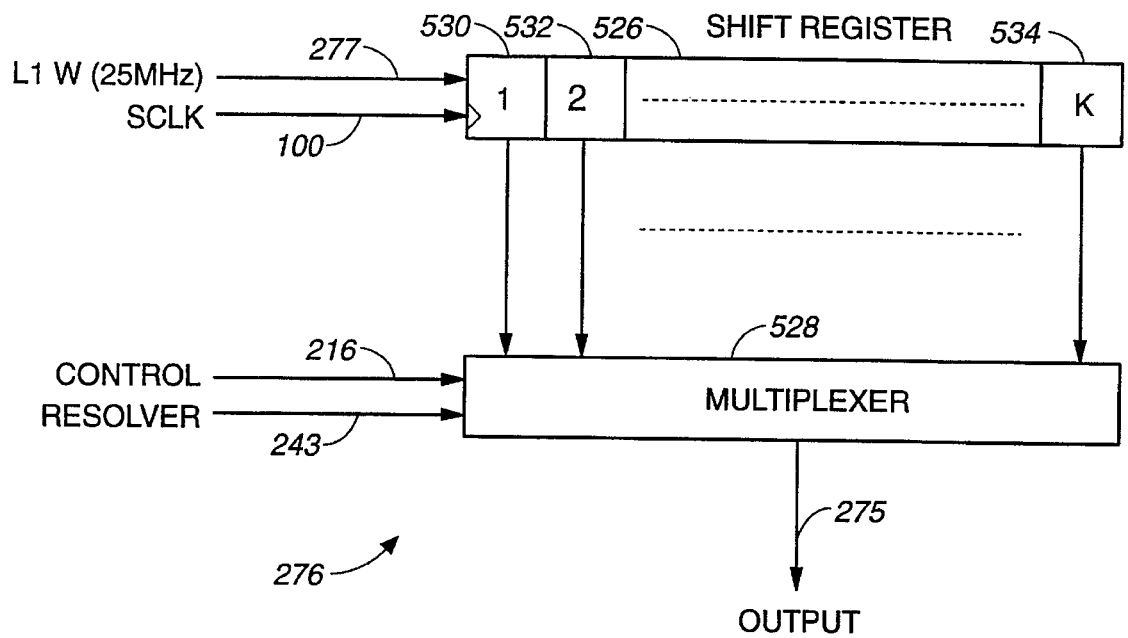
FIG._14A
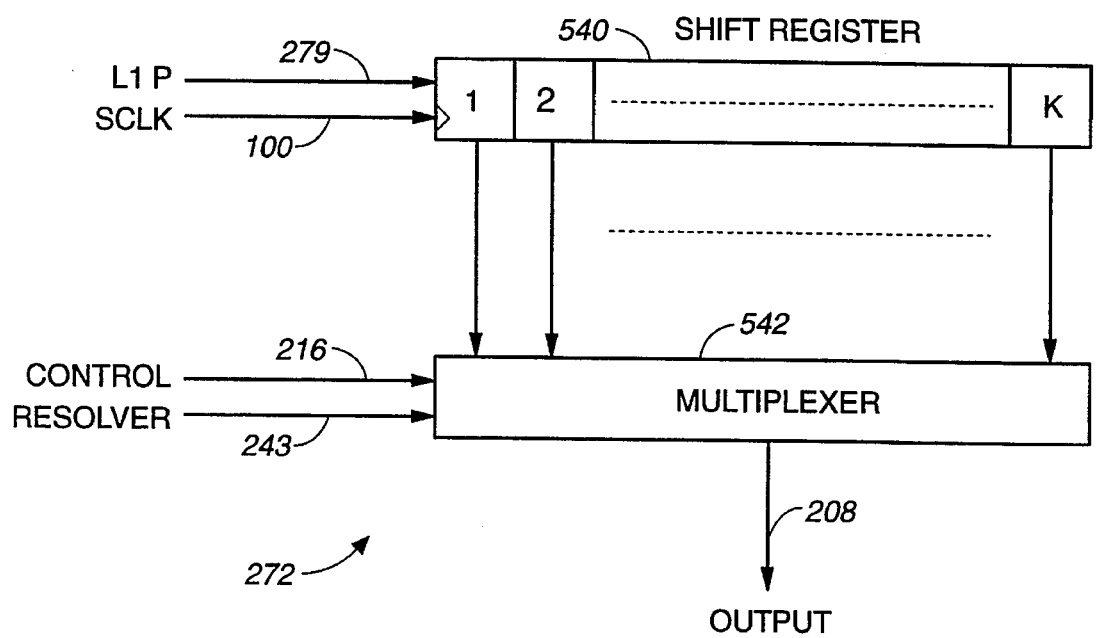
FIG._14B

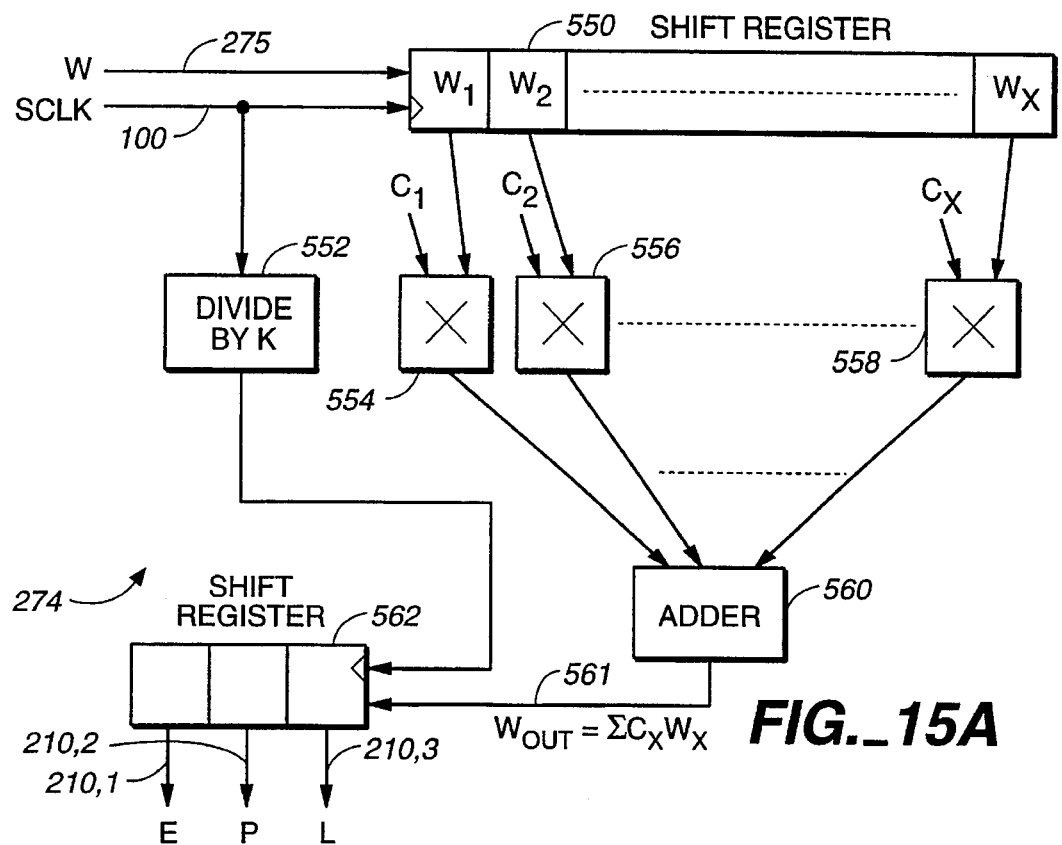
FIG._15A
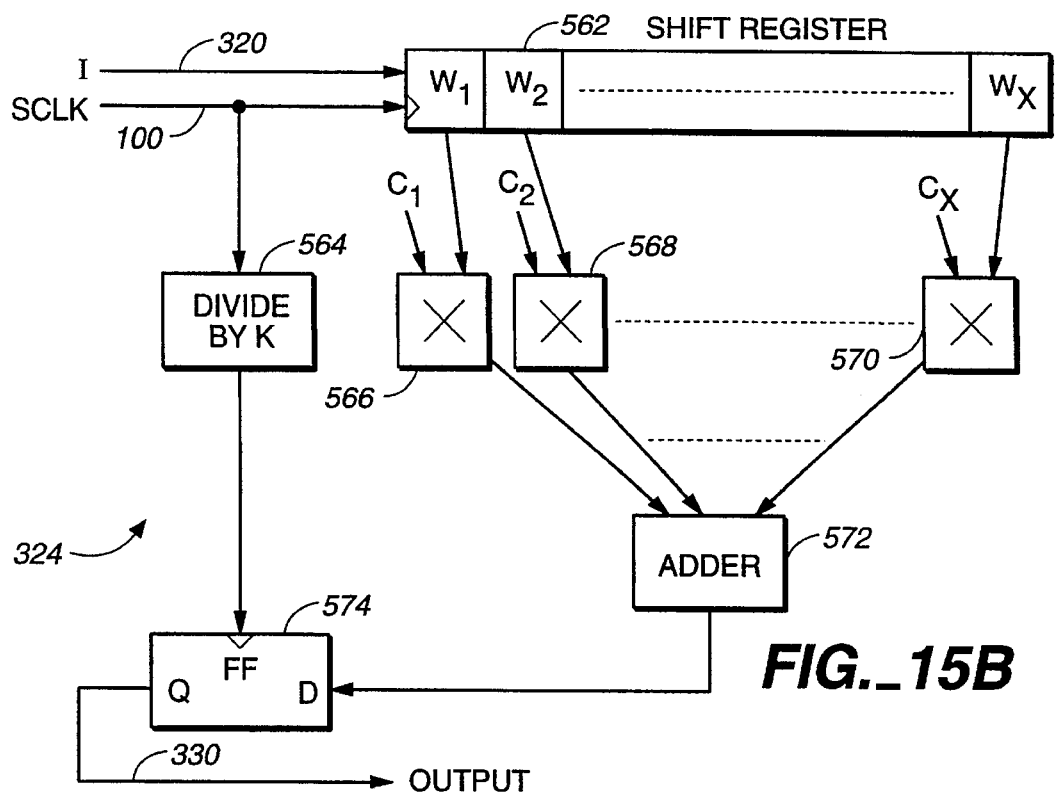
FIG._15B

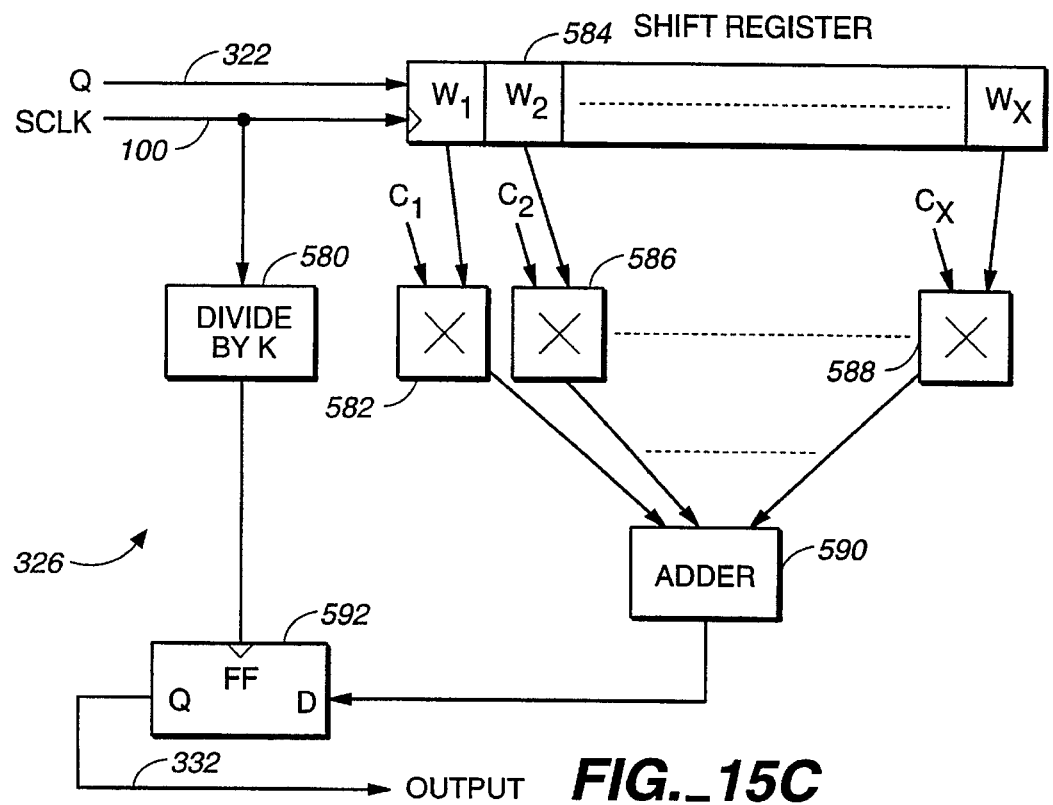
FIG._15C
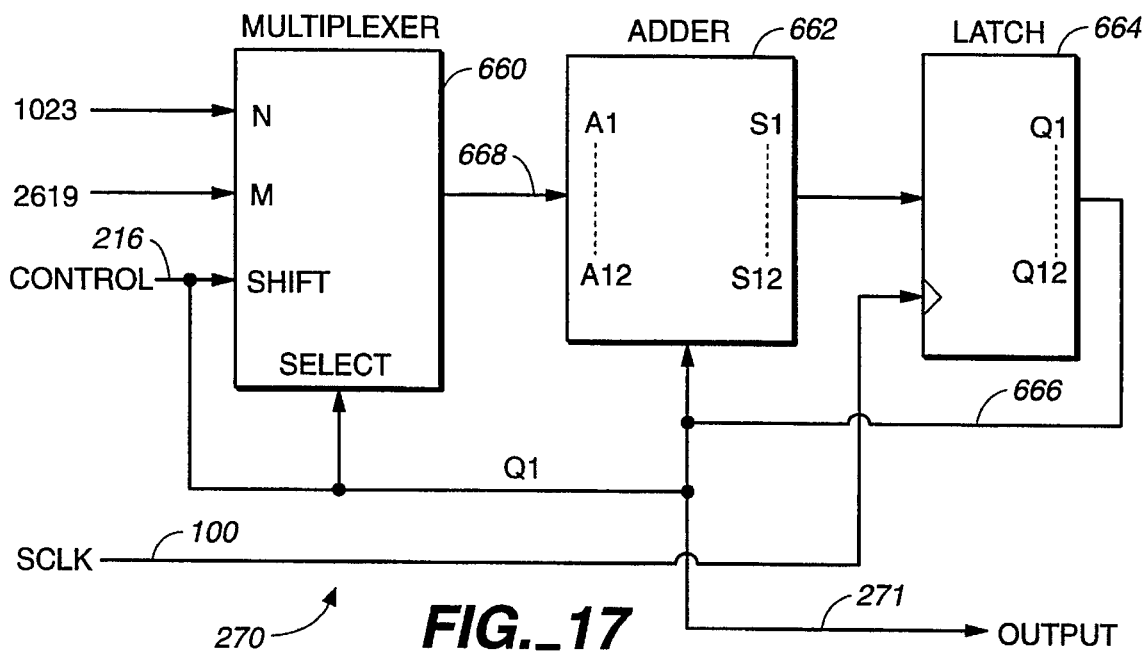
FIG._17

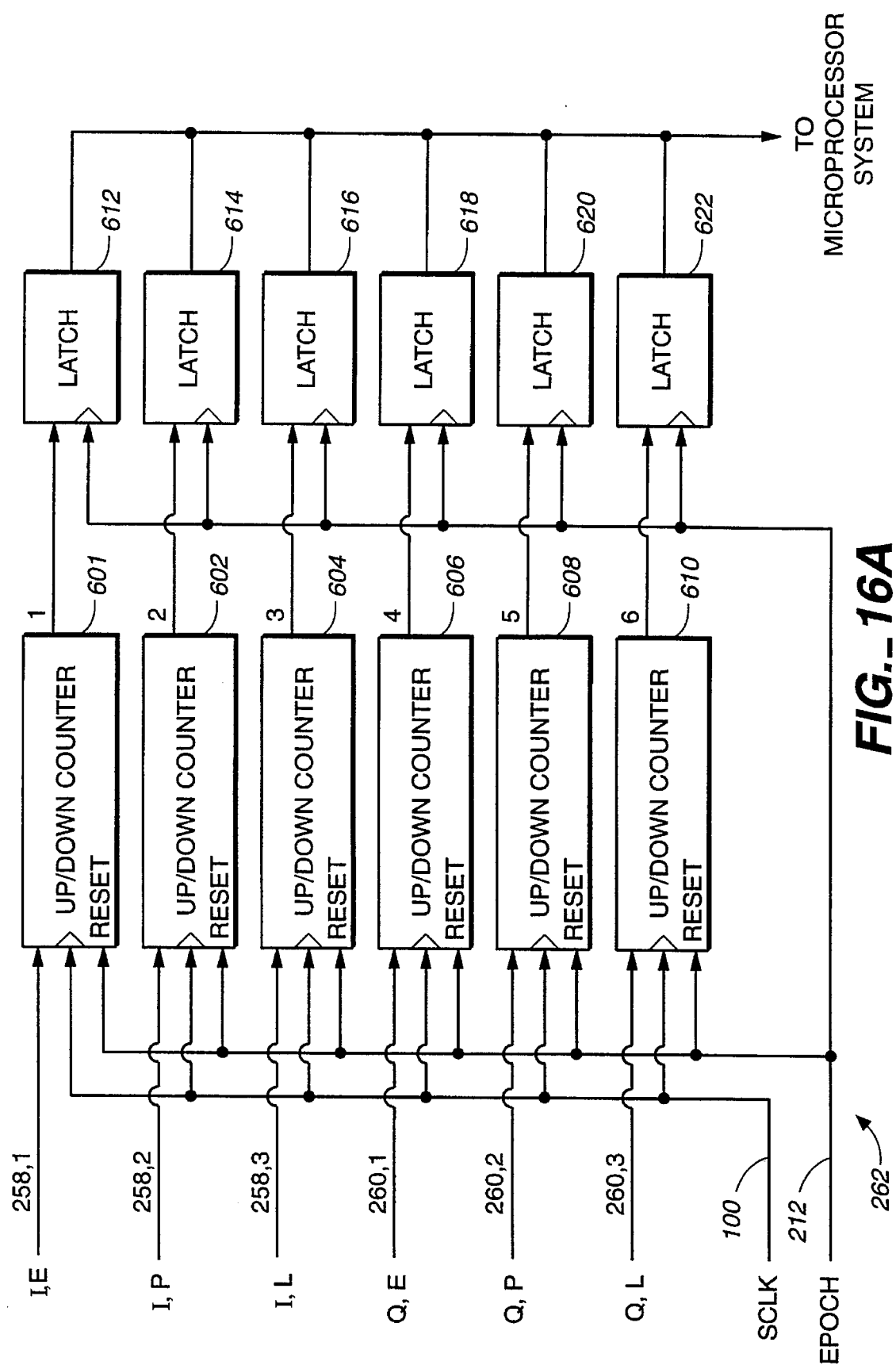
FIG._16A

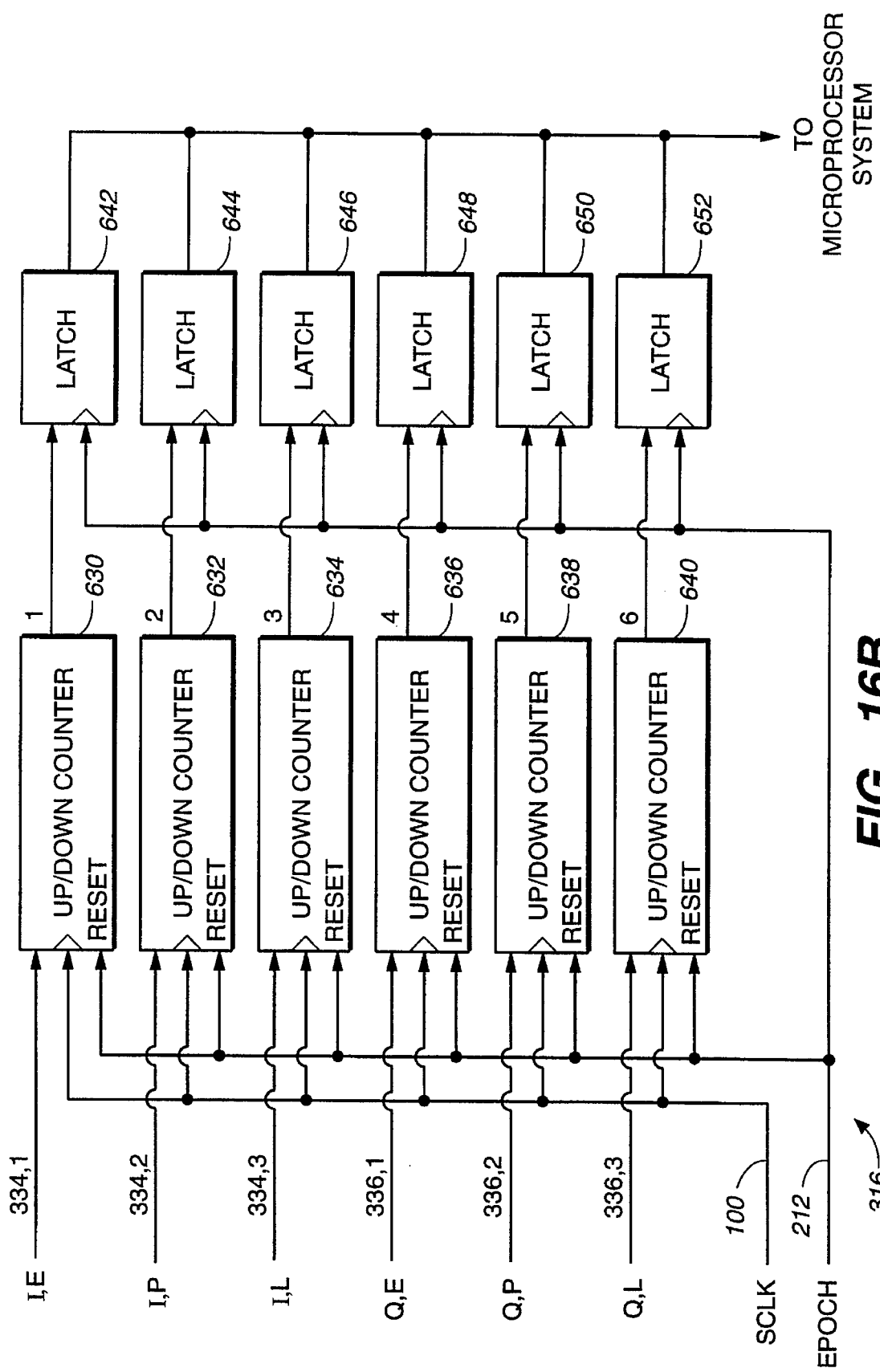
FIG._16B

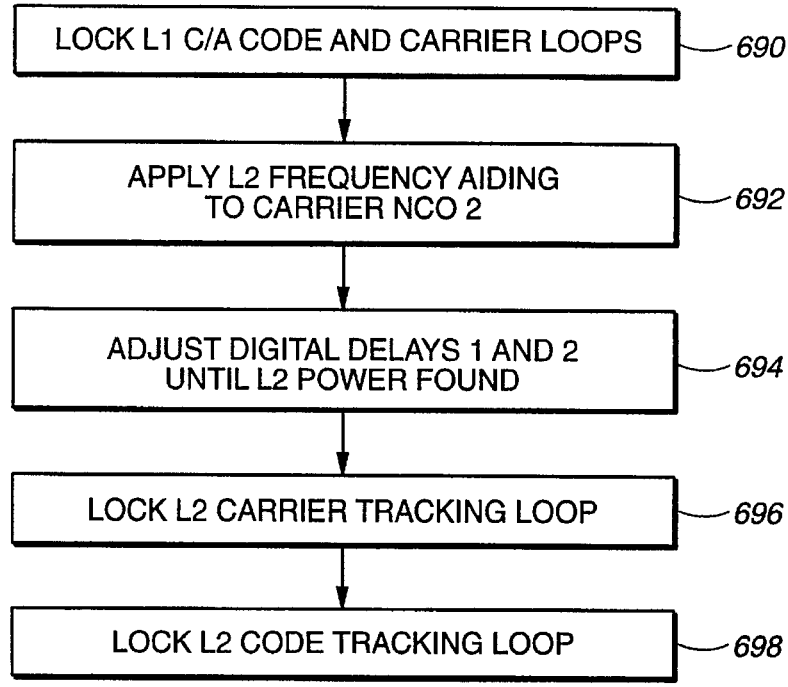
FIG._18A
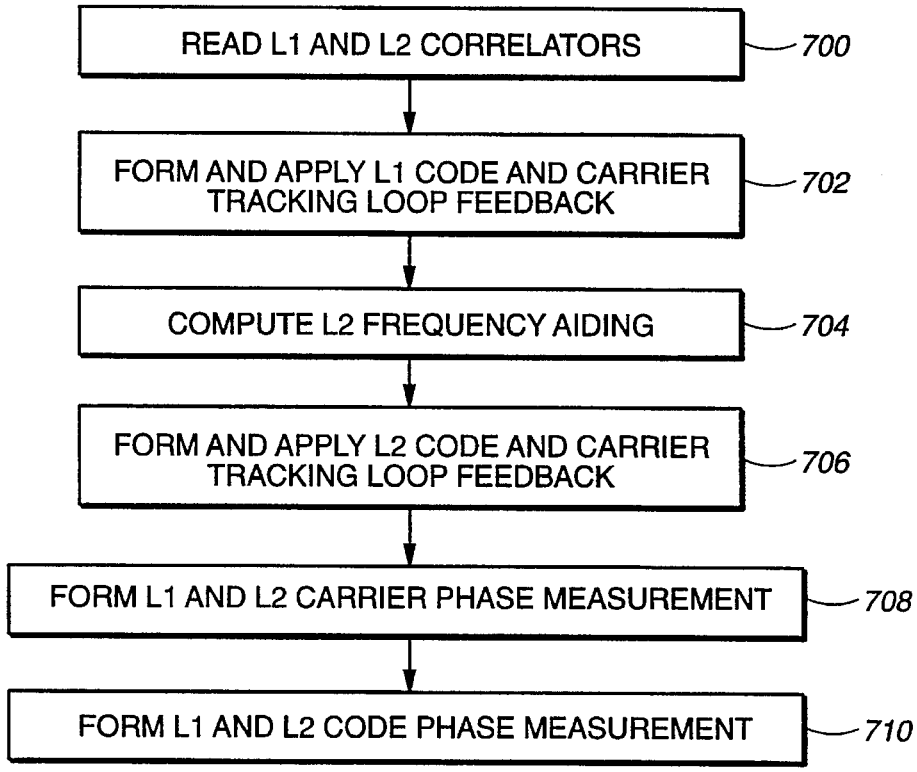
FIG._18B

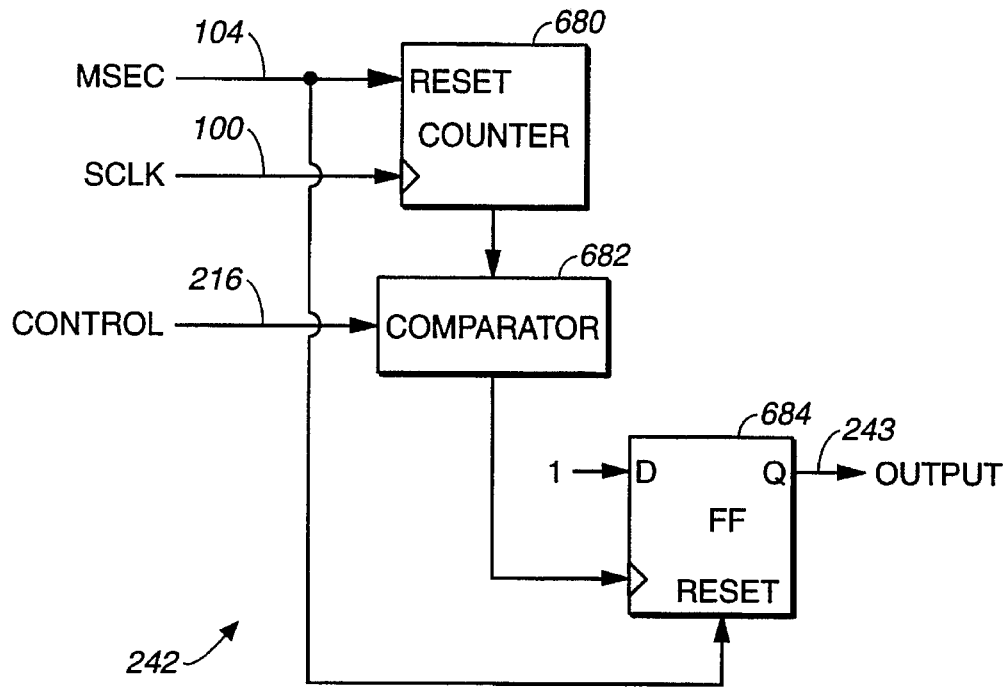
FIG._19
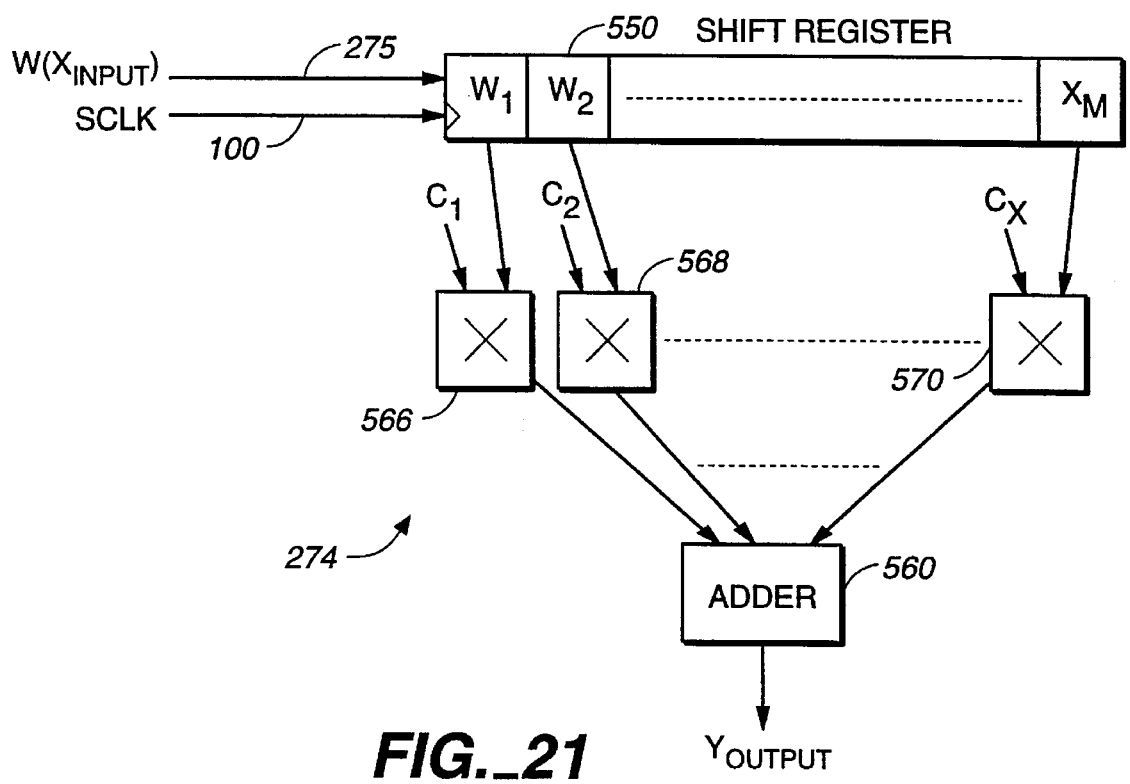
FIG._21

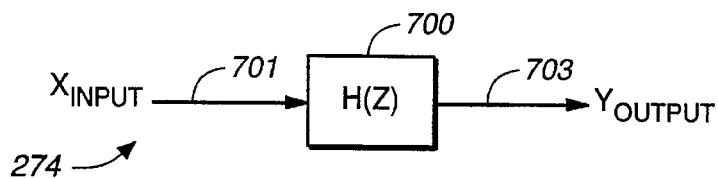
FIG._20A
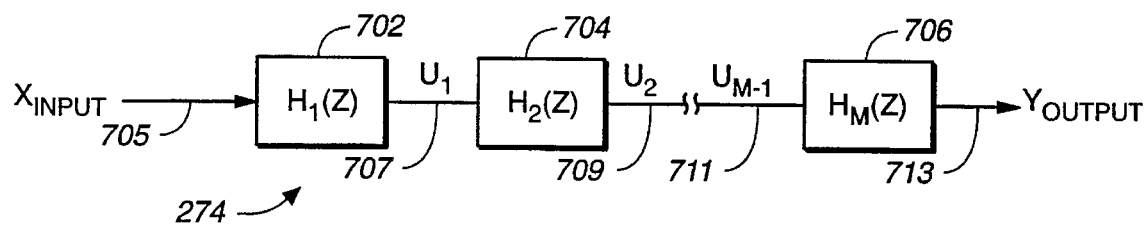
FIG._20B
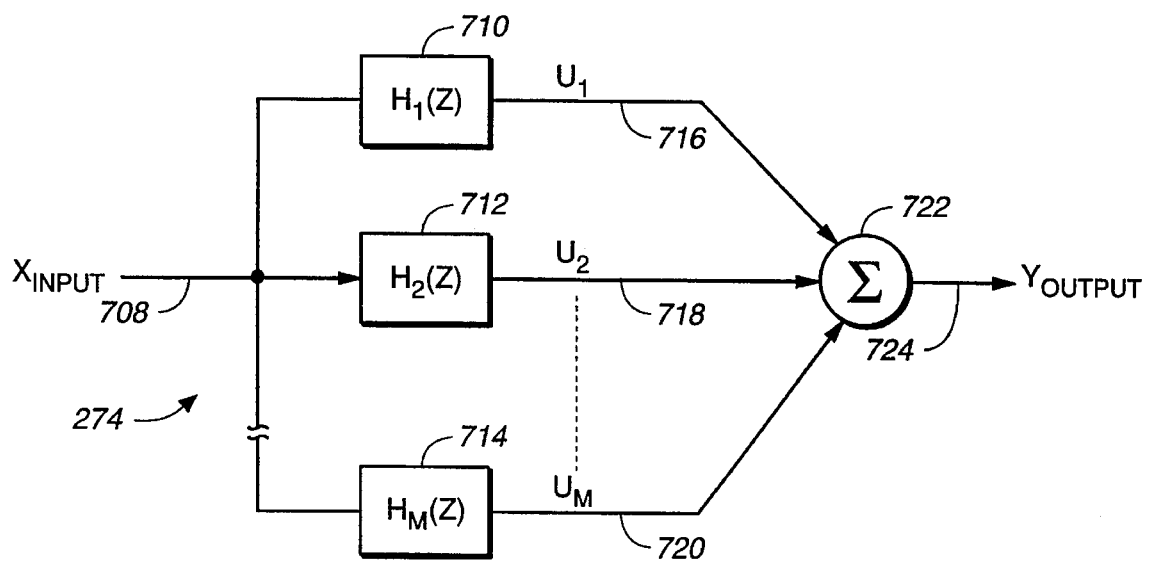
FIG._20C

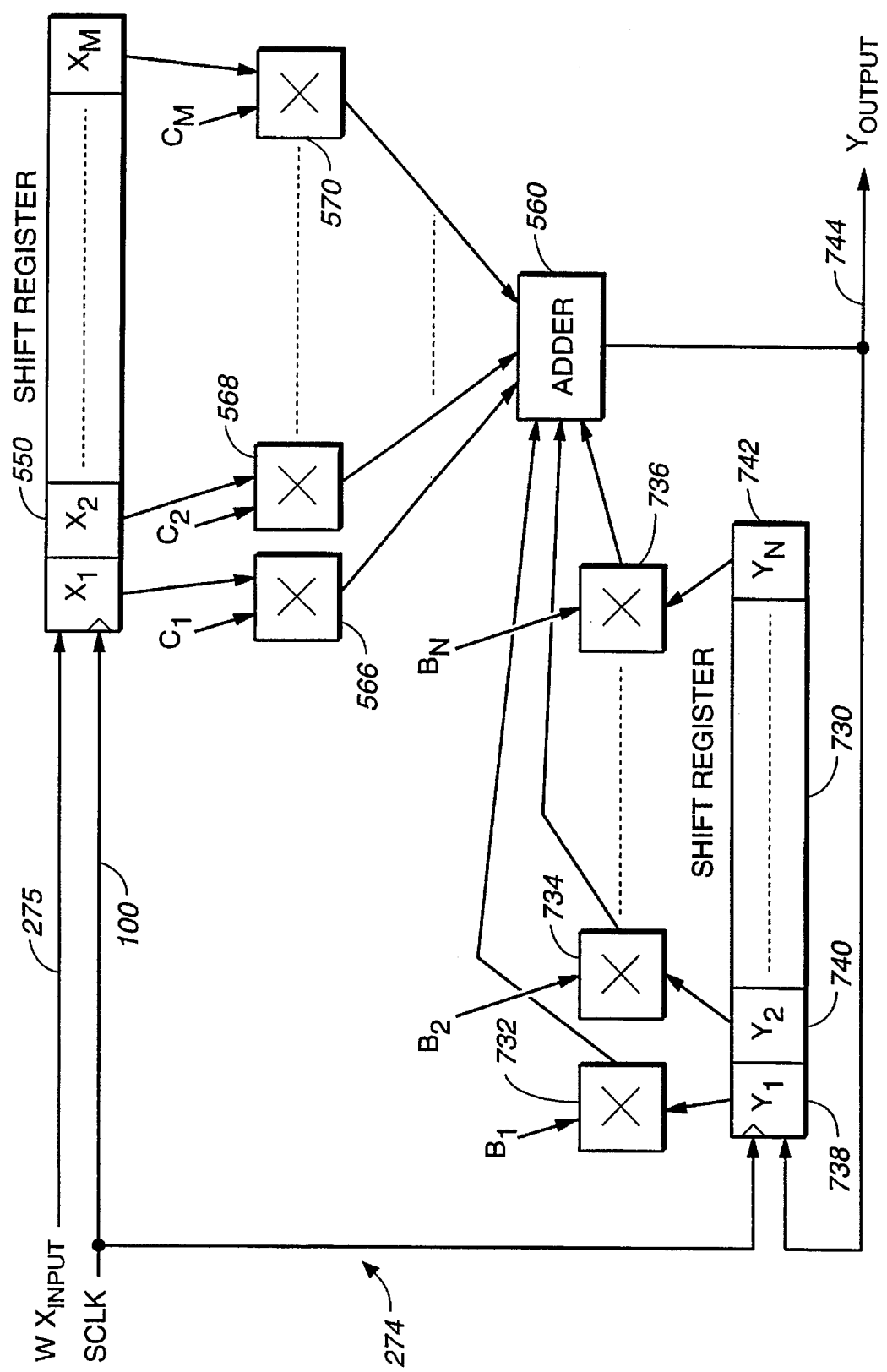
FIG._22

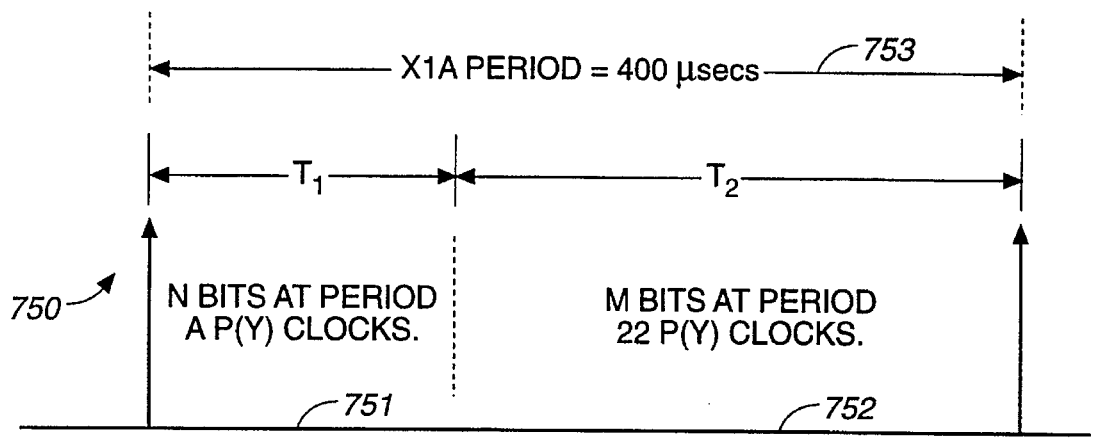
FIG._23
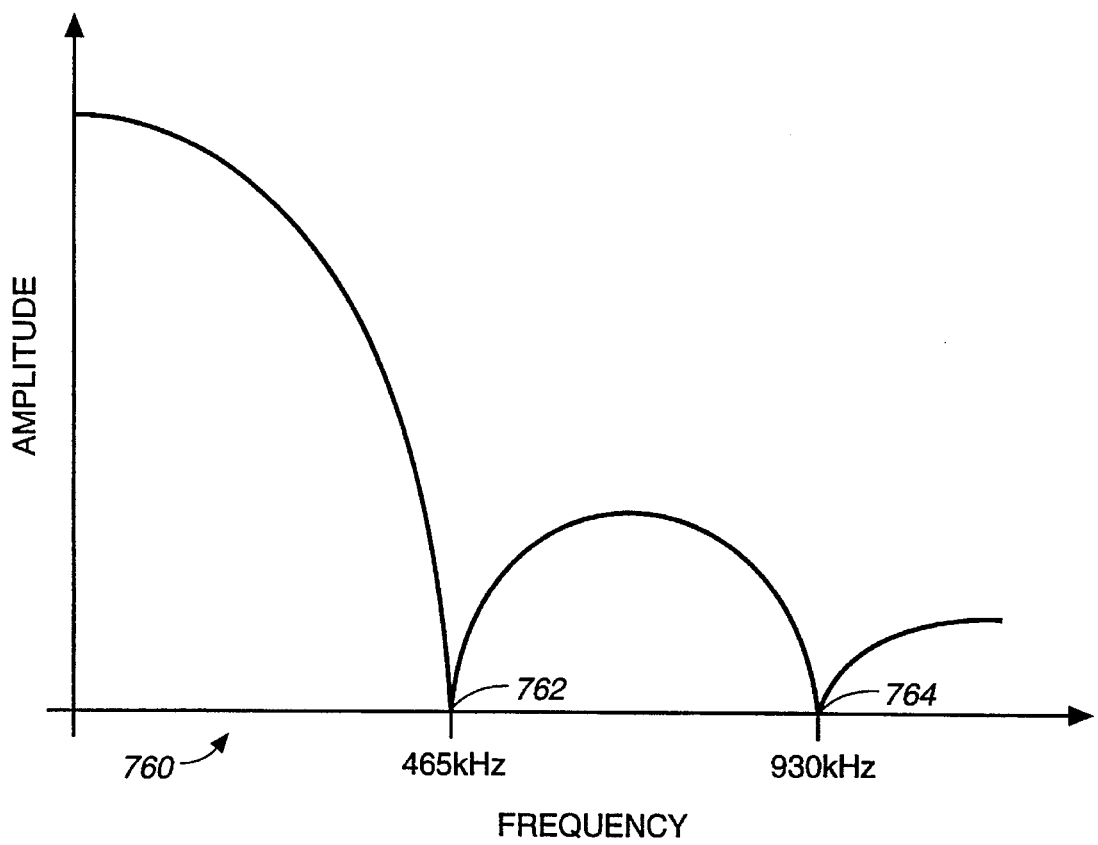
FIG._24

OPTIMIZED PROCESSING OF SIGNALS FOR ENHANCED CROSS-CORRELATION IN A SATELLITE POSITIONING SYSTEM RECEIVER

This invention is a continuation-in-part of the patent application No. 08/382,889 filed on Feb. 2, 1995.

BACKGROUND

The invention relates to a system and a method employed for extracting the maximum information (in terms of signal-to-noise ratio–STN) from the satellite signals generated by the satellite positioning system (SPS) that have been modulated with an unknown security code. The SPS includes different satellite systems. One of those systems is a global positioning system (GPS).

The GPS is a system of satellite signal transmitters, with receivers located on the Earth's surface or adjacent to the Earth's surface, that transmits information from which an observer's present location and/or the time of observation can be determined. There is also the Global Orbiting Navigational System (GLONASS), which can operate as an alternative GPS system.

Each GPS satellite transmits two spread spectrum, L-band carrier signals: an L1 signal having a frequency $f1=1575.42$ MHz and an L2 signal having a frequency $f2=1227.6$ MHz. These two frequencies are integral multiplies $f1=1540\ f0$ and $f2=1200\ f0$ of a base frequency $f0=1.023$ MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency $f$ (delay~$f^2$). This phenomenon is discussed by MacDoran in U.S. Pat. No. 4,463,357, which discussion is incorporated by reference herein. When transit time delay through the ionosphere is determined, a phase delay associated with a given carrier signal can also be determined. The phase delay which is proportional to the time difference of arrival of the modulated signals is measured in realtime by cross correlating two coherently modulated signals transmitted at different frequencies L1 and L2 from the spacecraft to the receiver using a cross correlator. A variable delay is adjusted relative to a fixed delay in the respective channels L1 and L2 to produce a maximum at the cross correlator output. The difference in delay required to produce this maximum is a measure of the columnar electron content of the ionosphere.

Use of the PRN codes allows use of a plurality of GPS satellite signals for determining an observer's position and for providing the navigation information. A signal transmitted by a particular GPS satellite is selected by generating and matching, or correlating, the PRN code for that particular satellite. Some of the PRN codes are known and are generated or stored in GPS satellite signal receivers carried by ground observers. Some of the PRN codes are unknown.

A first known PRN code for each GPS satellite, sometimes referred to as a precision code or P-code, is a relatively long, fine-grained code having an associated clock or chip rate of $10\ f0=10.23$ MHz. A second known PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of $f0=1.023$ MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision B-PR, 3 Jul. 1991, which is incorporated by reference herein.

The GPS satellite bit stream includes navigational information on the ephemeries of the transmitting GPS satellite (which includes a complete information about the transmitting satellite within next several hours of transmission) and an almanac for all GPS satellites (which includes a less detailed information about all other satellites). The satellite information transmitted by the transmitting GPS has the parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in *The NAVASTAR Global Positioning System*, Tom Logsdon, Van Nostrand Reinhold, New York, 1992, pp. 17–90.

A second alternative configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of $8/17$ of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of $f1=(1.602+9\ k/16)$ GHz and $f2=(1,246+7\ k/16)$ GHz, where $k(=1,2,\ldots 24)$ is the channel or satellite number. These frequencies lie in two bands at 1.597–1.617 GHz (L1) and 1,240–1,260 GHz (L2). The L1 code is modulated by a C/A- code (chip rate=0.511 MHz) and by a P-code (chip rate=5.11 MHz). The L2 code is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SPS), such as the Global Positioning System (GPS) or the Global Orbiting Navigation Satellite System (GLONASS), uses transmission of coded radio signals, with the structure described above, from a plurality of Earth-orbiting satellites. An SPS antenna receives SPS signals from a plurality (preferably four or more) of SPS satellites and passes these signals to an SPS signal receiver/processor, which (1) identifies the SPS satellite source for each SPS signal, (2) determines the time at which each identified SPS signal arrives at the antenna, and (3) determines the present location of the SPS satellites.

The range (Ri) between the location of the i-th SPS satellite and the SPS receiver is equal to the speed of light c times ($\Delta$ti), wherein ($\Delta$ti) is the time difference between the SPS receiver's clock and the time indicated by the satellite when it transmitted the relevant phase. However, the SPS receiver has an inexpensive quartz clock which is not synchronized with respect to the much more stable and precise atomic clocks carried on board the satellites. Consequently, the SPS receiver actually estimates not the true range Ri to the satellite but only the pseudo-range (ri) to each SPS satellite.

After the SPS receiver determines the coordinates of the i-th SPS satellite by picking up transmitted ephemeries constants, the SPS receiver can obtain the solution of the set of the four equations for its unknown coordinates (x0,y0,z0) and for unknown time bias error (cb). The SPS receiver can also obtain its heading and speed. (See *The Navstar Global Positioning System*, Tom Logsdon, Van Nostrand Reinhold, 1992, pp. 8–33, 44–75, 128–187.) The following discussion is focused on the GPS receiver, though the same approach can be used for any other SPS receiver.

The C/A code modulated phase quadrature carrier component of the L1 signal is provided for commercial use. If the accuracy desired in the quantity being measured by the receiver is not great, it is sufficient to use only the L1 signal carrier. However, for applications where high resolution measurements or fast measurements are to be made, both the L1 carrier and the L2 carrier must also be used, which allows to eliminate the unknown component of the time delay of the signals by the ionosphere.

To prevent jamming signals from being accepted as actual satellite signals, the satellites are provided with a secret Y-code, which replaces the known P-code when the "anti-spoofing" is ON. When the "anti-spoofing" is OFF, the Y-code is turned OFF, and the known P-code is used. Thus, the secret Y-code can be turned ON or OFF at will by the U.S. Government. The "anti-spoofing" allows the GPS system to be used for the military or other classified United States Government projects. It has been disclosed publicly that the secret Y-code is the modulo-two sum of the known P-code and the unknown W-code. Since the W-code is classified, the commercial GPS users employ different techniques to obtain the quasi-demodulation of the L2 signal.

The GPS signals are intended to be recovered by correlating each incoming signal with a locally generated replica of the code: P-code or C/A code. The result of such correlation is that the carrier in the GPS signals is totally suppressed when the modulating signal is a pseudorange code sequence like the P-code or the C/A code. Thus, the received L2 signal contains no component at the L2 frequency. For the survey applications it is important to be able to reconstruct the L2 carrier and to measure its phase. So long as the P code is not encrypted, the L2 carrier is easily recovered by correlation of the received signal with the locally generated P code replica. The locally generated code is adjusted in timing to provide an optimum correlation with the incoming signal. The correlation output is then a single narrow band peak centered at the carrier frequency. The carrier recovered by correlation provides the best available signal-to-noise ratio (STN). Although the L2 carrier can not be recovered by this correlation process when the P code is encrypted, L2 can still be recovered by squaring (multiplying the signal by itself) the incoming signal. This has an effect of removing all biphase modulation from the signal, and producing a single-frequency output signal at twice the frequency of the suppressed carrier. Thus, the L2 carrier can be obtained by squaring, regardless of whether or not the modulating P code is encrypted. However, the squaring the signal also squares the noise component of the signal. Thus, the resulting STN is seriously degraded (by 30 dB or more) as compared with the ratio for the carrier recovered by correlation. Moreover, squaring provides the half-wavelength carrier phase which is different from the L2 real wavelength carrier phase.

The variation of the squaring technique is proposed by Counselman III in U.S. Pat. No. 4,667,203, wherein the incoming signal is divided into upper and lower sidebands, which are multiplied together to obtain the second harmonic of the carrier signal. However, the degradation of the STN is the same as with squaring the entire signal.

U.S. Pat. No. 4,972,431 issued to Keegan, discloses a different approach to the quasi-demodulation of the L2 signal. The incoming encrypted P-code GPS signal is not immediately squared. Instead, after mixing with a local oscillator signal to lower its frequency to an intermediate frequency, the encrypted P-code signal is correlated with a locally generated P-code signal. Since the locally generated P-code signal does not perfectly match the encrypted P-code sequence, the correlation does not produce a sharp peak in the frequency spectrum. The result of the correlation is filtered by a bandpass filter, and the reduced-bandwidth signal is squared. The squared signal is processed in a delay lock code loop to maximize the spectral peak. An error signal is generated and is led back to control the generator of P code signal as to maximize the peak in the frequency spectrum of the output signal and to effectively lock onto the incoming L2 P code signal. Simultaneously, the second harmonic of the suppressed carrier signal resulting from the squaring process is processed to provide L2 carrier phase measurements. Because the squaring step is performed over a narrower bandwidth than the original P-code, there is less degradation in the STN of the received signal, as compared with squaring over the entire P-code bandwidth. The performance is more reliable under weak signal conditions because the cycle ambiguity of the carrier signal can be resolved more rapidly. The invention does not frustrate the intended purpose of P-code encryption.

However, the techniques described in the Keegan and Counselman patents result in a half wavelength L2 carrier phase observable, making it more difficult to quickly resolve integer ambiguities.

In U.S. Pat. No 5,293,170 issued to Lorenz, the integration of the L1 and L2 signals after demodulation by locally generated carrier and P-code signals, is repetitively accomplished over a duration that is known to be the period of the modulation code. And further, the modulated code period is altered between two periods, both being an integer multiple of P chips. The invention assumes detailed knowledge of the timing of the unknown W-code. This information is key to the optimal operation of the Lorenz patent.

What is needed for purposes of optimum processing (in terms of maximizing the STN ratio) of the W-code satellite signals without requiring detailed knowledge of W code timing, is to make a reasonable assumption about the general nature of the W-code spectrum and to implement the W-code spectrum in the design of the SPS receiver.

SUMMARY

The present invention is unique because it allows to design an optimum SPS receiver capable of optimum processing the satellite signals with an unknown W-code by making several key assumptions about the nature of the W-code spectrum.

One aspect of the present invention is directed to a system for optimum correlation processing of L1 and L2 signals received from at least one SPS satellite by a SPS RECEIVER. The system includes a RECEIVER for: (1) receiving a known C/A-code modulated on L1 carrier frequency; (2) receiving an unknown Y-code modulated on L1 carrier frequency signal; and (3) receiving an unknown Y-code modulated on L2 carrier frequency signal. The received L1 and L2 signals contain propagation noise, and the Y-code includes a known P-code and an unknown W-code.

The system further includes at least one DIGITAL CHANNEL PROCESSOR for: (1) locally generating replica of the C/A-code modulated on L1 carrier frequency signal; (2) locally generating replica of the P-code modulated on L1 carrier frequency signal; (3) extracting of an estimate of the Y-code from the L1 signal, and from the L2 signal; (4) correlating a locally generated replica of C/A-code with the received L1 code for obtaining an estimate of L1 group delay (L1 pseudo-range) and L1 carrier phase; (5) removing the P-code from the locally extracted estimate of the L1 Y-code to obtain a locally extracted estimate of the L1 W-code; (6) removing the P-code from the locally extracted estimate of the L2 Y-code to obtain a locally extracted estimate of the L2 W-code; and (7) correlating the locally extracted estimate of the L1 W-code with the locally extracted estimate of the L2 W-code to obtain relative offset in group delay between L1 and L2 signals and for obtaining an independent estimate of L2 carrier phase.

The system further includes a MASTER OSCILLATOR and a FREQUENCY SYNTHESIZER, wherein the FREQUENCY SYNTHESIZER generates several timing signals (LO1, LO2, SCLK, and MSEC).

The RECEIVER includes a dual frequency patch ANTENNA for receiving the L1 and L2 satellite signals; a FILTER/low noise amplifier (LNA) for performing filtering and low noise amplification of the L1 and L2 signals; a DOWNCONVERTER for mixing and converting the L1 and L2 signals; and an IF PROCESSOR for transforming the converted L1 and L2 signals into digitally sampled quadrature versions of L1 and L2 signals (IL1 , QL1 , IL2 , QL2 ).

The IF PROCESSOR includes four one-bit analog-to-digital (A/D) CONVERTERs for performing 1-bit quantization operation on the IL1 , QL1 , IL2 and QL2 signals. The IF PROCESSOR further includes four FLIP-FLOPs for sampling the IL1 , IL2 , QL1 , and QL2 signals at sampling clock (SCLK) rate.

The DIGITAL CHANNEL PROCESSOR includes an L1 TRACKER for tracking L1 C/A code when Y code is ON and for tracking L1 P code when Y code is OFF; an L2 TRACKER for tracking an enhanced cross correlated W code when Y code is ON and for tracking L2 P code when Y code is OFF; and a MICROPROCESSOR system. The L1 TRACKER is fed by digitized inphase IL1 and quadrature QL1 of L1 signal outputted by the IF PROCESSOR. The L2 TRACKER is fed by digitized inphase IL2 and quadrature QL2 of L2 signal outputted by the IF PROCESSOR. The L1 TRACKER and the L2 TRACKER are synchronously clocked by the SCLK signal and synchronously referenced by the MSEC signal to local reference time. When Y code is ON the L2 TRACKER is fed from the L1 TRACKER by three signals: L1 P code, filtered estimate of L1 W code, and C/A code epoch (EP code). The MICROPROCESSOR system is fed by output signals from the L1 TRACKER and the L2 TRACKER; and the L1 TRACKER and the L2 TRACKER are fed by control signal from the MICROPROCESSOR.

The L1 TRACKER includes a CODE GENERATOR for providing a locally generated replica of C/A code and P-code; a MULTIPLEXER 1 for selecting a locally generated code C/A when Y code is ON and for selecting a locally generated P-code when Y code is OFF; and a carrier numerically controlled oscillator (CARRIER NCO 1). The L1 TRACKER further includes a CARRIER MIXER 1 for multiplying digitized inphase IL1 and QL1 signals having carrier frequency with outputted by the CARRIER NCO 1 inphase and quadrature components of digital carrier; wherein the CARRIER MIXER 1 outputs inphase IL1 and quadrature QL1 signals having zero carrier frequency. The L1 TRACKER also includes a CODE MIXER 1 for code correlating the CARRIER MIXER 1 output signals with the locally generated replica of C/A code; wherein when the L1 TRACKER's carrier tracking loop is closed via the CARRIER NCO 1 the input to the CODE MIXER 1 represents the satellite signal L1 C/A code; and wherein the CODE MIXER 1 performs the code correlation at 3 time points (early, punctual and late) on the autocorrelation function graph creating an early, a punctual and a late sample of the autocorrelation function.

The L1 TRACKER further includes a block CORRELATORS 1 for integrating the IE (inphase early), the IP (inphase punctual), the IL (inphase late), the QE (quadrature early), the QP (quadrature punctual), and the QL (quadrature late) versions of the correlated samples of the L1 C/A (or P) code with the locally generated version of C/A (or P) code across a time period given by a multiple of L1 C/A EPOCH codes. The CORRELATORS 1 output signal is fed to the MICROPROCESSOR system at a rate of L1 C/A code epoch, wherein the MICROPROCESSOR uses the CORRELATORS 1 output signal to develop feedback signals for the carrier tracking loop and for the code tracking loop.

The IE, IL, QE, and QL signals are used by the code tracking loop to form:: (1) a code phase estimate=K1(IE−IL), when the carrier loop is locked; or (2) a code phase estimate=K1 $[(IE^2+QE^2)^{1/2}-(IL^2+QL^2)^{1/2}]$, when the carrier loop is not locked; K1 is an L1 code loop gain factor. The IP, and QP signals are used by the carrier tracking loop by forming a carrier phase estimate=arctan(QP/IP).

The L1 TRACKER further includes the CODE NCO to provide a clock for the CODE GENERATOR which locally generates replicas of C/A code and P-code. The CODE NCO outputs under normal operation code NCO frequency=(N× SCLK)/($2^n$−M+N), and (2) under code phase shift operation code phase shift=(M-SHIFT)/($2^n$−M+N).

The L1 TRACKER further includes a CODE MIXER 2 for removing known L1 P code from the estimate of L1 Y code and for outputting an estimate of L1 W code; a DIGITAL DELAY 1 for delaying the L1 W code estimate; a DIGITAL FILTER 1 for reducing the bandwidth (BW) of the L1 W code estimate; a DIGITAL DELAY 2 for delaying the P code output from the CODE GENERATOR; and a RESOLVER for altering the resulting delay being a result of the relative time spent on each delay.

In one preferred embodiment the DIGITAL FILTER MEANS 1 (as well as the DIGITAL FILTER MEANS 2 and the DIGITAL FILTER MEANS 3) comprises a finite impulse response (FIR) DIGITAL FILTER 1, wherein the FIR DIGITAL FILTER 1 performs the optimized enhanced cross correlation operation by matching the observed W-code spectrum and by optimizing the signal-to-noise (STN) ratio of the cross-correlation process. The FIR DIGITAL FILTER 1 can be implemented by employing a direct form transfer function, a cascade form transfer function, or a parallel form transfer function.

In another preferred embodiment the DIGITAL FILTER MEANS 1 (as well as the DIGITAL FILTER MEANS 2 and the DIGITAL FILTER MEANS 3) includes an infinite impulse response (IIR) DIGITAL FILTER 1, wherein said IIR DIGITAL FILTER 1 performs the optimized enhanced cross correlation operation by matching the observed W-code spectrum. The IIR DIGITAL FILTER 1 can be also implemented by using a direct form transfer function, a cascade form transfer function, or a parallel form transfer function.

The L2 TRACKER includes a carrier numerically controlled oscillator (CARRIER NCO 2) for generating the inphase and quadrature components of digital carrier; a CARRIER MIXER 2 for mixing digitized inphase IL2 and QL2 signals having carrier frequency with inphase IL2 and quadrature QL2 signals having zero carrier frequency. When L2 carrier tracking loop is locked via the CARRIER NCO 2 the IL2 output signal contains an estimate of L2 Y code and the Q L2 output signal contains no signal power.

The CODE MIXER 3 is used by the L2 TRACKER further for outputting an I estimate of L2 W code and a Q estimate of L2 W code; a CODE MIXER 4 for correlating the I estimate of L2 W code and the Q estimate of L2 W code with a signal W1, wherein the signal W1 is the estimate of L1 W code sent by the L1 TRACKER. The CODE MIXER 4 performs the code correlation at 3 time points (early, punctual and late) on the autocorrelation function graph creating an early, a punctual and a late sample of the autocorrelation function.

The L2 TRACKER further includes the CODE MIXER 5 for code correlating the CARRIER MIXER 2 output I and Q signals with outputted by the L1 TRACKER P1 code, wherein said P1 code represents a locally generated replica of L2 P code. The CODE MIXER 5 also performs the code correlation at 3 time points (early, punctual and late) on the autocorrelation function graph creating an early, a punctual and a late sample of the autocorrelation function.

The MULTIPLEXER 2 is employed by the L2 TRACKER for selecting under the control of MICROPROCESSOR the mode of operation when Y code is ON and OFF. When Y code is OFF and satellite transmits the P code on L2 the MICROPROCESSOR selects the output of CODE MIXER 5. When Y code is ON the MICROPROCESSOR selects the output of CODE MIXER 4. The block CORRELATORS 2 connected to the MULTIPLEXER 2 is used for integrating the early, punctual and late samples of the autocorrelation function. The CORRELATORS 2 output signal is fed to the MICROPROCESSOR system at a rate of the L1 C/A code epoch (EP). The MICROPROCESSOR uses the CORRELATORS 2 output signal to develop feedback signals for the carrier tracking loop and for the code tracking loop.

The block CORRELATORS 2 is used by the L2 TRACKER for integrating the IE (inphase early), the IP (inphase punctual), the IL (inphase late), the QE (quadrature early), the QP (quadrature punctual), and the QL (quadrature late) version of the correlated samples between filtered estimate of L1 and L2 W-codes across a time period given by a multiple of L1 C/A EPOCH (EP) code.

The IE, IL, QE, and QL signals are used by the code tracking loop by forming: (1) a code phase estimate=K2(IE−IL), when the carrier loop is locked; or (2) a code phase estimate=K2[(IE$^2$+QE$^2$)$^{1/2}$−(IL$^2$+QL$^2$)$^{1/2}$], when the carrier loop is not locked; K2 is an L2 -code loop gain factor.

The PQ, and PI codes are used by the carrier tracking loop by forming a carrier phase estimate=arctan(PQ/PI).

One more aspect of the present invention is directed to a method for optimum correlation processing of L1 and L2 signals received from a SPS satellite by a correlation processing system comprising a RECEIVER and at least one DIGITAL CHANNEL PROCESSOR.

The method includes the steps of: (1) providing the RECEIVER and at least one DIGITAL CHANNEL PROCESSOR; (2) receiving a known C/A-code modulated on L1 carrier frequency, an unknown Y code modulated on L1 carrier frequency signal, and an unknown Y code modulated on L2 carrier frequency signal by the RECEIVER; wherein the received L1 , and L2 signals contain propagation noise; and wherein the Y code comprises a known P-code and an unknown W-code; (3) generating local replica of the C/A-code modulated on L1 carrier frequency signal by the DIGITAL CHANNEL PROCESSOR; (4) generating local replica of the P-code modulated on L1 carrier frequency signal by the DIGITAL CHANNEL PROCESSOR; wherein said locally generated replica of L1 signal does not contain propagation noise; (5) extracting of an estimate of the Y code from the L1 signal, and from the L2 signal by the DIGITAL CHANNEL PROCESSOR; wherein the estimate signals contain propagation noise; (6) correlating a locally generated replica of C/A-code with the received L1 code for obtaining an estimate of L1 group delay ( L1 pseudo-range) and L1 carrier phase; (7) removing the P-code from the locally extracted estimate of the L1 Y code by the CHANNEL PROCESSOR to obtain a locally extracted estimate of the L1 W-code; (8) removing the P-code from the locally extracted estimate of the L2 Y code by the CHANNEL PROCESSOR to obtain a locally extracted estimate of the L2 W-code; and (9) correlating the locally extracted estimate of the L1 W-code with the locally extracted estimate of the L2 W-code to obtain relative offset in group delay between L1 and L2 signals and for obtaining an independent estimate of L2 carrier phase by the CHANNEL PROCESSOR.

The step of receiving L1 and L2 satellite signals further comprises the steps of: (1) receiving said L1 and L2 satellite signals by the dual frequency patch ANTENNA; (2) performing filtering and low noise amplification of the L1 and L2 signals by the FILTER/low noise AMPLIFIER (LNA), wherein the FILTER/LNA determines the noise/signal ratio of the received signals L1 and L2 ; (3) mixing and converting the L1 and L2 signals by the DOWNCONVERTER; (4) transforming the converted L1 and L2 signals into digitally sampled quadrature versions of L1 and L2 signals (IL1 , QL1 , IL2 , QL2 ) by the IF PROCESSOR; and (5) generating several timing signals by the FREQUENCY SYNTHESIZER.

The method further includes the steps of: (1) tracking L1 C/A-code when Y code is ON and tracking L1 P-code when Y code is OFF by the L1 TRACKER; (2) tracking an enhanced cross correlated W-code when Y code is ON and tracking L2 P-code when Y code is OFF by the L2

TRACKER; and (3) feeding the MICROPROCESSOR system by output signals from the L1 TRACKER and the L2 TRACKER.

The step of tracking L1 C/A-code when Y code is ON and tracking L1 P-code when Y code is OFF by the L1 TRACKER further comprises the steps of: (1) feeding the L1 TRACKER by digitized inphase IL1 and quadrature QL1 of L1 signal generated by the IF PROCESSOR; (2) synchronously clocking the L1 TRACKER by the SCLK signal outputted by the FREQUENCY SYNTHESIZER; (3) synchronously referencing the L1 TRACKER by the MSEC signal outputted by the FREQUENCY SYNTHESIZER to local reference time; (4) feeding the L1 TRACKER by control signal from the MICROPROCESSOR; (5) providing a locally generated replica of C/A code and locally generated replica of P-code by the CODE GENERATOR; (6) selecting a locally generated code C/A when Y code is ON and selecting a locally generated P-code when Y code is OFF by the MULTIPLEXER 1; (7) generating inphase and quadrature components of digital carrier by the CARRIER NCO 1; (8) generating inphase IL1 and quadrature QL1 signals having zero carrier frequency by mixing digitized inphase IL1 and QL1 signals having carrier frequency with inphase and quadrature components of digital carrier by the CARRIER MIXER 1; (9) performing code correlation of the inphase IL1 and quadrature QL1 signals with the locally generated replica of C/A code by the CODE MIXER 1 at 3 time points (early, punctual and late) on the autocorrelation function graph creating an early, a punctual and a late sample of the autocorrelation function; (10) integrating the early, punctual and late samples of said autocorrelation function by the block CORRELATORS 1; (11) feeding the MICROPROCESSOR system by an output signal of the CORRELATORS 1 at a rate of L1 C/A code epoch, wherein the MICROPROCESSOR uses the CORRELATORS 1 output signal to develop feedback signals for the carrier tracking loop and for the code tracking loop; (12) providing a clocking signal at C/A code rate and a clocking signal at P code rate by the code numerically controlled oscillator (CODE NCO); (13) driving the CODE GENERATOR by the C/A code clocking rate and the P code clocking rate; (14) providing a mechanism for alignment of the locally generated replica of C/A code with the incoming satellite C/A code by the CODE NCO; (15) generating an estimate of L1 W code by removing the local replica of L1 P code from the estimate of L1 Y code by the CODE MIXER 2; (16) delaying the L1 W code estimate by the DIGITAL DELAY 1 under the MICROPROCESSOR system control; (17) reducing the bandwidth of the L1 W code estimate by the DIGITAL FILTER 1; (18) sending the delayed and filtered L1 W code estimate to the L2 TRACKER; (19) delaying the P code output from the CODE GENERATOR by the DIGITAL DELAY 2; (20) sending the delayed P code to the L2 TRACKER; (21) altering the resulting delay by the RESOLVER; and (22) sending the L1 C/A code epoch (EP) to the L2 TRACKER.

The step of tracking an enhanced cross correlated W code when Y code is ON and tracking L2 P-code when Y code is OFF by the L2 TRACKER further comprises the steps of: (1) feeding the L2 TRACKER by digitized inphase IL2 and quadrature QL2 of L2 signal outputted by the IF PROCESSOR; (2) synchronously clocking the L2 TRACKER by the SCLK signal outputted by the FREQUENCY SYNTHESIZER; (3) synchronously referencing the L2 TRACKER by the MSEC signal outputted by the FREQUENCY SYNTHESIZER to local reference time; (4) feeding the L2 TRACKER when Y code is ON by the L1 P-code, the filtered estimate of L1 W code, and the C/A EP code generated by the L1 TRACKER; (5) feeding the L2 TRACKER by control signal from the MICROPROCESSOR; (6) generating IL2 and QL2 signals having carrier frequency by the CARRIER NCO MEANS 2; (7) generating inphase IL2 and quadrature QL2 signals having zero carrier frequency by mixing the digitized inphase IL2 and quadrature QL2 signals having carrier frequency with the inphase and quadrature components IL2 and QL2 of digital carrier generated by the CARRIER MIXER 2, wherein when L2 carrier tracking loop is locked via said CARRIER NCO 2 the generated IL2 output contains an estimate of L2 Y code and the generated QL2 output contains no signal power; (8) performing code correlation of the IL2 and QL2 having zero frequency signals with outputted by the L1 TRACKER P1 code by the CODE MIXER 3; wherein P1 code represents a locally generated replica of L2 P-code; (9) generating an I estimate of L2 W code and a Q estimate of L2 W code by the CODE MIXER 3; (10) reducing the bandwidth of the I estimate of L2 W code by the DIGITAL FILTER 2; (11) reducing the bandwidth of the Q estimate of L2 W code by the DIGITAL FILTER 3; (12) performing code correlation of the I estimate of L2 W code and the Q estimate of L2 W code with the estimate of L1 W code by the CODE MIXER 4 at 3 time points (early, punctual and late) on the autocorrelation function graph creating an early, a punctual and a late sample of the autocorrelation function; (13) performing code correlation of the I estimate of L2 W code and the Q estimate of L2 W code with the P1 code by the CODE MIXER 5; wherein the P1 code represents a locally generated replica of L2 P code; and wherein the CODE MIXER 5 performs the code correlation at 3 time points (early, punctual and late) on the autocorrelation function graph creating an early, a punctual and a late sample of the autocorrelation function; (14) selecting under the control of MICROPROCESSOR by the MULTIPLEXER 2 the mode of operation when Y code is ON and OFF; and wherein when Y code is OFF and satellite transmits the P code on L2 the MICROPROCESSOR selects the output of CODE MIXER 5; and wherein when Y code is ON the MICROPROCESSOR selects the output of CODE MIXER 4; (15) integrating early, punctual and late samples of the autocorrelation function by the block CORRELATORS 2; and (16) feeding the MICROPROCESSOR by output signals of the CORRELATORS 2, wherein the MICROPROCESSOR uses the CORRELATORS 2 output signals to develop feedback signals for the carrier tracking loop and for the code tracking loop.

Yet one more aspect of the present invention is directed to the methods of acquisition and to the method of tracking of the satellite signals L1 and L2.

The method of acquisition comprises the steps of: (1) locking L1 C/A code tracking loop the MICROPROCESSOR; (2) locking L1 C/A carrier tracking loop by the MICROPROCESSOR; (3) computing the L2 carrier frequency aiding term by the MICROPROCESSOR using the value of L1 frequency; (4) applying the L2 frequency aiding term to CARRIER NCO 2; wherein the L1 and L2 satellite signals are separated in time by ionospheric delay; (5) adjusting the DIGITAL DELAY 1 and the DIGITAL DELAY 2 to compensate for the ionospheric delay between the L1 and said L2 signals until power is found in the L2 CORRELATORS 2; (6) locking the L2 carrier tracking loop using the MICROPROCESSOR; and (7) locking the L2 code tracking loop using the MICROPROCESSOR.

The method of tracking of the satellite signals L1 and a L2 includes the steps of: (1) reading the L1 CORRELATORS and the L2 CORRELATORS by the MICROPROCESSOR; (2) forming the L1 code tracking loop and applying the output to the CODE NCO; (3) forming the L1 carrier tracking loop and applying the output to the CARRIER NCO 1; (4) computing the L2 frequency aiding term; (5) forming the L2 code and carrier tracking loop and applying the output to the DIGITAL DELAY 1, DIGITAL DELAY 2, and CARRIER NCO 2; (6) performing the L1 and L2 carrier phase measurements by reading CARRIER NCO 1's output phase and CARRIER NCO 2's output phase at a chosen MSEC reference time; and (7) performing the L1 and L2 code phase measurements by keeping track in the MICROPROCESSOR of what shifts have been applied to the CODE NCO and DIGITAL DELAY 1 and DIGITAL DELAY 2 respectively.

Yet another aspect of the present invention is directed to a system for optimum correlation processing of L1 and L2 signals received from at least one SPS satellite by a SPS RECEIVER. The system includes an n-bit RECEIVER, n being integer, comprising an n-bit A/D CONVERTER for receiving a known C/A code modulated on L1 carrier frequency, for receiving an unknown Y code modulated on L1 carrier frequency signal, and for receiving an unknown Y code modulated on L2 carrier frequency signal, wherein the received L1, and L2 signals contain propagation noise; and wherein the Y code comprises a known P code and an unknown W code; and at least one n-bit DIGITAL CHANNEL PROCESSOR for: (1) locally generating replica of the C/A code modulated on L1 carrier frequency signal; (2) locally generating replica of the P code modulated on L1 carrier frequency signal, wherein the locally generated replica of L1 signal does not contain propagation noise; (3) extracting of an estimate of the Y code from the L1 signal, and from the L2 signal, wherein the estimate signals contain propagation noise; (4) correlating a locally generated replica of C/A code with the received L1 code for obtaining an estimate of L1 group delay (L1 pseudo-range) and L1 carrier phase; (5) removing the P code from the locally extracted estimate of the L1 Y code to obtain a locally extracted estimate of the L1 W code; (6) removing the P code from the locally extracted estimate of the L2 Y code to obtain a locally extracted estimate of the L2 W code; and (7) correlating the locally extracted estimate of L1 W code with the locally extracted estimate of L2 W code to obtain relative offset in group delay between L1 and L2 signals and for obtaining an independent estimate of L2 carrier phase; wherein using the n-bit RECEIVER comprising an n-bit A/D CONVERTER and the n-bit DIGITAL CHANNEL PROCESSOR reduces quantization noise as compared to using a one-bit RECEIVER comprising a one-bit A/D CONVERTER and a one-bit DIGITAL CHANNEL PROCESSOR.

One more aspect of the present invention is directed to the method for optimum correlation processing of L1 and L2 signals received from at least one SPS satellite by a correlation processing system; wherein the system includes an n-bit RECEIVER and at least one n-bit DIGITAL CHANNEL PROCESSOR, n being an integer; and wherein using the n-bit RECEIVER and the n-bit DIGITAL CHANNEL PROCESSOR reduces quantization noise as compared to using a one-bit RECEIVER and a one-bit DIGITAL CHANNEL PROCESSOR.

BRIEF DESCRIPTION OF THE DRAWINGS.

FIG. 1 illustrates a simplified block-diagram of the W code enhanced GPS RECEIVER having two major parts—a RECEIVER and a DIGITAL CHANNEL PROCESSOR.

FIG. 2 shows a FILTER/low noise amplifier LNA for filtering and amplifying L1 and L2 signals.

FIG. 3 depicts a MASTER OSCILLATOR for generating timing signals with reference frequency 10 MHz and 5 MHz.

FIG. 4 illustrates a FREQUENCY SYNTHESIZER for outputting a 1st LO1 (local oscillator) signal 1400 MHz, a 2nd LO2 signal 175 MHz, a (sampling clock) SCLK signal 25 MHz, and a MSEC (millisecond) signal used by the system as a measurement of local reference time.

FIG. 5 shows a DOWNCONVERTER for converting a L1 signal into a 175.42 MHz signal and for converting a L2 signal into a 172.4 MHz signal.

FIG. 6 is an illustration of a IF (intermediate frequency) PROCESSOR for generating digitized output samples of the GPS signals with carrier frequencies of 420 KHz and 2.6 MHz respectively.

FIG. 7 depicts a DIGITAL CHANNEL PROCESSOR including an L1 TRACKER, an L2 TRACKER, and a MICROPROCESSOR SYSTEM.

FIG. 8 shows a L1 TRACKER for tracking L1 C/A code when Y code is ON.

FIG. 9 illustrates a L2 TRACKER for facilitating the combining of an estimate of the L1 W code with an estimate of the L2 W code.

FIG. 10a is a depiction of a first CARRIER (numerically controlled oscillator) NCO 1 for performing the carrier phase measurements of L1 signal.

FIG. 10b is an illustration of a second CARRIER (numerically controlled oscillator) NCO 2 for performing the carrier phase measurements of L2 signal.

FIG. 11a shows a first CARRIER MIXER 1 for mixing the sampled signal L1 at 420 kHz frequency to baseband frequency.

FIG. 11b illustrates a second CARRIER MIXER 2 for mixing the sampled signals L2 at 2.6 MHz frequency to 0 Hz frequency.

FIG. 12a depicts a first CODE MIXER 1 for correlating the L1 C/A code with a locally generated version of the C/A code.

FIG. 12b is an illustration of a second CODE MIXER 2 for mixing the L1 Y code with a locally generated version of the P code.

FIG. 12c is a depiction of a third CODE MIXER 3 for removing the P code from the estimated L1 Y code by mixing the estimated L1 Y code with a local replica of the known L1 P code.

FIG. 12d shows a fourth CODE MIXER 4 for code correlating the I and Q versions of the L2 signal with the E, P, and L samples of the locally generated estimate of the W1 code.

FIG. 12e illustrates a fifth CODE MIXER 5 for code correlating the I and Q versions of the L2 signal with the locally generated estimate of the L2 P code (P1 code).

FIG. 13 depicts a CODE GENERATOR for generating a signal P1 which can be used by the L2 TRACKER to remove P code from the estimated L2 Y code to produce an estimate of the L2 W code.

FIG. 14a shows a DIGITAL DELAY 1 for bringing the filtered L1 and L2 W code estimates into alignment to measure the range offset between L1 and L2 signals.

FIG. 14b illustrates a DIGITAL DELAY 2 for providing the delay of the P code output of the CODE GENERATOR which is used as P1 code by the L2 TRACKER.

FIG. 15a depicts a DIGITAL FILTER 1 for reducing the bandwidth of the L1 W code estimate to less than 12.5 MHz.

FIG. 15b shows a DIGITAL FILTER 2 for reducing the bandwidth of the I estimate of the L2 W code.

FIG. 15c is an illustration of a DIGITAL FILTER 3 for reducing the bandwidth of the Q estimate of the L2 W code.

FIG. 16a depicts a block CORRELATORS 1 for integrating the early, punctual and late samples of the autocorrelation function of the L1 C/A code (or L1 P code) signal over the period of the L1 C/A code epoch signal (1 KHz).

FIG. 16b shows a block CORRELATORS 2 for integrating the early, punctual and late samples of the autocorrelation function of the I and Q versions of the correlation between filtered estimates of L1 and L2 W codes over the period of the L1 C/A code epoch signal (1 KHz).

FIG. 17 illustrates a CODE NCO (numerically controlled oscillator) for providing a clock at C/A and P code rates that drives the CODE GENERATOR.

FIG. 18a depicts an ACQUISITION block diagram illustrating the signal acquisition phase of the MICROPROCESSOR SYSTEM.

FIG. 18b shows a TRACKING block diagram illustrating the signal tracking phase of the MICROPROCESSOR SYSTEM.

FIG. 19 illustrates a RESOLVER block for improving the hardware resolution of the L1 to L2 hardware range measurements.

FIG. 20a depicts an abstract direct form transfer function representation of the FIR or IIR DIGITAL FILTER.

FIG. 20b is an illustration of an abstract cascade form transfer function representation of the FIR or IIR DIGITAL FILTER.

FIG. 20c shows an abstract parallel form transfer function representation of the FIR or IIR DIGITAL FILTER.

FIG. 21 illustrates a circuit representation of a FIR DIGITAL FILTER.

FIG. 22 depicts a circuit representation of an IIR DIGITAL FILTER.

FIG. 23 shows the observed W-code timing characteristics.

FIG. 24 illustrates the W-code frequency spectrum.

FULL DESCRIPTION OF THE PREFERRED EMBODIMENT.

FIG. 1 illustrates a block diagram 10 of the GPS RECEIVER capable of optimum demodulating the L2 signal modulated by the secret W code which is the subject of the present invention. The signal L2 is generated by at least one satellite. Each satellite generate different signals and they are processed by different DIGITAL CHANNEL PROCESSORS, which operate exactly the same way.

FIG. 1 is an overview of the GPS receiver, all elements of which are explained in detail below. The GPS signals (L1=1575.42 MHz, L2=1227.60 MHz) enter through a dual frequency patch ANTENNA 12. The GPS ANTENNA may be a magnetically mountable model 21423-00 commercially available from Trimble Navigation of Sunnyvale, Calif. The MASTER OSCILLATOR 28 provides the reference oscillator which drives all other clocks in the system. The FREQUENCY SYNTHESIZER 18 takes the output of the MASTER OSCILLATOR and generates important clock and local oscillator frequencies used throughout the system.

A FILTER/LNA 14 performs filtering and low noise amplification of both L1 and L2 signals. The noise figure of the RECEIVER system is dictated by the performance of the FILTER/LNA combination. The DOWNCONVERTER 16 mixes both L1 and L2 signals in frequency down to approximately 175 MHz and outputs the analogue L1 and L2 signals into an IF PROCESSOR 30. The IF PROCESSOR takes the analog L1 and L2 signals at approximately 175 MHz and converts them into the digitally sampled L1 and L2 inphase and quadrature signals at carrier frequencies 420 KHz for L1 and at 2.6 MHz for L2 signals respectively.

At least one DIGITAL CHANNEL PROCESSORS 32 input the digitally sampled L1 and L2 inphase and quadrature signals. All DIGITAL CHANNEL processors are identical by design and operate on identical input samples. Each DIGITAL CHANNEL PROCESSOR is designed to digitally track the L1 and L2 signals produced by one satellite by tracking code and carrier signals and to from code and carrier phase measurements in conjunction with the MICROPROCESSOR SYSTEM 34. One DIGITAL CHANNEL PROCESSOR is capable of tracking one satellite in both L1 and L2 channels. MICROPROCESSOR SYSTEM is a general purpose computing device which facilitates tracking and measurements processes, providing pseudorange and carrier phase measurements for a NAVIGATION PROCESSOR 38. The NAVIGATION PROCESSOR performs the higher level function of combining measurements in such a way as to produce position, velocity and time information for the differential and surveying functions.

FIG. 2 shows the detailed embodiment of the FILTER/LNA 40. The L1/L2=signal from the ANTENNA 12 is power split by POWERSPLITTER 44 into L1=1575.42 MHz signal 46 and L2=1227.60 MHz signal 48. The L1 and L2 signals are separately bandpass filtered by the BANDPASS FILTERs 50 and 52 with bandwidth BW=30 MHz. Filtered L1 signal 54 and L2 signal 56 are recombined in a POWER COMBINER 58 before being fed into the low noise amplifier LNA 60. The output signal 62 represents filtered and amplified L1/L2 signal at 1575.42 MHz and 1227.60 MHz respectively.

The MASTER OSCILLATOR 70 is depicted in FIG. 3. The 5 MHz signal 76 is obtained by dividing the 10 MHz oscillator output signal 72 by 2 in the DIVIDE BY 2 block 74.

FIG. 4 illustrates the FREQUENCY SYNTHESIZER 80 which takes as an input the 5 MHz signal 82 provided by the MASTER OSCILLATOR and outputs a 1st LO1 signal 90, a 2nd LO2 signal 102, a SCLK signal 100, and a MSEC signal 104; wherein these timing signals are used by different blocks of the GPS RECEIVER.

The 5 MHz signal 82 is compared with the 5 MHz signal output from a block "DIVIDE BY 5" in a PHASE DETECTOR 84. The voltage output from the PHASE DETECTOR represents phase alignment of two 5 MHz signals and includes two signals, wherein the first of these signals has a large phase error and represents a large voltage output; and wherein the second of these signals has a small phase error and represents a small voltage output. A LOOP FILTER 86 filters out the high frequency voltage noise signal having a large phase error and outputs the low frequency noise signal 87 having a small phase error which is applied to a voltage controlled oscillator (VCO) 88. The low frequency noise signal 87 causes frequency change in the VCO output signal 90. When the loop is locked, the VCO output signal having a 1400 MHz frequency is used as the 1st LO1(local oscillator) signal. By dividing the 1st LO1signal by 8, a block 92

"DIVIDE BY 8" outputs the 2nd LO2local oscillator signal 102 having 175 MHz. A block 94 "DIVIDE BY 7" divides the LO2 signal and outputs the sampling clock (SCLK) signal 100 having 25 MHz. A block 98 "DIVIDE BY 25000" further divides the SCLK signal and outputs the MSEC signal 104 having 1 KHz which is used by the system for measurement of local reference time. A "DIVIDE BY 5" block 96 is used to close the LO1loop.

The DOWNCONVERTER 110 is depicted in detail in FIG. 5 which decreases the frequency of the L1/L2 signal outputted by the FILTER/LNA The L1/L2 signal output 62 from the FILTER/LNA shown in FIG. 2 (L1=1575.42 MHz; L2=1227.60 MHz) is split in a POWER SPLITTER 116 into two signals L1 signal 118 and L2 signal 120. The L1 and L2 signals are mixed separately by the 1st LO1 1400 MHz signal 90 ( outputted by the FREQUENCY SYNTHESIZER in FIG. 4) in the MIXERs 122 and 124. The L1 signal 118 after mixing becomes an L1 signal 123 signal having 175.42 MHz frequency=(1575.42–1400) MHz which is bandpass filtered by the BANDPASS FILTER 126 having a bandwidth BW=30 MHz. This operation results in a L1 signal having a BW=30 MHz. Similarly, the L2 signal after being mixed in the BANDPASS FILTER 128 with BW=30 MHz becomes an L2 signal 132 having 172.40 MHz frequency and BW=30 MHz. The AMPLIFIERs 134 and 136 respectively amplify the L1 signal 130 and L2 signal 132 and output L1 signal 138 and L2 signal 140.

FIG. 6 describes an IF (intermediate frequency) PROCESSOR which has as input signals the L1 (175.42 MHz) signal 138 and the L2 (172.4 MHz) signal 140 outputted by the DOWNCONVERTER 110.(See FIG. 5). The IF PROCESSOR also uses the 2nd. LO2 signal 102 and the SCLK signal 100 outputted by the FREQUENCY SYNTHESIZER 80 (see FIG. 4) as its timing signals. The POWERSPLITTERs 142 and 170 split the L1 and the L2 signals into two L1 and L2 signals respectively. The inphase (I) version 102 and generated by a 171 block 90° the quadrature (Q) version 173 (175) of the 2nd LO2 signal (175 MHz) are multiplied by the L1 signal in the MULTIPLIERs 144, and 146 to produce the inphase version IL1 and the quadrature version QL1 of the L1 signal at frequency 420 KHz=175.42 MHz– 175 MHz and at 25 MHz sampling rate. Similarly, the inphase IL2 and the quadrature QL2 versions of the L2 signal at frequency 2.6 MHz=(175 MHz–172.4 MHz) and at 25 MHz sampling rate are generated in the MULTIPLIERS 172 and 174. The IL1 signal is lowpass filtered by a LOWPASS FILTER 148 with the BW=12.5 MHz which satisfies the Nyquist Theorem for 25 MHz sampling rate of the IL1 signal, amplified by an AMPLIFIER 152, converted by an A/D CONVERTER 156, and sampled by clocking the input signal 157 through a 160 FLIP-FLOP 1 at sampling clock (SCLK) rate. The A/D conversion can be performed by using an L-bit quantization operation, L being an integer greater or equal to 1. If L=1, the 1-bit quantization is performed and the output signal 164 contains only the Most Significant Bit (MSB) of the IL1 signal at 420 KHz. The QL1 signal is similarly processed by a LOWPASS FILTER 150, an AMPLIFIER 154, an A/D CONVERTER 158, and a FLIP-FLOP 2, wherein the output 166 signal is a digitized QL1 signal at 420 KHz. The L2 signal is being processed by a LOWPASS FILTER 176 (178) an AMPLIFIER 180 (182), an A/D CONVERTER 184 (186), and a 188 (190) FLIP-FLOP 3(4) respectively to produce an inphase version IL2 ( quadrature version QL2 ) of the output signal 192 (194) at 2.6 MHz. Thus, the digital output of IF PROCESSOR block are the sampled versions of GPS signal with carrier frequencies of 420 KHz and 2.6 MHz respectively. The samples include all visible satellite carrier and codes at the respective frequencies.

A DIGITAL CHANNEL PROCESSOR 202 (the number of channels is equal to the number of satellites that are available for reception by the GPS ANTENNA) given in FIG. 7 includes two main subprocessors: an L1 TRACKER 204 and an L2 TRACKER 206 which are controlled by the MICROPROCESSOR SYSTEM 218. The inputs represent the digital signals IL1 164, IL2 192, QL1 166, and QL2 194 outputted by the IF PROCESSOR as shown in FIG. 6. The timing signals SCLK 100 and MSEC 104 are supplied by the FREQUENCY SYNTHESIZER 80 as depicted in FIG. 4. The L1 TRACKER 204 is designed to track L1 C/A code when Y code is ON (and to track L1 P code when Y code is OFF). The L2 TRACKER 206 is designed to track the enhanced W code cross correlation when Y code is ON (and to track L2 P code when Y code is OFF). Operation of the L2 TRACKER is dependent on three signals P1 208, W1 210, and EP 212 outputted by the L1 TRACKER when Y code is ON, wherein the P1 signal is a locally generated L1 P code, the W1 signal is a filtered estimate of L1 W code signal, and the EP signal is a C/A code epoch from an L1 C/A CODE GENERATOR. All signals in each digital channel processor are clocked synchronously with the sampling clock SCLK 100. MSEC signal 104 is used to synchronize each digital channel processor's measurements to local reference time. The MICROPROCESSOR SYSTEM 218 coordinates the performance of the L1 TRACKER and the L2 TRACKER by employing control signals 216, 214, and 220.

The L1 TRACKER 204 (see FIG. 7) designed for tracking L1 C/A code when Y code is ON and L1 P code when Y code is OFF is given in FIG. 8. The principles of the GPS signal tracking and acquisition are described in the article authored by J. J. Spilker and entitled "GPS Signal Structure and Performance Characteristics", pp 47–53, published in Global Positioning System, Vol. I, by The Institute of Navigation, 1980, Alexandria, Va. This article is incorporated herein by reference.

The RECEIVER can track the received GPS signals having very low signal levels by using a Delay-Lock Loop. The essential element of the Delay-Lock Loop is the block 262 CORRELATORS 1, wherein the received code is multiplied by a reference code having a time offset τ<T; T being a code chip interval. The code correlation is performed at 3 time points (E-early, P-punctual and L-late) on the autocorrelation function graph. The E, P, and L samples of the autocorrelation function are integrated in the block CORRELATOR 1. However, the CORRELATORs 1 output itself is not sufficient for code tracking because it does not provide an indication of the sign of the delay error of a tracking reference signal. Therefore, in the Delay-Lock Loop the outputs of the E and L correlation are subtracted to form a correlation signal. This correlation signal in the DIGITAL CHANNEL PROCESSOR becomes a number signal which is used to drive a numerically-controlled oscillator (the block 270 CODE NCO) or clock. This clock CODE NCO in turn drives the CODE GENERATOR 268 in such a manner that if the clock is lagging in phase, the correction signal drives the clock faster and the reference code speeds up and runs in coincidence with the received signal. Thus, the reference code is tracking the received code. The epoch time ticks are then a measure of the received signal time. The RECEIVER also contains a coincident or punctual (P) channel.

If the received signal delay increases suddenly because of user platform motion the delay error increases momentarily and the correction signal increases from zero. The reference code then slows down and increases its delay until it matches the received signal at which point the correction signal decreases to zero again. Thus, given an initial small error and sufficiently slow dynamics of delay change relative to the filter bandwidth, the Delay-Lock-Loop will track the incoming signal. Once the code tracking has been accomplished by the Delay-Lock-Loop, the BPSK satellite signal data at 50 bps can be recovered by the punctual channel (P).

The satellite signal acquisition should be accomplished before the signal tracking is accomplished. The tracking performance discussion of the GPS signals has assumed that somehow the reference code tracking error has been decreased to less than+1 code chip error. Initially the user RECEIVER may have little knowledge of its exact position and there may be a significant uncertainty as to the relative Doppler effect. With the C/A code there are a limited number, 1023, of code chips in the period; hence even with no initial knowledge of position relative to the satellite, one need only search a maximum of 1023 code chips. If acquisition of the C/A code of one satellite can be accomplished within acquisition time T, then the total acquisition time for 4 satellites can be 4T if a single RECEIVER is time sequenced over the four satellites.

Referring again to FIG. 8, the locally generated code (C/A when Y code is ON, and P code when Y code is OFF) is selected under the control of the 264 MULTIPLEXER 1. The 244 CARRIER NCO 1 has output inphase I signal 248 and quadrature Q signal 250 which are inphase and quadrature digital carrier at a rate which is phase locked to incoming signals via MICROPROCESSOR control of its output frequency. The input sampled signals IL1 164 and QL1 166 (at carrier frequency 420 KHz) are sent to the 246 CARRIER MIXER 1 which uses the output signals I 248 and Q 250 from the CARRIER NCO 1 to perform the frequency translation of the IL1 and QL1 signals from 420 KHz to baseband frequency. Thus, the carrier frequency is removed at this stage. The CARRIER NCO 1 block also performs the carrier phase measurements on the edge of MSEC signal 104. The output samples of the CARRIER MIXER 1 ( I signal 252 and Q signal 254) and a locally generated by a CODE GENERATOR 268 replica of C/A code 263 are fed to a 256 CODE MIXER 1 which performs the code correlation.

When the carrier tracking loop is closed (via CARRIER NCO 1) and Y code is ON, the L1 TRACKER 204 is locked to the L1 C/A code satellite signal. Thus, the I input 252 to the 256 CODE MIXER 1 represents the satellite signal L1 C/A code, and the Q input 254 to the CODE MIXER 1 represents L1 Y code signal. When Y code is OFF, the CARRIER MIXER 1 outputs the L1 P code signal in its I channel 252, and outputs L1 C/A code in its Q channel 254. The CODE MIXER 1 performs correlation of the L1 C/A code in I channel and L1 Y code in Q channel with a locally generated version of the C/A code (when Y code is ON), or performs correlation of the L1 P code in I channel and L1 C/A code in Q channel with a locally generated P code ( when Y code is OFF). The result is the autocorrelated function of the C/A code in I channel 258 and noise in Q channel 260 when Y code is ON, and the autocorrelated function of the P code in I channel 258 and noise in Q channel 260 when Y code is OFF. The code correlation is performed at 3 time points (E-early, P-punctual and L-late) on the autocorrelation function graph. The E, P, and L samples of the autocorrelation function 258 and 260 are integrated in the block 262 CORRELATORS 1. The block CORRELATORS 1 is read by the MICROPROCESSOR SYSTEM 263 at a rate of 1 KHz, which is the rate of the L1 C/A code epoch. (The L1 C/A code epoch is the rate at which C/A code repeats itself). The correlator values are used by the MICROPROCESSOR SYSTEM to develop feedback for the carrier tracking loop via CARRIER NCO 1 and code tracking loop via CODE NCO.

The CODE NCO 270 provides the clock at C/A code rate when Y code is ON, and at P code rate when Y code is OFF, that drives the CODE GENERATOR 268. The CODE NCO also provides the mechanism by which the local code can be shifted into alignment with the incoming satellite code to achieve the code tracking loop lock.

When the LI TRACKER is locked to L1 C/A code, the Q output 251 of the CARRIER MIXER 1 represents an estimate of the L1 Y code which is fed to a CODE MIXER 2 (278). The CODE MIXER 2 removes P code from the estimated L1 Y code by mixing it with a local replica of the known L1 P code. The output 277 of the CODE MIXER 2 thus represents an estimate of the L1 W code having a bandwidth (BW) of 12.5 MHz. A DIGITAL FILTER 1 (274) takes this L1 W code estimate signal and reduces the BW to approximately 250 kHz. Thus, the output signal 210 from the DIGITAL FILTER 1 represents a filtered estimate of the L1 W code with the reduced BW. A DIGITAL DELAY 1 (276) is used to delay under the MICROPROCESSOR SYSTEM control the filtered L1 W code estimate so that it becomes aligned in time with the filtered L2 W code estimate formed in the L2 TRACKER ( see discussion below). The delay created by the DIGITAL DELAY 1 which is sufficient to bring the filtered L1 and L2 W code estimates into alignment represents a measurement of the range offset between L1 and L2 signals. If the resolution of the digital delay is limited to SCLK then the range resolution in hardware will be 12 meters which is the period of 25 MHz clock. The hardware resolution of this range is improved using a RESOLVER circuit 242.

The RESOLVER circuit provides an output signal 243 which can be used to create a resulting delay which is the combination of two delays, wherein each register provides a delay equal to the sample clock SCLK. The resulting delay is proportional to the relative time spent on each delay created by registers 1 and 2. (See FIG. 14a for the DIGITAL DELAY 1 and FIG. 14b for the DIGITAL DELAY 2).

EXAMPLE 1

If 50% of time is spent on delay from register 1 (one SCLK) and 50% time on delay from register 2 (two SCLK), then resulting delay will be (1SCLK+2SCLK)/2=1.5 SCLK.

The delayed and filtered L1 W code estimate 210 is outputted as signal W1 for processing by the L2 TRACKER. The CODE GENERATOR P code output 269 is delayed in DIGITAL DELAY 2 to provide a signal P1 (208) which can be used by the L2 TRACKER as its locally generated L2 P code for removing P code from the L2 Y code estimate and for producing an estimate of the L2 W code. The L1 C/A code epoch (EP) 212 is also sent to the L2 TRACKER for providing a timing signal for the L2 TRACKER's block CORRELATORS 2.

The L2 TRACKER 206 illustrated in FIG. 9 is designed to facilitate the combining of an estimate of the L1 W code with an estimate of the L2 W code, wherein the code and carrier tracking of the L2 signals is accomplished and the code and carrier measurements of the L2 signals are available.

Operation of CARRIER MIXER 2, CARRIER NCO 2, CODE MIXER 3 and 4, DIGITAL FILTERs 2 and 3, and CORRELATORS 2 are functionally equivalent to their L1 TRACKER's counterparts.

The CARRIER MIXER 2 (302) performs the frequency translation of the L2 signal. It takes the inphase I version of the L2 signal 198 and the quadrature version Q of the L2 signal 194 at carrier frequency 2.6 MHz generated by the IF PROCESSOR (as shown in FIG. 6). When the carrier tracking loop is locked, the CARRIER MIXER 2 outputs an IL2 signal 305 in a 12.5 MHz bandwidth. The Q output 306 contains no signal power when the L2 carrier tracking loop is locked. The CARRIER NCO MEANS 2 (300) provides the local oscillator for this frequency transition. The IL2 output 305 and the QL2 output 306 from the CARRIER MIXER 2 are fed into a CODE MIXER 3 (310) which performs the code correlation with P1 signal 208 (locally generated by the CODE GENERATOR of FIG. 8 estimate of the L2 P code). The output signals of CODE MIXER 3 represent I estimate 320 and Q estimate 322 of the L2 W code in a 12.5 MHz bandwidth, wherein the I estimate 320 is filtered in the DIGITAL FILTER 2 (324), and wherein the Q estimate 322 is filtered in the DIGITAL FILTER 3 (326). This filtering operation is identical to the operation performed on the estimate of L1 W code by the DIGITAL FILTER 1 (see FIG. 8). The filtered version in I(330) and Q (332) channels of the estimate of L2 W code having the reduced bandwidth are fed into a CODE MIXER 4 (328) where they are correlated with the estimate of L1 W code (W1 signal 210 generated by the L1 TRACKER as shown in FIG. 8). The output of the CODE MIXER 4 represents the I version 334 and the Q version 336 of the three samples E,P, and L of the correlation function between the filtered estimates of L1 and L2 W codes. The CODE MIXER 5 (308) performs the code correlation at 3 time points (E-early, P-punctual, and L-late) creating three samples of the correlation function between outputted by the CARRIER MIXER 2 signals in the channel I (305) and in the channel Q (306) with the P1 code 208 outputted by the L1 TRACKER.

A MULTIPLEXER 2 (318) selects under the control of the MICROPROCESSOR the mode of operation when Y code is ON and OFF. When Y code is OFF the MICROPROCESSOR selects the output of CODE MIXER 5, and when Y code is ON the MICROPROCESSOR selects the output of the CODE MIXER 4.

The signals outputted by the CODE MIXER 4 or 5 are integrated in the block 316 CORRELATORS 2 in the manner similar to the operation of the block CORRELATORS 1 in the L1 TRACKER described in FIG. 8 above. The CORRELATORS 2 is read by the MICROPROCESSOR SYSTEM 218 at a 1 KHz rate. The correlation sums (E, P, and L samples in the I and Q channels) are used by the MICROPROCESSOR SYSTEM to provide estimates of phases and to facilitate feedback signals for the code and carrier tracking loops.

FIG. 10a illustrates the CARRIER NCO 1 (244) used in the L1 TRACKER for removing the carrier frequency from the IL1 and QL1 signals. This device is described in the article "All-Digital GPS Receiver Mechanization" by Peter Ould and Robert VanWechel, pp. 25–35, "Global Positioning System", Vol. II, The Institute of Navigation, Alexandria, Va., 1984. This paper is incorporated herein by reference.

The CARRIER NCO 1 includes a 32-bit ACCUMULATOR 406 which is caused to overflow periodically at the desired output frequency. The ACCUMULATOR's L-top bits, L is an integer greater or equal to 1, can be used as the CARRIER NCO 1 output wave for producing a carrier mixing signal used by the CARRIER MIXER 1 (see FIG. 8) for frequency translation. The L=1 results in the relatively strong quantization noise produced by the one-bit approximation of the output sine wave. For all practical purposes, L=3 is sufficient to significantly reduce the quantization noise.

The satellite speed is not constant even if the RECEIVER is not movable. The RECEIVER's quartz clock is not precise enough and keeps changing all the time. Those are the two main reasons why the frequency of the received satellite signal keeps changing. To accommodate for those changes the MICROPROCESSOR keeps the carrier tracking loop locked by continuously adjusting the frequency word outputted by the CARRIER NCO.

The average CARRIER NCO 1 output frequency Four can be expressed as: $Fout=(Wc/2^n)Fc$; where Wc is the frequency word given by (B1 ... BL), Fc is the NCO clock frequency which is SCLK (25 MHz), n is the length of NCO frequency word in bits (a typical value might be 24 bits).

EXAMPLE 2

If we wish to generate the frequency Fout=420 KHz, we should use the frequency word: $Wc=(Fout*2^n)/Fc=(420$ KHz $* 2^{24})/25$ MHz=044D01(hex).

The value of Wc is being continuously adjusted by the MICROPROCESSOR SYSTEM to keep the carrier tracking loop locked.

The MICROPROCESSOR controls the CARRIER NCO frequency by latching in a new frequency word (B1 ... Bn) in a LATCH 1 (404). The frequency word (B1 ...Bn) is added to the previous CARRIER NCO 1 output sum (Q1 . . . Qn) on each sample clock (SCLK) 100. The L-top bits of the ACCUMULATOR output wave (Q1 ... QI) are used as the CARRIER NCO 1 output wave in the I channel 248.

The first two bits (R1R2) of the carrier Q output signal 432 are generated by a first ADDER 1 (414) by adding two bits (01) (428 and 430) to the two first bits S1 (424) and S2 (424) of the CARRIER NCO MEANS 1 output signal 407 (S1 . . . Sn). There are the following possibilities: (S1, 2)=(0,0)=0 degrees; (0,1)=90 degrees; (1,0)=180 degrees; (1,1)=270 degrees. A third LATCH 3 (416) generates a quadrature version Q of carrier output signal L1 (250) in the form of L-bit word (R1 R2 S3 . . . SL)=(M1 . . . ML) by clocking in at the rate of SCLK signal the 2-top bits (R1 R2) and the L–2 least significant bits (S3 . . . SL).

When the carrier tracking loop is locked, the output of the CARRIER NCO represents the phase of the local carrier which provides the phase lock with the satellite signal. The top m bits (C1 ... Cm) latched by a second LATCH 2 (412) on the MSEC timing signal represent a carrier phase measurement at this time. FIG. 10b illustrates the CARRIER NCO 2 (300 in FIG. 9) which functions in the same way as the discussed above CARRIER NCO 1.

The CARRIER MIXER 1 (246) shown in FIG. 11 a is used by the L1 TRACKER to perform the frequency translation of the IL1 signal (164) and QL1 signal (166) outputted by the IF PROCESSOR to the baseband frequency signals I (252) and Q (254) using the I (248) and Q (250) output frequency words of the CARRIER NCO 1 according to the standard complex mixing operation:

$$Iout=(IL1)*I+(QL1)*Q;\quad Qout=(IL1)*Q-(QL1)*I.$$

MULTIPLIERS (450, 452, 454 and 456) and ADDERS (458 and 460) are employed in the CARRIER MIXER 1 246 to perform these operations and to obtain the output signals Iout (252) and Qout (254). FIG. 11b illustrates the CARRIER MIXER 2 (300) employed by the L2 TRACKER to perform the same operation on the L2 signal.

The CODE MIXER 1 (256 in FIG. 8) depicted in FIG. 12a removes the code frequency from the satellite signals L1 and L2 and allows to demodulate the information contained in the L1 and L2 signals. The function of all CODE MIXERs is similar to the function of the CODE MIXER 1. The signals I (252) and Q (254) outputted by the CARRIER MIXER 1 are multiplied by the early (480), punctual (482), and late (484) samples of the locally generated by the CODE GENERATOR C/A code 263. This operation is performed by MULTIPLIERs 1 (490), (492), (494), (496), (498), and (500) resulting in the early (258,1), punctual (258,2) and late (258,3) samples of the I signal; and in the early (260,1), punctual (260,2) and late (260,3) samples of the Q signal. The operation of the CODE MIXER 5 shown in FIG. 12e is analogous to the operation of the CODE MIXER 1.

FIG. 12b illustrates the CODE MIXER 2 (278 in FIG. 8), wherein the incoming L1 Y signal 25 1 is multiplied with the locally generated L1 P code (279) by the MULTIPLIER 502 to produce the W code signal 277. The CODE MIXER 3 (310 in FIG. 9) is shown in FIG. 12c, wherein the outputted by the CARRIER MIXER 2 inphase I signal 305 and quadrature Q signal 306 is multiplied by the MUPTIPLIERs 504 and 506 with the P1 signal 208 outputted by the L1 TRACKER. FIG. 12d depicts the CODE MIXER 4 (328 in FIG. 9). The early sample 210,1 of the W1 signal outputted by the L1 TRACKER is multiplied by the MULTIPLIER 1 (508) with the I signal 330 produced by the DIGITAL FILTER 2 to generate the early sample of the I signal 334,1. The MULTIPLIERs 510, and 512 operate in the same way producing the punctual samples of I signal 334,2 and the late sample of I signal 334, 3. The early, punctual and late samples of the Q signal are produced by the MULTIPLIERs 514, 516, and 518.

The CODE GENERATOR ( 268 in FIG. 8) shown in FIG. 13 is employed by the L1 TRACKER to locally generate replica of the C/A code 265, replica of P code 269, and EPOCH signal 212 which are used for the purposes of code correlation. The input 271 of the CODE NCO 270 provides the clock and is a nominal 10.23 MHz- the P code rate. The input signal 271 is divided by 10 by the block DIVIDE BY 10 (520) to provide the C/A code generator clock at 1.023 MHz. The C/A CODE GENERATOR 522 and the P CODE GENERATOR 524 are the standard shift register sequences described in the "Interface Control Document" of Rockwell International Corporation entitled "Navstar GPS Space Segment/Navigation User Interfaces", dated Sep. 26, 1984, as revised Dec. 19, 1986, hereinafter referred to as the "ICD-GPS-200". The C/A code repeats every millisecond and produces a standard timing signal at this rate known as a timing signal for both CORRELATORS 1 and 2.

The DIGITAL DELAY 1 (276 in FIG. 8) given in FIG. 14a is employed by the L1 TRACKER for digitally delaying the L1 (1575.42 MHz) signal relatively to the L2 (1227.60 MHz) signal in order to compensate for the ionospheric delay. The L2 signal is delayed more by the ionosphere than L1 signal. Thus, to align L1 and L2 signals inside the RECEIVER it is sufficient to artificially delay L1.

The L1 W signal 277 can be delayed by different sampling clock delays as dictated by the MICROPROCESSOR SYSTEM. A SHIFT REGISTER (1 ,2, . . . k) 526 includes k different registers, k is an integer, wherein one register shifts the signal by one sample clock (25 MHz).

The DIGITAL DELAY 2 of FIG. 14b (272 in FIG. 8) has the same design as the DIGITAL DELAY 1. The DIGITAL DELAY 2 is used for delaying the L1 locally generated P code 279 by 2 sample clocks to obtain the clock signal P1 208 employed by the L2 TRACKER.

The DIGITAL FILTERs 1,2 and 3 are used in general to reduce the BW of the input signals (12.5 MHz) such that the output signals have the BW that is approximately equal to 700 KHz. The DIGITAL FILTER 1 (274 of FIG. 8) given in FIG. 15a is used to filter the estimate of the L1 W code 275. The output W signal (561) is given by: Wout=C1W1+ C2W2+ . . . +CxWx; wherein Cx is the Xth filter coefficient (558) and Wx is the Xth input which is the input W (275) shifted by X samples in the SHIFT REGISTER 550. The filter coefficients C1, C2, . . . Cx are multiplied by W1, W2, . . . Wn in the MULTIPLIERs 554, 556, . . . 558 respectively. The Wout signal 561 is reduced in sample frequency by a factor K by using a DIVIDE by K block 552. Early (210, 1), punctual (210,2) and late (210,3) samples of the estimated L1 W code signal are formed in the SHIFT REGISTER 562 using the Wout signal 561. The DIGITAL FILTER 2 (324) of FIG. 15b is similar to the DIGITAL CHANNEL 1, but only the single sample of the output signal 330 in the inphase I channel is formed. The DIGITAL FILTER 3 of FIG. 15c outputs the signal 332 in the Q channel.

The DIGITAL FILTERS 1, 2 and 3 can be implemented by using a finite impulse response (FIR) filters or infinite impulse response (IIR) filters. The complete discussion of the properties of FIR and IIR filters is given in the book "C Language Algorithms for Digital Signal Processing" by Paul M. Embree and Bruce Kimble, published by Prentice-Hall, Inc. in 1991 and incorporated herein by reference.

The digital filters are the special class of operators viewed in the frequency domain that might allow certain frequency components of the input signals to pass unchanged to the output while blocking other components. There are two broad classes of digital filters. According to the difference equation for a general operator:

$$y(n) = \Sigma_{q=0}^{Q-1} b(q) x(n-q) - \Sigma_{p=1}^{P-1} a(p) y(n-p); \qquad (1)$$

wherein x(n) is the stimulus for the operator and y(n) is the results or output of the operator. The first class of digital filters have a(0) equal to 0 for all p. The common name for filters of this type is finite impulse response (FIR) filters since their response to an impulse dies away in a finite number of samples:

$$y(n) = \Sigma_{q=0}^{Q-1} b(q) x(n-q). \qquad (2)$$

The second class of digital filters are infinite impulse response (IIR) filters. This class includes both autoregressive (AR) filters and the most general ARMA filters. In the AR case all b(q) for q=1 to Q−1 are set to 0:

$$y(n) = x(n) - \Sigma_{p=1}^{P-1} a(p) y(n-p). \qquad (3)$$

For ARMA filters, the general equation (1) applies. In either type of IIR filter, a single-impulse response at the input can continue to provide output of infinite duration with a given set of coefficients. Stability can be a problem for IIR filter since with poorly chosen coefficients the output can grow without bound for some inputs.

Comparing the general equation (2) for FIR filters with the convolution relation for linear operators:

$$y(n) = \Sigma_{m=0}^{\infty} h(m) x(n-m); \qquad (4)$$

one can see that the coefficients in an FIR filter are identical to the elements in the impulse response sequence if this impulse response is finite in length, $$b(q)=h(q) \text{ for } q=0, 1, 2, 3, \ldots, Q-1.$$

The frequency response of FIR filters can be investigated by using the transfer function developed for a general linear operator:

$$H(z) = Y(z)/X(z) = (\Sigma_{q=0}^{Q-1} b(q)z^{-q})/(1 + \Sigma_{p=1}^{P-1} a(p)z^{-p}) \quad (5)$$

Since for FIR filters the a(p) are all equal to 0, the equation becomes:

$$H(z) = Y(z)/X(z) = \Sigma_{q=0}^{Q-1} b(q)z^{-q}. \quad (6)$$

In many communication and image processing applications it is essential to have filters whose transfer functions exhibit a phase characteristic which changes linearly with a change in frequency. This characteristic is important because it is the phase transfer relationship which gives minimum distortion to a signal passing through the filter. A very useful feature of FIR filters is that for a simple relationship of the coefficients, b(q), like (b(0)=b(Q-1); b(1)=b(Q-2); and etc; the resulting filter is guaranteed to have linear phase response.

Repeating the general equation for IIR filters:

$$y(n) = \Sigma_{q=0}^{Q-1} b(q) x(n-q) - \Sigma_{p=1}^{P-1} a(p) y(n-p). \quad (7)$$

The z-transform of the transfer function of an IIR filter is:

$$H(z) = Y(z)/X(z) = (\Sigma_{q=0}^{Q-1} b(q)z^{-q})/(1 + \Sigma_{p=1}^{P-1} a(p)z^{-p}) \quad (8)$$

No simple relationship exists between the coefficients of the IIR filter and the impulse response sequence such as that which exists in the FIR case. Also, obtaining linear phase IIR filters is not a straight forward coefficient relationship as is the case for FIR filters. However, IIR filters have an important advantage over FIR structures: in general, IIR filters require less coefficients to approximate a given filter frequency response than do FIR filters. This means that results can be computed faster on a general purpose computer or with less hardware in a special purpose design.

Given the FIR or IIR equation for a filter, there are a number of implementation structures that can be used. Each structure, although mathematically equivalent, may produce different results due to numerical inaccuracies in the computer or special purpose hardware used.

The first structure for filter implementation as shown in FIG. 20a is a direct form implementation of the transfer function. This structure uses the z-transform equation of the filter transfer function and implements each delay and coefficient multiplication directly.

The direct form of the filter can be converted to a cascade form (as depicted in FIG. 20b) by factoring the transfer function into a set of functions whose product is the overall transfer function. In a similar manner, a partial fraction expansion can be performed on the transfer function to yield a set of functions whose sum is equal to the overall transfer function. This partial expansion leads to the parallel form of the digital filter as shown in FIG. 20c.

It is worth mentioning, that the digital filter can be implemented using the software design only. The disclosure of the present invention explicitly covers all possible software implementations of the digital filters available in the future. However, the hardware implementations of the DIGITAL FILTERS 1, 2, and 3 will be the focus of the following discussion.

FIG. 21 and FIG. 22 show the FIR and IIR DIGITAL FILTERS 1, 2 and 3 representations respectively. In FIG. 21 the unfiltered input, $X_{input}$ 275 is fed into a shift register 550 at a clocking rate of SCLK 100. The outputs of the shift register represent time delayed versions of the input, $X_{input}$ 275. For instance, X1 is delayed by one sample clock SCLK, X2 is delayed by two SCLK and so on. The overall function performed by the structure depicted in FIG. 21 is given as follows: $Y_{output}$=C1X1+C2X2+ . . . +CmXm. The C-values are the filter coefficients and the number of terms used in the filter is given by number m. When the filter is deigned the values of m, SCLK, and the C-values are chosen to give the required filter characteristics. The filter can be made adaptive by having multiple sets of m, SCLK, and C-values available, giving a different filter characteristic when each set is applied. They may be applied in sequence with the optimal filter giving the best signal-to-noise (STN) ratio. Thus, the SPS receiver can be made adaptive to changes in the satellite signals.

Once the frequency spectrum of W-code is discovered (see the observed W-code timing in FIG. 23 and the observed W-code frequency spectrum in FIG. 24), there is optimum bandwidth for the digital filter to optimize signal-to-noise (STN) ratio. The optimum bandwidth is the characteristic that matches W-code spectrum. The filter characteristics depend on the relationship between the SCLK, C-numbers, and the length m of the shift register used. By choosing the proper set of the filter characteristic m, SCLK, and C-values, the optimum SPS receiver can be designed that matches the W-code timing and spectrum characteristics for the best possible demodulation ( with the maximum STN) of the satellites signals.

In FIG. 22 the IIR implementations 274 of the DIGITAL FILTERS 1, 2 and 3 are illustrated. The delayed versions of the input signal X and the delayed versions of the output signal Y are formed. The delayed versions of the output signal Y1, Y2 , . . . Yn are multiplied by their respective coefficients B1, B2, . . . and Bn before being added with the delayed inputs X1 , X2, . . . Xm multiplied by the C1, C2, . . . Cm coefficients. This forms the feedback mechanism where previous outputs continue to influence future outputs. The overall function performed by the structure depicted in FIG. 22 is given as follows: $Y_{output}$=C1X1+C2X2 + . . . +CmXm+B1Y1+B2Y2+ . . . +BnYn.

Again, the filter characteristics are determined by SCLK, m, n, C-values, and B-values. The IIR filter can be made adaptive by having access to multiple sets of these values.

In general, to perform similar filtering characteristics, the FIR filter has greater m-value when compared to n- and m-values of IIR filter. However, the FIR filter is less sensitive to rounding errors in the C-coefficients as compared to C- and B-values of IIR filter. The FIR filter is a preferred embodiment because it has no feedback and therefore unconditionally stable.

The function of the CORRELATORS 1 (262 of FIG.8) given in FIG. 16a is to integrate the correlated samples IE (inphase early), IP (inphase punctual), IL (inphase late), QE (quadrature early), QP (quadrature punctual), and QL (quadrature late) of the L1 C/A (or P) satellite code with the locally generated version of C/A (or) P code across a time period given by a multiple of C/A EPOCH signals. The input sample IE (334,1) is integrated in an UP/DOWN COUNTER 630 across a period defined by the C/A EPOCH signal.212, wherein the COUNTER adds if the input is positive and subtracts if it is negative. At the end of the integration period the correlator summations are read by the MICROPROCESSOR using a LATCH 642. Each of the IP,IL,QE,QP,and QL samples is similarly integrated by a separate UP/DOWN COUNTER.

The resulting after integration values of IE,IL,QE, and QL are used by the code tracking loop by forming a code phase estimate=K1(IE–IL), when the carrier loop is locked, or by forming a code phase estimate=K1[$(IE^2+QE^2)^{1/2}-(IL^2+QL^2)^{1/2}$], when the carrier loop is not locked. K1 is a L1 code loop gain factor. The IP and QP are used by the carrier tracking loop which forms a carrier phase estimate= arctan(QP/IP). The block CORRELATORS 2 (316 of FIG. 9) given in FIG. 16b is functionally similar to the block CORRELATORS 1.

The CODE NCO (270 of FIG. 8) given in FIG. 17 provides a clock at 10.23 MHz for the CODE GENERATOR in its NORMAL mode of operation. It can also shift the CODE GENERATOR early or late under the MICROPROCESSOR control by shifting its output phase in its SHIFT mode. The CODE NCO output 271 controls the phase of the locally generated codes (P and C/A) and provides the code tracking loop feedback adjustment. The CODE NCO includes a 12-bit ADDER 662 and a 12-bit LATCH. On each sample clock edge the output of the LATCH 666 is added to the output of the MULTIPLEXER 660. In the NORMAL mode of operation the output of the MULTIPLEXER is a 12-bit number N unless Q12 is 1; if Q1 is equal to 1 the output is a 12-bit number M. Thus, in the NORMAL mode the CODE NCO outputs a frequency: CODE NCO out=(N× SCLK)/($2^{12}$–M+N).

EXAMPLE 3

Given the clock SCLK=25 MHz, in order to obtain the CODE NCO output frequency=P code rate=10.23 MHz it is sufficient to choose N=1023 and M=2619.

Under the SHIFT mode the shifting of the CODE NCO output frequency is accomplished by replacing the NORMAL mode MULTIPLEXER output (N or M) by SHIFT under the MICROPROCESSOR control. If this is the case, the code phase shift is given by: code phase shift=(M–SHIFT)/($2^{12}$–M+N), where the code shift is measured in units of sample clocks. The code shift allows to accommodate for the shift in the CODE GENERATOR frequency required for the locking of the code tracking loop.

The RESOLVER of FIG. 19 (see 242 of FIG. 8) has the function to improve the hardware resolution of the L1 to L2 hardware range measurement. The (L2 –L1 ) range is formed by aligning the L1 W code with the L2 W code via DIGITAL DELAY 1 and 2. The delay value is the offset range between L1 and L2. The digital delays being clocked at SCLK=25 MHz have the resolution of 12 meters= (speed_of_light/SCLK). In order to gain more precision, it is sufficient to toggle the digital delay between the two delays, wherein the resulting delay is the average of the relative time spent on each delay. The RESOLVER output 243 provides a signal with a controllable mark/space ratio to toggle between the two delays. The COUNTER 680 and the FLIP-FLOP 684 are reset to digital 0 on the MSEC signal 104. The COUNTER counts until it reaches a COMPARATOR's (682) input value which is given by the CONTROL signal 216 provided by the MICROPROCESSOR. At this point the FLIP-FLOP is clocked to digital 1. This process is repeated every millisecond. The resulting delay is given by:

digital delay=delay 1+(25000–m)/25000 in sample clock units;

where m is a mark/space ratio.

The operation of the MICROPROCESSOR system is illustrated in FIGS. 18a and 18b. FIG. 18a depicts the signal acquisition phase. At first, the L1 C/A code is locked in the code and carrier tracking loops (690). The 50 Baud data message modulated in the C/A code contains a bit flag which indicates whether Y code is ON or OFF. If Y code is OFF, the RECEIVER will attempt to lock to L1 and L2 P codes in the normal manner. If Y code is ON, the L1 TRACKER will maintain the lock on the L1 C/A code while the RECEIVER attempts to lock the L2 signal in W code enhanced cross-correlation mode. With the L1 C/A code locked, the MICROPROCESSOR computes the L2 frequency from the L1 frequency. The L1 frequency is obtained from the current value of the frequency word written to the CARRIER NCO 1. The L2 carrier frequency is computed from the L1 carrier frequency: L2 carrier freq.=L1 carrier freq.×120/154. The input to the CARRIER NCO 2 is computed as follows:

CARRIER NCO 2 input=[(CARRIER NCO 1input–$W_{L1\ n}$)×120/154]+$W_{L2\ n}$;

where

CARRIER NCO 2 input=input word to CARRIER NCO 2;

CARRIER NCO 1 input=input word to CARRIER NCO 1;

$W_{L1\ n}$=zero Doppler L1 frequency word;

$W_{L2\ n}$=zero Doppler L2 frequency word;

120/154=frequency ratio between L1 and L2 carriers.

This process is called aiding (692). With the frequency aiding term applied to the CARRIER NCO 2 the L2 carrier will be very close in frequency to the incoming L2 signal frequency (<1.0 Hz difference) to accommodate for the L2 signal low signal-to-noise (SNR) ratio. After the aiding process all dynamics from the L2 carrier is removed except the relatively slow ionospheric offset between L1 and L2.

The next step is the adjustment (694) of the DIGITAL DELAYS 1 and 2 to compensate for the ionospheric offset between the L1 and L2 until the L2 power is found in the CORRELATORS 2. The MICROPROCESSOR forms three values to look for power in the CORRELATORS 2:

power1=$EI^2+EQ^2$;

power2=$PI^2+PQ^2$;

power3=$LI^2+LQ^2$.

If any power1,2,or 3 surpass a preset threshold, the power is declared found.

After the power is found in the L2 CORRELATORS, the L2 carrier tracking loop (696) is closed using: L2 estimated carrier phase=arctan (PQ/PI); and the L2 code tracking loop (698) is closed using: L2 estimated code phase=EI–LI. Thus, the acquisition of the satellite signals L1 and L2 has been accomplished.

FIG. 18b depicts the signal tracking operation. At first, both sets of CORRELATORS L1 and L2 are read by the MICROPROCESSOR system (700). Secondly, the L1 code and carrier tracking loops are formed and the digital voltage feedback signals are applied to the CODE NCO and to the CARRIER NCO 1 (702). The next step is the computation of the L2 frequency aiding term (704). The following step is the formation of the L2 code and carrier tracking loops and the application of the digital feedback signals to the DIGITAL DELAYS 1 and 2 and to the CARRIER NCO 2 (706). The L1 and L2 carrier and code phase measurements are then performed. The carrier phase measurements (708) are performed on L1 and L2 by reading the CARRIER NCO 1 and 2 output phase at a chosen MSEC reference time. The L1 and L2 code measurements (710) are performed by keeping track in the MICROPROCESSOR of what shifts have been applied to the CODE NCO and to the DIGITAL DELAYs respectively.

A system and a method for optimum correlation processing of L1 and L2 satellite signals which includes an n-bit RECEIVER, n being integer, and at least one n-bit DIGITAL CHANNEL PROCESSOR is also within the scope of the present invention. The n-bit RECEIVER comprising an n-bit A/D CONVERTER and the n-bit DIGITAL CHANNEL PROCESSOR reduces quantization noise as compared to the one-bit RECEIVER comprising a one-bit A/D CONVERTER and a one-bit DIGITAL CHANNEL PROCESSOR because the n-bit digital approximation of the sine signals is more precise than the 1-bit approximation.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. A system for optimum correlation processing of L1 and L2 signals received from a SPS satellite by a SPS RECEIVER, said system comprising:

a RECEIVING MEANS for receiving a known C/A code modulated on L1 carrier frequency, for receiving an unknown Y code modulated on L1 carrier frequency signal, and for receiving an unknown Y code modulated on L2 carrier frequency signal from at least one satellite; wherein said received L1, and L2 signals contain propagation noise; and wherein said Y code comprises a known P code and an unknown W code; and at least one DIGITAL CHANNEL PROCESSING MEANS for:

(1) locally generating replica of said C/A code modulated on L1 carrier frequency signal;

(2) locally generating replica of said P code modulated on L1 carrier frequency signal, wherein said locally generated replica of L1 signal do not contain propagation noise;

(3) extracting of an estimate of said Y code from said L1 signal, and from said L2 signal, wherein said estimate signals contain propagation noise;

(4) correlating a locally generated replica of C/A code with the received L1 code for obtaining an estimate of L1 group delay (L1 pseudo-range) and L1 carrier phase;

(5) removing said P code from said locally extracted estimate of said L1 Y code to obtain a locally extracted estimate of said L1 W code;

(6) removing said P code from said locally extracted estimate of said L2 Y code to obtain a locally extracted estimate of said L2 W code; and (7) correlating said locally extracted estimate of said L1 W code with said locally extracted estimate of said L2 W code to obtain relative offset in group delay between L1 and L2 signals and for obtaining an independent estimate of L2 carrier phase; and wherein said RECEIVING MEANS further comprises:

a dual frequency patch ANTENNA MEANS for receiving said L1 and L2 satellite signals;

a FILTER/LNA MEANS conductively connected to said ANTENNA MEANS for performing filtering and low noise amplification of said L1 and L2 signals, wherein said FILTER/LNA determines the noise/signal ratio of the received signals L1 and L2;

a DOWNCONVERTER MEANS conductively connected to said FILTER/LNA MEANS for mixing and converting said L1 and L2 signals; and an IF PROCESSOR MEANS conductively connected to said DOWNCONVERTER MEANS for transforming, said converted L1 and L2 signals into digitally sampled quadrature versions of L1 and L2 signals (IL1, QL1, IL2, QL2);

a MASTER OSCILLATOR MEANS; and a FREQUENCY SYNTHESIZER MEANS conductively connected to said MASTER OSCILLATOR MEANS, to said IF PROCESSOR MEANS, to said DOWNCONVERTER MEANS, and to at least one said DIGITAL, CHANNEL PROCESSING MEANS, wherein said FREQUENCY SYNTHESIZER MEANS generates several timing signals; and wherein said IF PROCESSOR MEANS further comprises:

a first POWER SPLITTER MEANS connected to said DOWNCONVERTER MEANS and to said FREQUENCY SYNTHESIZER MEANS for power splitting said L1 signal into two signals;

a second POWER SPLITTER MEANS connected to said DOWNCONVERTER MEANS and to said FREQUENCY SYNTHESIZER MEANS for power splitting said L2 signal into two signals;

a first MULTIPLIER MEANS for multiplying said L1 signal with an inphase (I) version of said second LO2 signal to produce an IL1 signal;

a second MULTIPLIER MEANS for multiplying said L1 signal with a quadrature (Q) version of said second LO2 signal to produce a QL1 signal;

a third MULTIPLIER MEANS for multiplying said L2 signal with an inphase (I) version of said 2-nd LO2 signal to produce an IL2 signal a fourth MULTIPLIER MEANS for multiplying said L2 signal with a quadrature (Q) version of said 2-nd LO2 signal to produce a QL2 signal;

a first AMPLIFIER MEANS connected to said first MULTIPLIER MEANS for amplifying said IL1 signal;

a second AMPLIFIER MEANS connected to said second MULTIPLIER MEANS for amplifying said QL1 signal;

a third AMPLIFIER MEANS connected to said third MULTIPLIER MEANS for amplifying said IL2 signal;

a fourth AMPLIFIER MEANS connected to said fourth MULTIPLIER MEANS for amplifying said QL2 signal;

a first one-bit analog-to-digital (A/D) CONVERTER MEANS connected to said first AMPLIFIER MEANS for performing 1-bit quantization operation on said IL1 signal;

a second one-bit analog-to-digital (A/D) CONVERTER MEANS connected to said second AMPLIFIER MEANS for performing 1-bit quantization operation on said QL1 signal;

a third one-bit analog-to-digital (A/D) CONVERTER MEANS connected to said third AMPLIFIER MEANS for performing 1-bit quantization operation on said IL2 signal;

a fourth one-bit analog-to-digital (A/D) CONVERTER MEANS connected to said fourth AMPLIFIER MEANS for performing 1-bit quantization operation on said QL2 signal;

a first FLIP-FLOP MEANS (FF1) connected to said first one-bit A/D CONVERTER for sampling said IL1 signal, wherein said sampling operation is performed by clocking said IL1 signal through said FF1 at sampling clock (SCLK) rate;

a second FLIP-FLOP MEANS (FF2) connected to said second one-bit A/D CONVERTER for sampling said QL1 signal, wherein said sampling operation is performed by clocking said QL1 signal through said FF2 at sampling clock (SCLK) rate;

a third FLIP-FLOP MEANS (FF3) connected to said third one-bit A/D CONVERTER for sampling said IL2 signal, wherein said sampling operation is performed by clocking said IL2 signal through said FF3 at sampling clock SCLK) rate; and a fourth FLIP-FLOP MEANS (FF4) connected to said fourth one-bit A/D CONVERTER for sampling said QL2 signal, wherein said sampling operation is performed by clocking said QL2 signal through said FF4 at sampling clock (SCLK) rate; and wherein each said DIGITAL CHANNEL PROCESSING MEANS further comprises:

an L1 TRACKER MEANS for tracking L1 C/A code when Y code is ON and for tracking L1 P code when Y code is OFF;

an L2 TRACKER MEANS connected to said L1 TRACKER MEANS for tracking an enhanced cross correlated W code when Y code is ON and for tracking L2 P code when Y code is OFF; and a MICROPROCESSOR MEANS system connected to said L1 TRACKER MEANS and to said L2 TRACKER MEANS;

wherein said L1 TRACKER MEANS is fed by digitized inphase IL1 and quadrature QL1 of L1 signal outputted by said IF PROCESSOR MEANS; and wherein said L2 TRACKER MEANS is fed by digitized inphase I L2 and quadrature QL2 of L2 signal outputted by said IF PROCESSOR MEANS; and wherein each said L1 and L2 TRACKER MEANS are synchronously clocked by said SCLK signal and synchronously referenced by said MSEC signal to local reference time; said SCLK and MSEC signals being outputted by said FREQUENCY SYNTHESIZER MEANS; and wherein said L2 TRACKER MEANS when Y code is ON is fed from said L1 TRACKER MEANS by generated by said L1 TRACKER MEANS three signals: L1 P code, filtered estimate of L1 W code, and C/A code epoch (EP code); and wherein said MICROPROCESSOR MEANS system is fed by output signals from said L1 TRACKER MEANS and said L2 TRACKER MEANS; and wherein said L1 TRACKER MEANS and said L2 TRACKER MEANS are fed by control signal from said MICROPROCESSOR MEANS; and wherein said L1 TRACKER MEANS further comprises:

a CODE GENERATOR MEANS for providing a locally generated replica of C/A code and P code;

a MULTIPLEXER MEANS 1 connected to said CODE GENERATOR MEANS for selecting a locally generated code C/A when Y code is ON and for selecting a locally generated P code when Y code is OFF, said MULTIPLEXER MEANS 1 being controlled by said MICROPROCESSOR MEANS system;

a carrier numerically controlled oscillator (CARRIER NCO MEANS 1) connected to said MULTIPLEXER MEANS 1;

a CARRIER MIXER MEANS 1 connected to said CARRIER NCO MEANS 1 for multiplying outputted by said IF PROCESSOR MEANS digitized inphase IL1 and Q L1 signals having carrier frequency with outputted by said CARRIER NCO MEANS 1 inphase and quadrature components of digital carrier; wherein said CARRIER MIXER MEANS 1 outputs inphase IL1 and quadrature Q L1 signals having zero carrier frequency:

a CODE MIXER MEANS 1 connected to said CARRIER MIXER MEANS 1, connected to said CODE GENERATOR MEANS and connected to said CARRIER NCO MEANS 1 for code correlating said CARRIER MIXER MEANS 1 output signals with said locally generated replica of C/A code; wherein when said L1 TRACKER MEANS's carrier tracking loop is closed via said CARRIER NCO MEANS 1 the input to said CODE MIXER MEANS 1 represents the satellite signal L1 C/A code; and wherein said CODE MIXER MEANS 1 performs said code correlation at 3 time points (early, punctual and late) on the autocorrelation function graph creating an early, a punctual and a late sample of the autocorrelation function;

a block CORRELATORS MEANS 1 connected to said CODE MIXER MEANS 1 for integrating said early, punctual and late samples of said autocorrelation function; wherein said CORRELATORS MEANS 1 output signal is fed to said MICROPROCESSOR MEANS system at a rate of L1 C/A code epoch, and wherein said MICROPROCESSOR MEANS uses said CORRELATORS MEANS 1 output signal to develop feedback signals for the carrier tracking loop and for the code tracking loop;

a code numerically controlled oscillator (CODE NCO MEANS) connected to said block CORRELATORS MEANS 1 and connected to said CODE GENERATOR MEANS for providing a clocking signal at C/A code rate and for providing a clocking signal at P code rate, said C/A code clocking rate and said P code clocking rate driving said CODE GENERATOR MEANS; said CODE NCO MEANS also providing a mechanism for aligning said locally generated replica of C/A code with said incoming satellite C/A code;

a CODE MIXER MEANS 2 connected to said CARRIER MIXER MEANS 1 and connected to said CODE GENERATOR MEANS, said CARRIER MIXER MEANS 1 outputting an estimate of L1 Y code as an input to said CODE MIXER MEANS 2, said CODE GENERATOR MEANS outputting said local replica of known L1 P code as input to said CODE MIXER MEANS 2, wherein said CODE MIXER MEANS 2 removes known L1 P code from said estimate of L1 Y code and outputs an estimate of L1 W code;

a DIGITAL DELAY MEANS 1 connected to said CODE MIXER MEANS 2 for delaying under said MICROPROCESSOR MEANS system control said L1 W code estimate;

a DIGITAL FILTER MEANS 1 connected to said DIGITAL DELAY MEANS 1 for reducing the bandwidth of said L1 W code estimate; wherein said delayed and filtered L1 W code estimate is sent for processing to said L2 TRACKER MEANS;

a DIGITAL DELAY MEANS 2 connected to said CODE GENERATOR MEANS for delaying said P code output from said CODE GENERATOR MEANS, wherein said delayed P code is sent to said L2 TRACKER MEANS; and a RESOLVER MEANS connected to said CARRIER NCO MEANS 1 for toggling the digital delay between the two delays in the DIGITAL DELAY 1 and in the DIGITAL DELAY 2, wherein the resulting delay is the average of the relative time spent on each said delay; and wherein said L1 C/A code epoch (EP) is sent to said L2 TRACKER MEANS; and wherein said DIGITAL FILTER MEANS 1 further comprises a finite impulse response (FIR) DIGITAL FILTER 1; and wherein said FIR DIGITAL FILTER 1 performs the enhanced cross correlation operation by matching the observed W-code spectrum and by optimizing the signal-to-noise (STN) ratio of the cross-correlation process.

2. The system of claim 1, wherein said FIR DIGITAL FILTER 1 is implemented using a direct form transfer function.

3. The system of claim 1, wherein said FIR DIGITAL FILTER 1 is implemented using a cascade form transfer function.

4. The system of claim 1, wherein said FIR DIGITAL FILTER 1 is implemented using a parallel form transfer function.

5. A system for optimum correlation processing of L1 and L2 signals received from a SPS satellite by a SPS RECEIVER, said system comprising:

a RECEIVING MEANS for receiving a known C/A code modulated on L1 carrier frequency, for receiving an unknown Y code modulated on L1 carrier frequency signal, and for receiving an unknown Y code modulated on L2 carrier frequency signal from at least one satellite; wherein said received L1, and L2 signals contain propagation noise; and wherein said Y code comprises a known P code and an unknown W code; and at least one DIGITAL CHANNEL PROCESSING MEANS for;
  (1) locally generating replica of said C/A code modulated on L1 carrier frequency signal;
  (2) locally generating replica of said P code modulated on L1 carrier frequency signal, wherein said locally generated replica of L1 signal do not contain propagation noise;
  (3) extracting of an estimate of said Y code from said L1 signal, and from said L2 signal, wherein said estimate signals contain propagation noise;
  (4) correlating a locally generated replica of C/A code with the received L1 code for obtaining an estimate of L1 group delay (L1 pseudo-range) and L1 carrier phase;
  (5) removing said P code from said locally extracted estimate of said L1 Y code to obtain a locally extracted estimate of said L1 W code;
  (6) removing said P code from said locally extracted estimate of said L2 Y code to obtain a locally extracted estimate of said L2 W code; and
  (7) correlating said locally extracted estimate of said L1 W code with said locally extracted estimate of said L2 W code to obtain relative offset in group delay between L1 and L2 signals and for obtaining an independent estimate of L2 carrier phase; and wherein said RECEIVING MEANS further comprises:
  a dual frequency patch ANTENNA MEANS for receiving said L1 and L2 satellite signals;
  a FILTER/LNA MEANS conductively connected to said ANTENNA MEANS for performing filtering and low noise amplification of said L1 and L2 signals, wherein said FILTER/LNA determines the noise/signal ratio of the received signals L1 and L2;
  a DOWNCONVERTER MEANS conductively connected to said FILTER/LNA MEANS for mixing and converting said L1 and L2 signals; and
  an IF PROCESSOR MEANS conductively connected to said DOWNCONVERTER MEANS for transforming said converted L1 and L2 signals into digitally sampled quadrature versions of L1 and L2 signals (IL1, QL1, IL2, QL2);
  a MASTER OSCILLATOR MEANS; and
  a FREQUENCY SYNTHESIZER MEANS conductively connected to said MASTER OSCILLATOR MEANS, to said IF PROCESSOR MEANS, to said DOWNCONVERTER MEANS, and to at least one said DIGITAL, CHANNEL PROCESSING MEANS, wherein said FREQUENCY SYNTHESIZER MEANS generates several timing signals; and wherein said IF PROCESSOR MEANS further comprises:
  a first POWER SPLITTER MEANS connected to said DOWNCONVERTER MEANS and to said FREQUENCY SYNTHESIZER MEANS for power splitting said L1 signal into two signals;
  a second POWER SPLITTER MEANS connected to said DOWNCONVERTER MEANS and to said FREQUENCY SYNTHESIZER MEANS power splitting said L2 signal into two signals;
  a first MULTIPLIER MEANS for multiplying said L1 signal with an inphase (I) version of said 2-nd LO2 signal to produce an IL1 signal;
  a second MULTIPLIER MEANS for multiplying said L1 signal with a quadrature (Q) version of said 2-nd LO2 signal to produce a QL1 signal;
  a third MULTIPLIER MEANS for multiplying said L2 signal with an inphase (I) version of said 2-nd LO2 signal to produce an IL2 signal;
  a fourth MULTIPLIER MEANS for multiplying said L2 signal with a quadrature (Q) version of said 2-nd LO2 signal to produce a QL2 signal;
  a first AMPLIFIER MEANS connected to said first MULTIPLIER MEANS for amplifying said IL1 signal;
  a second AMPLIFIER MEANS connected to said second MULTIPLIER MEANS for amplifying said QL1 signal:
  a third AMPLIFLER MEANS connected to said third MULTIPLIER MEANS for amplifying said IL2 signal;
  a fourth AMPLIFIER MEANS connected to said fourth MULTIPLIER MEANS, for amplifying said QL2 signal;
  a first one-bit analog-to-digital (A/D) CONVERTER MEANS connected to said first AMPLIFIER MEANS for performing 1-bit quantization operation on said IL1 signal;
  a second one-bit analog-to-digital (A/D) CONVERTER MEANS connected to said second AMPLIFIER MEANS for performing 1-bit quantization operation on said QL1 signal;
  a third one-bit analog-to-digital (A/D) CONVERTER MEANS connected to said third AMPLIFIER MEANS for performing 1-bit quantization operation on said IL2 signal;
  a fourth one-bit analog-to-digital (A/D) CONVERTER MEANS connected to said fourth AMPLIFIER MEANS for performing 1-bit quantization operation on said QL2 signal;
  a first FLIP-FLOP MEANS (FF1) connected to said first one-bit A/D CONVERTER for sampling said IL1 signal, wherein said sampling operation is performed by clocking said IL1 signal through said FF1 at sampling clock (SCLK) rate;

a second FLIP-FLOP MEANS (FF2) connected to said second one-bit A/D CONVERTER for sampling said QL1 signal, wherein said sampling operation is performed by clocking said QL1 signal through said FF2 at sampling clock (SCLK) rate;

a third FLIP-FLOP MEANS (FF3) connected to said third one-bit A/D CONVERTER for sampling said IL2 signal, wherein said sampling operation is performed by clocking said IL2 signal through said FF3 at sampling clock (SCLK)rate; and a fourth FLIP-FLOP MEANS (FF4) connected to said fourth one-bit A/D CONVERTER for sampling said QL2 signal, wherein said sampling operation is performed by clocking said QL2 signal through said FF4 at sampling clock (SCLK) rate; and wherein each said DIGITAL CHANNEL PROCESSING MEANS further comprises:

an L1 TRACKER MEANS for tracking L1 C/A code when Y code is ON and for tracking L1 P code when Y code is OFF;

an L2 TRACKER MEANS connected to said L1 TRACKER MEANS for tracking an enhanced cross correlated W code when Y code is ON and for tracking L2 P code when Y code is OFF; and a MICROPROCESSOR MEANS system connected to said L1 TRACKER MEANS and to said L2 TRACKER MEANS;

wherein said L1 TRACKER MEANS is fed by digitized inphase IL1 and quadrature QL1 of L1 signal outputted by said IF PROCESSOR MEANS; and wherein said L2 TRACKER MEANS is fed by digitized inphase I L2 and quadrature QL2 of L2 signal outputted by said IF PROCESSOR MEANS; and wherein each said L1 and L2 TRACKER MEANS are synchronously clocked by said SCLK signal and synchronously referenced by said MSEC signal to local reference time; said SCLK and MSEC signals being outputted by said FREQUENCY SYNTHESIZER MEANS; and wherein said L2 TRACKER MEANS when Y code is ON is fed from said L1 TRACKER MEANS by generated by said L1 TRACKER MEANS three signals: L1 P code, filtered estimate of L1 W code, and C/A code epoch (EP code); and wherein said MICROPROCESSOR MEANS system is fed by output signals from said L1 TRACKER MEANS and said L2 TRACKER MEANS; and wherein said L1 TRACKER MEANS and said L2 TRACKER MEANS are fed by control signal from said MICROPROCESSOR MEANS; and wherein said L1 TRACKER MEANS further comprises:

a CODE GENERATOR MEANS for providing a locally generated replica of C/A code and P code;

a MULTIPLEXER MEANS 1 connected to said CODE GENERATOR MEANS for selecting a locally generated code C/A when Y code is ON and for selecting a locally generated P code when Y code is OFF, said MULTIPLEXER MEANS 1 being controlled by said MICROPROCESSOR MEANS system;

a carrier numerically controlled oscillator (CARRIER NCO MEANS 1) connected to said MULTIPLEXER MEANS 1;

a CARRIER MIXER MEANS 1 connected to said CARRIER NCO MEANS 1 for multiplying outputted by said IF PROCESSOR MEANS digitized inphase IL1 and Q L1 signals having carrier frequency with outputted by said CARRIER NCO MEANS 1 inphase and quadrature components of digital carrier; wherein said CARRIER MIXER MEANS 1 outputs inphase IL1 and quadrature Q L1 signals having zero carrier frequency;

a CODE MIXER MEANS 1 connected to said CARRIER MIXER MEANS 1, connected to said CODE GENERATOR MEANS and connected to said CARRIER NCO MEANS 1 for code correlating said CARRIER MIXER MEANS 1 output signals with said locally generated replica of C/A code; wherein when said L1 TRACKER MEANS 's carrier tracking loop is closed via said CARRIER NCO MEANS 1 the input to said CODE MIXER MEANS 1 represents the satellite signal L1 C/A code; and wherein said CODE MIXER MEANS 1 performs said code correlation at 3 time points (early, punctual and late) on the autocorrelation function graph creating an early, a punctual and a late sample of the autocorrelation function;

a block CORRELATORS MEANS 1 connected to said CODE MIXER MEANS 1 for integrating said early, punctual and late samples of said autocorrelation function; wherein said CORRELATORS MEANS 1 output signal is fed to said MICROPROCESSOR MEANS system at a rate of L1 C/A code epoch, and wherein said MICROPROCESSOR MEANS uses said CORRELATORS MEANS 1 output signal to develop feedback signals for the carrier tracking loop and for the code tracking loop;

a code numerically controlled oscillator (CODE NCO MEANS) connected to said block CORRELATORS MEANS 1 and connected to said CODE GENERATOR MEANS for providing a clocking signal at C/A code rate and for providing a clocking signal at P code rate, said C/A code clocking rate and said P code clocking rate driving said CODE GENERATOR MEANS; said CODE NCO MEANS also providing a mechanism for aligning said locally generated replica of C/A code with said incoming satellite C/A code;

a CODE MIXER MEANS 2 connected to said CARRIER MIXER MEANS 1 and connected to said CODE GENERATOR MEANS, said CARRIER MIXER MEANS 1 outputting an estimate of L1 Y code as an input to said CODE MIXER MEANS 2, said CODE GENERATOR MEANS outputting said local replica of known L1 P code as input to said CODE MIXER MEANS 2, wherein said CODE MIXER MEANS 2 removes known L1 P code from said estimate of L1 Y code and outputs an estimate of L1 W code;

a DIGITAL DELAY MEANS 1 connected to said CODE MIXER MEANS 2 for delaying under said MICROPROCESSOR MEANS system said control said L1 W code estimate;

a DIGITAL FILTER MEANS 1 connected to said DIGITAL DELAY MEANS 1 for reducing the bandwidth of said L1 W code estimate; wherein said delayed and filtered L1 W code estimate is sent for processing to said L2 TRACKER MEANS;

a DIGITAL DELAY MEANS 2 connected to said CODE GENERATOR MEANS for delaying said P code output from said CODE GENERATOR MEANS, wherein said delayed P code is sent to said L2 TRACKER MEANS; and a RESOLVER MEANS connected to said CARRIER NCO MEANS 1 for toggling the digital delay between the two delays in the DIGITAL DELAY 1 and in the DIGITAL DELAY 2, wherein the resulting delay is the average of the relative time spent on each said delay;

and wherein said L1 C/A code epoch (EP) is sent to said L2 TRACKER MEANS; and wherein said DIGITAL FILTER MEANS 1 further comprises an infinite impulse response (IIR) DIGITAL FILTER 1; and wherein said IIR DIGITAL FILTER 1 performs the enhanced cross correlation operation by matching the observed W-code spectrum and by optimizing the signal-to-noise (STN) ratio of the cross-correlation process.

6. The system of claim 5, wherein said IIR DIGITAL FILTER 1 is implemented using a direct form transfer function.

7. The system of claim 5, wherein said IIR DIGITAL FILTER 1 is implemented using a cascade form transfer function.

8. The system of claim 5, wherein said IIR DIGITAL FILTER 1 is implemented using a parallel form transfer function.

9. The system of claim 1, wherein said FIR DIGITAL FILTER 1 further comprises a first L-bit SHIFT REGISTER MEANS ($X1, X2, \ldots Xm$), m being an integer, for making an m- number of delayed copies of an input signal X, wherein said input signal X comprises said I estimate of L2 W code, wherein a first copy of said input signal X1 is delayed by one sample clock SCLK, a second copy of said input signal X2 is delayed by two sample clocks, an (i) copy of said input signal X1 is delayed by (i) sample clocks, i being an integer, and an m-copy of said input signal Xm is delayed by (m) sample clocks;

an m-number of MULTIPLIER MEANS ($C1, \ldots Cm$), wherein a first MULTIPLIER MEANS C1 transforms said X1 signal into a C1X1 signal; and wherein a second MULTIPLIER MEANS C2 transforms said X2 signal into a C2X2 signal, and wherein an (i) MULTIPLIER MEANS Ci transform said Xi signal into a CiXi signal, and wherein an (m) MULTIPLIER MEANS transforms said Xm signal into a CmXm signal;

and an ADDER MEANS connected to each of said Ci MULTIPLIER MEANS for adding each said CiXi signals into an output function Yout, wherein said output function Yout is equal to:

$$Yout = C1X1 + C2X2 + \ldots CmXm;$$

wherein said FIR DIGITAL FILTER MEANS 1 optimizes the signal-to-noise ratio by adapting to changes in the input signal X frequency spectrum.

10. The system of claim 5, wherein said IIR DIGITAL FILTER 1 further comprises a first L-bit SHIFT REGISTER MEANS ($X1, X2, \ldots Xm$), m being an integer, for making an m- number of delayed copies of an input signal X, wherein a first copy of said input signal X1 is delayed by one sample clock SCLK, a second copy of said input signal X2 is delayed by two sample clocks, an (i) copy of said input signal Xi is delayed by (i) sample clocks, i being an integer, and an m-copy of said input signal Xm is delayed by (m) sample clocks;

an M-number of MULTIPLIER MEANS ($C1, \ldots Cm$), wherein a first MULTIPLIER MEANS C1 transforms said X1 signal into a C1X1 signal; and wherein a second MULTIPLIER MEANS C2 transforms said X2 signal into a C2X2 signal, and wherein an (i) MULTIPLIER MEANS Ci transform said Xi signal into a CiXi signal, and wherein an (m) MULTIPLIER MEANS transforms said Xm signal into a CmXm signal;

a second L-bit SHIFT REGISTER MEANS ($Y1, Y2, \ldots Yn$), n being an integer, for making an n- number of delayed copies of an output signal Y, and wherein a first copy of said output signal Y1 is delayed by one sample clock SCLK, a second copy of said output signal Y2 is delayed by two sample clocks, an (i) copy of said output signal Yi is delayed by (i) sample clocks, i being an integer, and an n-copy of said output signal Yn is delayed by (n) sample clocks;

an n-number of MULTIPLIER MEANS ($B1, \ldots Bn$), wherein a first MULTIPLIER MEANS B1 transforms said Y1 signal into a B1Y1 signal; and wherein a second MULTIPLIER MEANS B2 transforms said Y2 signal into a B2Y2 signal, and wherein an (i) MULTIPLIER MEANS Bi transform said Yi signal into a BiYi signal, and wherein an (n) MULTIPLIER MEANS Bn transforms said Ym signal into a BnYn signal;

and an ADDER MEANS connected to each of said Ci and Bi MULTIPLIER MEANS for adding each said CiXi and BiYi signals into an output function Yout, wherein said output function Yout is equal to:

$$Yout = C1X1 + C2X2 + \ldots + CmXm + B1Y1 + B2Y2 + \ldots + BnYn;$$

and wherein said FIR DIGITAL FILTER MEANS 1 optimizes the signal-to-noise ratio by adapting to changes in the input signal X frequency spectrum.

11. A system for optimum correlation processing of L1 and L2 signals received from a SPS satellite by a SPS RECEIVER, said system comprising:

a RECEIVING MEANS for receiving a known C/A code modulated on L1 carrier frequency, for receiving an unknown Y code modulated on L1 carrier frequency signal, and for receiving an unknown Y code modulated on L2 carrier frequency signal from at least one satellite; wherein said received L1, and L2 signals contain propagation noise; and wherein said Y code comprises a known P code and an unknown W code; and at least one DIGITAL CHANNEL PROCESSING MEANS for:

(1) locally generating replica of said C/A code modulated on L1 carrier frequency signal;

(2) locally generating replica of said P code modulated on L1 carrier frequency signal, wherein said locally generated replica of L1 signal do not contain propagation noise;

(3) extracting of an estimate of said Y code from said L1 signal, and from said L2 signal, wherein said estimate signals contain propagation noise;

(4) correlating a locally generated replica of C/A code with the received L1 code for obtaining an estimate of L1 group delay (L1 pseudo-range) and L1 carrier phase;

(5) removing said P code from said locally extracted estimate of said L1 Y code to obtain a locally extracted estimate of said L1 W code;

(6) removing said P code from said locally extracted estimate of said L2 Y code to obtain a locally extracted estimate of said L2 W code; and (7) correlating said locally extracted estimate of said L1 W code with said locally extracted estimate of said L2 W code to obtain relative offset in group delay between L1 and L2 signals and for obtaining an independent estimate of L2 carrier phase; and wherein said RECEIVING MEANS further comprises:
  a dual frequency patch ANTENNA MEANS for receiving said L1 and L2 satellite signals;
  a FILTER/LNA MEANS conductively connected to said ANTENNA MEANS for performing filtering and low noise amplification of said L1 and L2 signals, wherein said FILTER/LNA determines the noise/signal ratio of the received signals L1 and L2;
  a DOWNCONVERTER MEANS conductively connected to said FILTER/LNA MEANS for mixing and converting said L1 and L2 signals; and
  an IF PROCESSOR MEANS conductively connected to said DOWNCONVERTER MEANS for transforming said converted L1 and L2 signals into digitally sampled quadrature versions of L1 and L2 signals (IL1, QL1, IL2, QL2);
  a MASTER OSCILLATOR MEANS; and
  a FREQUENCY SYNTHESIZER MEANS conductively connected to said MASTER OSCILLATOR MEANS, to said IF PROCESSOR MEANS, to said DOWNCONVERTER MEANS, and to at least one said DIGITAL, CHANNEL PROCESSING MEANS, wherein said FREQUENCY SYNTHESIZER MEANS generates several timing signals; and wherein said IF PROCESSOR MEANS further comprises:
  a first POWER SPLITTER MEANS connected to said DOWNCONVERTER MEANS and to said FREQUENCY SYNTHESIZER MEANS for power splitting said L1 signal into two signals;
  a second POWER SPLITTER MEANS connected to said DOWNCONVERTER MEANS and to said FREQUENCY SYNTHESIZER MEANS for power splitting said L2 signal into two signals;
  a first MULTIPLIER MEANS for multiplying said L1 signal with an inphase (I) version of said 2-nd LO2 signal to produce an IL1 signal;
  a second MULTIPLIER MEANS for multiplying said L1 signal with a quadrature (Q) version of said 2-nd LO2 signal to produce a QL1 signal;
  a third MULTIPLIER MEANS for multiplying said L2 signal with an inphase (I) version of said 2-nd LO2 signal to produce an IL2 signal;
  a fourth MULTIPLIER MEANS for multiplying said L2 signal with a quadrature (Q) version of said 2-nd LO2 signal to produce a QL2 signal;
  a first AMPLIFIER MEANS connected to said first MULTIPLIER MEANS for amplifying said IL1 signal;
  a second AMPLIFIER MEANS connected to said second MULTIPLIER MEANS for amplifying said QL1 signal;
  a third AMPLIFIER MEANS connected to said third MULTIPLIER MEANS for amplifying said IL2 signal;
  a fourth AMPLIFIER MEANS connected to said fourth MULTIPLIER MEANS for amplifying said QL2 signal;
  a first one-bit analog-to-digital (A/D) CONVERTER MEANS connected to said first AMPLIFIER MEANS for performing 1-bit quantization operation on said IL1 signal;
  a second one-bit analog-to-digital (A/D) CONVERTER MEANS connected to said second AMPLIFIER MEANS for performing 1-bit quantization operation on said QL1 signal;
  a third one-bit analog-to-digital (A/D) CONVERTER MEANS connected to said third AMPLIFIER MEANS for performing 1-bit quantization operation on said IL2 signal;
  a fourth one-bit analog-to-digital (A/D) CONVERTER MEANS connected to said fourth AMPLIFIER MEANS for performing 1-bit quantization operation on said QL2 signal;
  a FLIP-FLOP MEANS (FF1) connected to said first one-bit A/D CONVERTER for sampling said IL1 signal, wherein said sampling operation is performed by clocking said IL1 signal through said FF1 at sampling clock (SCLK) rate;
  a second FLIP-FLOP MEANS (FF2) connected to said second one-bit A/D CONVERTER for sampling said QL1 signal, wherein said sampling operation is performed by clocking said QL1 signal through said FF2 at sampling clock (SCLK) rate;
  a third FLIP-FLOP MEANS (FF3) connected to said third one-bit A/D CONVERTER for sampling said IL2 signal, wherein said sampling operation is performed by clocking said IL2 signal through said FF3 at sampling clock (SCLK) rate; and
  a fourth FLIP-FLOP MEANS (FF4) connected to said fourth one-bit A/D CONVERTER for sampling said QL2 signal, wherein said sampling operation is performed by clocking said QL2 signal through said FF4 at sampling clock (SCLK) rate; and wherein each said DIGITAL CHANNEL PROCESSING MEANS further comprises:
  a L1 TRACKER MEANS for tracking L1 C/A code when Y code is ON and for tracking L1 P code when Y code is OFF;
  an L2 TRACKER MEANS connected to said L1 TRACKER MEANS for tracking an enhanced cross correlated W code when Y code is ON and for tracking L2 P code when Y code is OFF; and
  a MICROPROCESSOR MEANS system connected to said L1 TRACKER MEANS and to said L2 TRACKER MEANS;
  wherein said L1 TRACKER MEANS is fed by digitized inphase IL1 and quadrature QL1 of L1 signal outputted by said IF PROCESSOR MEANS; and
  wherein said L2 TRACKER MEANS is fed by digitized inphase IL2 and quadrature QL2 of L2 signal outputted by said IF PROCESSOR MEANS; and
  wherein each said L1 and L2 TRACKER MEANS are synchronously clocked said SCLK signal and synchronously referenced by said MSEC signal to local reference time; said SCLK and MSEC signals being outputted by said FREQUENCY SYNTHESIZER MEANS; and
  wherein said L2 TRACKER MEANS when Y code is ON is fed from said L1 TRACKER MEANS by generated by said L1 TRACKER MEANS three signals: L1 P code, filtered estimate of L1 W code, and C/A code epoch (EP code); and
  wherein said MICROPROCESSOR MEANS system is fed by output signals from said L1 TRACKER MEANS and said L2 TRACKER MEANS; and
  wherein said L1 TRACKER MEANS and said L2 TRACKER MEANS are fed by control signal from said MICROPROCESSOR MEANS; and wherein said L1 TRACKER MEANS further comprises:
  a CODE GENERATOR MEANS for providing a locally generated replica of C/A code and P code;

a MULTIPLEXER MEANS 1 connected to said CODE GENERATOR MEANS for selecting a locally generated code C/A when Y code is ON and for selecting a locally generated P code when Y code is OFF, said MULTIPLEXER MEANS 1 being controlled by said MICROPROCESSOR MEANS system;

a carrier numerically controlled oscillator (CARRIER NCO MEANS 1) connected to said MULTIPLEXER MEANS 1;

a CARRIER MIXER MEANS 1 connected to said CARRIER NCO MEANS 1 for multiplying outputted by said IF PROCESSOR MEANS digitized inphase IL1 and Q L1 signals having carrier frequency with outputted by said CARRIER NCO MEANS 1 inphase and quadrature components of digital carrier; wherein said CARRIER MIXER MEANS 1 outputs inphase IL1 and quadrature Q L1 signals having zero carrier frequency;

a CODE MIXER MEANS 1 connected to said CARRIER MIXER MEANS 1, connected to said CODE GENERATOR MEANS and connected to said CARRIER NCO MEANS 1 for code correlating said CARRIER MIXER MEANS 1 output signals with said locally generated replica of C/A code; wherein when said L1 TRACKER MEANS 's carrier tracking loop is closed via said CARRIER NCO MEANS 1 the input to said CODE MIXER MEANS 1 represents the satellite signal L1 C/A code; and wherein said CODE MIXER MEANS 1 performs said code correlation at 3 time points (early, punctual and late) on the autocorrelation function graph creating an early, a punctual and a late sample of the autocorrelation function;

a block CORRELATORS MEANS 1 connected to said CODE MIXER MEANS 1 for integrating said early, punctual and late samples of said autocorrelation function; wherein said CORRELATORS MEANS 1 output signal is fed to said MICROPROCESSOR MEANS system at a rate of L1 C/A code epoch, and wherein said MICROPROCESSOR MEANS uses said CORRELATORS MEANS 1 output signal to develop feedback signals for the carrier tracking loop and for the code tracking loop;

a code numerically controlled oscillator (CODE NCO MEANS) connected to said block CORRELATORS MEANS 1 and connected to said CODE GENERATOR MEANS for providing a clocking signal at C/A code rate and for providing a clocking signal at P code rate, said C/A code clocking rate and said P code clocking rate driving said CODE GENERATOR MEANS; said CODE NCO MEANS also providing a mechanism for aligning said locally generated replica of C/A code with said incoming satellite C/A code;

a CODE MIXER MEANS 2 connected to said CARRIER MIXER MEANS 1 and connected to said CODE GENERATOR MEANS said CARRIER MIXER MEANS 1 outputting an estimate of L1 Y code as an input to said CODE MIXER MEANS 2, said CODE GENERATOR MEANS outputting said local replica of known L1 P code as input to said CODE MIXER MEANS 2, wherein said CODE MIXER MEANS 2 removes known L1 P code from said estimate of L1 Y code and outputs an estimate of L1 W code;

a DIGITAL DELAY MEANS 1 connected to said CODE MIXER MEANS 2 for delaying under said MICROPROCESSOR MEANS system control said L1 W code estimate;

a DIGITAL FILTER MEANS 1 connected to said DIGITAL DELAY MEANS 1 for reducing the bandwidth of said L1 W code estimate; wherein said delayed and filtered L1 W code estimate is sent for processing to said L2 TRACKER MEANS;

a DIGITAL DELAY MEANS 2 connected to said CODE GENERATOR MEANS for delaying said P code output from said CODE GENERATOR MEANS, wherein said delayed P code is sent to said L2 TRACKER MEANS; and a RESOLVER MEANS connected to said CARRIER NCO MEANS 1 for toggling the digital delay between the two delays in the DIGITAL DELAY 1 and in the DIGITAL DELAY 2, wherein the resulting delay is the average of the relative time spent on each said delay;

and wherein said L1 C/A code epoch (EP) is sent to said L2 TRACKER MEANS; and wherein said L2 TRACKER MEANS further comprises:

a carrier numerically controlled oscillator (CARRIER NCO MEANS 2);

a CARRIER MIXER MEANS 2 connected to said CARRIER NCO MEANS 2 for mixing outputted by said IF PROCESSOR MEANS digitized inphase I L2 and Q L2 signals having carrier frequency with outputted by said CARRIER NCO MEANS 2 inphase and quadrature components of digital carrier; wherein said CARRIER MIXER MEANS 2 outputs inphase I L2 and quadrature Q L2 signals having zero carrier frequency; and wherein when L2 carrier tracking loop is locked via said CARRIER NCO MEANS 2 said I L2 output contains an estimate of L2 Y code and said Q L2 output contains no signal power;

a CODE MIXER MEANS 3 connected to said CARRIER MIXER MEANS 2 for code correlating said CARRIER MIXER MEANS 2 output I and Q signals with outputted by said L1 TRACKER MEANS P1 code, wherein said P1 code represents a locally generated replica of L2 P code, and wherein said CODE MIXER MEANS 3 outputs an I estimate of L2 W code and a Q estimate of L2 W code;

a DIGITAL FILTER MEANS 2 connected to said CODE MIXER MEANS 3 for reducing the bandwidth of said I estimate of L2 W code;

a DIGITAL FILTER MEANS 3 connected to said CODE MIXER MEANS 3 for reducing the bandwidth of said Q estimate of L2 W code;

a CODE MIXER MEANS 4 connected to said DIGITAL FILTER MEANS 2 and connected to said DIGITAL FILTER MEANS 3 for correlating said estimate of L2 W code and said Q estimate of L2 W code with a signal W1, wherein said signal W1 is said estimate of L1 W code sent by said L1 TRACKER MEANS; and wherein said CODE MIXER MEANS 4 performs said code correlation at 3 time points (early, punctual and late) on the autocorrelation function graph creating an early, a punctual and a late sample of the autocorrelation function;

a CODE MIXER MEANS 5 connected to said CARRIER MIXER MEANS 2 for code correlating said CARRIER MIXER MEANS 2 output I and Q signals with outputted by said L1 TRACKER MEANS P1 code, wherein said P1 code represents a locally generated replica of L2 P code, and wherein said CODE MIXER MEANS 5 performs said code correlation at 3 time points (early, punctual and late) on the autocorrelation function graph creating an early, a punctual and a late sample of the autocorrelation function;

a MULTIPLEXER MEANS 2 connected to said CODE MIXER MEANS 5 and connected to said CODE MIXER MEANS 4 for selecting under the control of MICROPROCESSOR MEANS the mode of operation when Y code is ON and OFF; and wherein when Y code is OFF and satellite transmits the P code on L2 said MICROPROCESSOR MEANS selects the output of CODE MIXER MEANS 5; and wherein when Y code is ON said MICROPROCESSOR MEANS selects the output of CODE MIXER MEANS 4; and a block CORRELATORS MEANS 2 connected to said MULTIPLEXER MEANS 2 for integrating said early, punctual and late samples of said autocorrelation function; wherein said CORRELATORS MEANS 2 output signal is fed to said MICROPROCESSOR MEANS system at a rate of sent by said L1 TRACKER MEANS said L1 C/A code epoch (EP), and wherein said MICROPROCESSOR MEANS uses said CORRELATORS MEANS 2 output signal to develop feedback signals for the carrier tracking loop and for the code tracking loop; and wherein said DIGITAL FILTER MEANS 2 further comprises a finite impulse response (FIR) DIGITAL FILTER 2; and wherein said FIR DIGITAL FILTER 2 performs the enhanced cross correlation operation by matching the observed W-code spectrum and by optimizing the signal-to-noise (STN) ratio of the cross-correlation process.

12. The system of claim 11, wherein said FIR DIGITAL FILTER 2 is implemented using a direct form transfer function.

13. The system of claim 11, wherein said FIR DIGITAL FILTER 2 is implemented using a cascade form transfer function.

14. The system of claim 2, wherein said FIR DIGITAL FILTER 2 is implemented using a parallel form transfer function.

15. A system for optimum correlation processing of L1 and L2 signals received from a SPS satellite by a SPS RECEIVER, said system comprising:

a RECEIVING MEANS for receiving a known C/A code modulated on L1 carrier frequency, for receiving an unknown Y code modulated on L1 carrier frequency signal, and for receiving an unknown Y code modulated on L2 carrier frequency signal from at least one satellite; wherein said received L1, and L2 signals contain propagation noise; and wherein said Y code comprises a known P code and an unknown W code; and at least one DIGITAL CHANNEL PROCESSING MEANS for:
(1) locally generating replica of said C/A code modulated on L1 carrier frequency signal:
(2) locally generating replica of said P code modulated on L1 carrier frequency signal, wherein said locally generated replica of L1 signal do not contain propagation noise;
(3) extracting of an estimate of said Y code from said L1 signal, and from said L2 signal, wherein said estimate signals contain propagation noise;
(4) correlating a locally generated replica of C/A code with the received L1 code for obtaining an estimate of L1 group delay (L1 pseudo-range) and L1 carrier phase;
(5) removing said P code from said locally extracted estimate of said L1 Y code to obtain a locally extracted estimate of said L1 W code;
(6) removing said P code from said locally extracted estimate of said L2 Y code to obtain a locally extracted estimate of said L2 W code; and
(7) correlating said locally extracted estimate of said L1 W code with said locally extracted estimate of said L2 W code to obtain relative offset in group delay between L1 and L2 signals and for obtaining an independent estimate of L2 carrier phase; and where in said RECEIVING MEANS further comprises:
a dual frequency patch ANTENNA MEANS for receiving said L1 and L2 satellite signals;
a FILTER/LNA MEANS conductively connected to said ANTENNA MEANS for performing filtering and low noise amplification of said L1 and L2 signals, wherein said FILTER/LNA determines the noise/signal ratio of the received signals L1 and L2;
a DOWNCONVERTER MEANS conductively connected to said FILTER/LNA MEANS for mixing and converting said L1 and L2 signals; and
an IF PROCESSOR MEANS conductively connected to said DOWNCONVERTER MEANS for transforming said converted L1 and L2 signals into digitally sampled quadrature versions of L1 and L2 signals (IL1, QL1, IL2, QL2);
a MASTER OSCILLATOR MEANS; and
a FREQUENCY SYNTHESIZER MEANS conductively connected to said MASTER OSCILLATOR MEANS, to said IF PROCESSOR MEANS, to said DOWNCONVERTER MEANS, and to at least one said DIGITAL, CHANNEL, PROCESSING MEANS, wherein said FREQUENCY SYNTHESIZER MEANS generates several timing signals; and wherein said IF PROCESSOR MEANS further comprises:
a first POWER SPLITTER MEANS connected to said DOWNCONVERTER MEANS and to said FREQUENCY SYNTHESIZER MEANS for power splitting said L1 signal into two signals;
a second POWER SPLITTER MEANS connected to said DOWNCONVERTER MEANS and to said FREQUENCY SYNTHESIZER MEANS for power splitting said L2 signal into two signals;
a first MULTIPLIER MEANS for multiplying said L1 signal with an inphase (I) version of said 2-nd LO2 signal to produce an IL1 signal;
a second MULTIPLIER MEANS for multiplying said L1 signal with a quadrature (Q) version of said 2-nd LO2 signal to produce a QL1 signal;
a third MULTIPLIER MEANS for multiplying said L2 signal with an inphase (I) version of said 2-nd LO2 signal to produce an IL2 signal;
a fourth MULTIPLIER MEANS for multiplying said L2 signal with a quadrature (Q) version of said 2-nd LO2 signal to produce a QL2 signal:
a first AMPLIFIER MEANS connected to said first MULTIPLIER MEANS for amplifying said IL1 signal;
a second AMPLIFIER MEANS connected to said second MULTIPLIER MEANS for amplifying said QL1 signal;
a third AMPLIFIER MEANS connected to said third MULTIPLIER MEANS for amplifying said IL2 signal;
a fourth AMPLIFIER MEANS connected to said fourth MULTIPLIER MEANS for amplifying said QL2 signal;
a first one-bit analog-to-digital (A/D) CONVERTER MEANS connected to said first AMPLIFIER MEANS for performing 1-bit quantization operation on said IL1 signal;

a second one-bit analog-to-digital (A/D) CONVERTER MEANS connected to said second AMPLIFIER MEANS for performing 1-bit quantization operation on said QL1 signal;

a third one-bit analog-to-digital (A/D) CONVERTER MEANS connected to said third AMPLIFIER MEANS for performing 1-bit quantization operation on said IL2 signal;

a fourth one-bit analog-to-digital (A/D) CONVERTER MEANS connected to said fourth AMPLIFIER MEANS for performing 1-bit quantization operation on said QL2 signal;

a first FLIP-FLOP MEANS (FF1) connected to said first one-bit A/D CONVERTER for sampling said IL1 signal, wherein said sampling operation is performed by clocking said IL1 signal through said FF1 at sampling clock (SCLK) rate;

a second FLIP-FLOP MEANS (FF2) connected to said second one-bit A/D CONVERTER for sampling said QL1 signal, wherein said sampling operation is performed by clocking said QL1 signal through said FF2 at sampling clock (SCLK) rate;

a third FLIP-FLOP MEANS (FF3) connected to said third one-bit A/D CONVERTER for sampling said IL2 signal, wherein said sampling operation is performed by clocking said IL2 signal through said FF3 at sampling clock (SCLK) rate; and a fourth FLIP-FLOP MEANS (FF4) connected to said fourth one-bit A/D CONVERTER for sampling said QL2 signal, wherein said sampling operation is performed by clocking said QL2 signal through said FF4 at sampling clock (SCLK) rate; and wherein each said DIGITAL CHANNEL PROCESSING MEANS further comprises:

an L1 TRACKER MEANS for tracking L1 C/A code when Y code is ON and for tracking L1 P code when Y code is OFF;

an L2 TRACKER MEANS connected to said L1 TRACKER MEANS for tracking an enhanced cross correlated W code when Y code is ON and for tracking L2 P code when Y code is OFF; and a MICROPROCESSOR MEANS system connected to said L1 TRACKER MEANS and to said L2 TRACKER MEANS;

wherein said L1 TRACKER MEANS is fed by digitized inphase IL1 and quadrature QL1 of L1 signal outputted by said IF PROCESSOR MEANS; and wherein said L2 TRACKER MEANS is fed by digitized inphase I L2 and quadrature QL2 of L2 signal outputted by said IF PROCESSOR MEANS; and wherein each said L1 and L2 TRACKER MEANS are synchronously clocked by said SCLK signal and synchronously referenced by said MSEC signal to local reference time; said SCLK and MSEC signals being outputted by said FREQUENCY SYNTHESIZER MEANS; and wherein said L2 TRACKER MEANS when Y code is ON is fed from said L1 TRACKER MEANS by generated by said L1 TRACKER MEANS three signals: L1 P code, filtered estimate of L1 W code, and C/A code epoch (EP code); and wherein said MICROPROCESSOR MEANS system is fed by output signals from said L1 TRACKER MEANS and said L2 TRACKER MEANS; and wherein said L1 TRACKER MEANS and said L2 TRACKER MEANS are by control signal from said MICROPROCESSOR MEANS; and wherein said L1 TRACKER MEANS further comprises:

a CODE GENERATOR MEANS for providing a locally generated replica of C/A code and P code;

a MULTIPLEXER MEANS 1 connected to said CODE GENERATOR MEANS for selecting a locally generated code C/A when Y code is ON and for selecting a locally generated P code when Y code is OFF, said MULTIPLEXER MEANS 1 being controlled by said MICROPROCESSOR MEANS system:

a carrier numerically controlled oscillator (CARRIER NCO MEANS 1) connected to said MULTIPLEXER MEANS 1;

a CARRIER MIXER MEANS 1 connected to said CARRIER NCO MEANS 1 for multiplying outputted by said IF PROCESSOR MEANS digitized inphase IL1 and Q L1 signals having carrier frequency with outputted by said CARRIER NCO MEANS 1 inpha quadrature components of digital carrier; wherein said CARRIER MIXER MEANS 1 outpub inphase IL1 and quadrature Q L1 signals having zero carrier frequency;

a CODE MIXER MEANS 1 connected to said CARRIER MIXER MEANS 1, connected to said CODE GENERATOR MEANS and connected to said CARRIER NCO MEANS 1 for code correlating said CARRIER MIXER MEANS 1 output signals with said locally generated replica of C/A code wherein when said L1 TRACKER MEANS 's carrier tracking loop is closed via said CARRIER NCO MEANS 1 the input to said CODE MIXER MEANS 1 represents the satellite signal L1 C/A code; and wherein said CODE MIXER MEANS 1 performs said code correlation at 3 time points (early, punctual and late) on the autocorrelation function graph creating an early, a punctual and a late sample of the autocorrelation function;

a block CORRELATORS MEANS 1 connected to said CODE MIXER MEANS 1 for integrating said early, punctual and late samples of said autocorrelation function; wherein said CORRELATORS MEANS 1 output signal is fed to said MICROPROCESSOR MEANS system at a rate of L1 C/A code epoch, and wherein said MICROPROCESSOR MEANS uses said CORRELATORS MEANS 1 output signal to develop feedback signals for the carrier tracking loop and for the code tracking loop;

a code numerically controlled oscillator (CODE NCO MEANS) connected to said block CORRELATORS MEANS 1 and connected to said CODE GENERATOR MEANS for providing a clocking signal at C/A code rate and for providing a clocking signal at P code rate, said C/A code clocking rate and said P code clocking rate driving said CODE GENERATOR MEANS; said CODE NCO MEANS also providing a mechanism for aligning said locally generated replica of C/A code with said incoming satellite C/A code;

a CODE MIXER MEANS 2 connected to said CARRIER MIXER MEANS 1 and connected to said CODE GENERATOR MEANS, said CARRIER MIXER MEANS 1 outputting an estimate of L1 Y code as an input to said CODE MIXER MEANS 2, said CODE GENERATOR MEANS outputting said local replica of known L1 P code as input to said CODE MIXER MEANS 2, wherein said CODE MIXER MEANS 2 removes known L1 P code from said estimate of L1 Y code and outputs an estimate of L1 W code;

a DIGITAL DELAY MEANS 1 connected to said CODE MIXER MEANS 2 for delaying under said MICRO- PROCESSOR MEANS system control said L1 W code estimate;

a DIGITAL FILTER MEANS 1 connected to said DIGITAL DELAY MEANS 1 for reducing the bandwidth of said L1 W code estimate; wherein said delayed and filtered L1 W code estimate is sent for processing to said L2 TRACKER MEANS;

a DIGITAL DELAY MEANS 2 connected to said CODE GENERATOR MEANS for delaying said P code output from said CODE GENERATOR MEANS, wherein said delayed P code is sent to said L2 TRACKER MEANS; and a RESOLVER MEANS connected to said CARRIER NCO MEANS 1 for toggling the digital delay between the two delays in the DIGITAL DELAY 1 and in the DIGITAL DELAY 2, wherein the resulting delay is the average of the relative time spent on each said delay;

and wherein said L1 C/A code epoch (EP) is sent to said L2 TRACKER MEANS; and wherein said L2 TRACKER MEANS further comprises:

a carrier numerically controlled oscillator (CARRIER NCO MEANS 2);

a CARRIER MIXER MEANS 2 connected to said CARRIER NCO MEANS 2 for mixing outputted by said IF PROCESSOR MEANS digitized inphase I L2 and Q L2 signals having carrier frequency with outputted by said CARRIER NCO MEANS 2 inphase and quadrature components of digital carrier; wherein said CARRIER MIXER MEANS 2 outputs inphase I L2 and quadrature Q L2 signals having zero carrier frequency; and wherein when L2 carrier tracking loop is locked via said CARRIER NCO MEANS 2 said I L2 output contains an estimate of L2 Y code and said Q L2 output contains no signal power;

a CODE MIXER MEANS 3 connected to said CARRIER MIXER MEANS 2 for code correlating said CARRIER MIXER MEANS 2 output I and Q signals with outputted by said L1 TRACKER MEANS P1 code, wherein said P1 code represents a locally generated replica of L2 P code, and wherein said CODE MIXER MEANS 3 outputs an I estimate of L2 W code and a Q estimate of L2 W code;

a DIGITAL FILTER MEANS 2 connected to said CODE MIXER MEANS 3 for reducing the bandwidth of said I estimate of L2 W code;

a DIGITAL FILTER MEANS 3 connected to said CODE MIXER MEANS 3 for reducing the bandwidth of said Q estimate of L2 W code;

a CODE MIXER MEANS 4 connected to said DIGITAL FILTER MEANS 2 and connected to said DIGITAL FILTER MEANS 3 for correlating said I estimate of L2 W code and said Q estimate of L2 W code with a signal W1, wherein said signal W1 is said estimate of L1 W code sent by said L1 TRACKER MEANS; and wherein said CODE MIXER MEANS 4 performs said code correlation at 3 time points (early, punctual and late) on the autocorrelation function graph creating an early, a punctual and a late sample of the autocorrelation function;

a CODE MIXER MEANS 5 connected to said CARRIER MIXER MEANS 2 for code correlating said CARRIER MIXER MEANS 2 output I and Q signals with outputted by said L1 TRACKER MEANS P1 code, wherein said P1 code represents a locally generated replica of L2 P code; and wherein said CODE MIXER MEANS 5 performs said code correlation at 3 time points (early, punctual and late) on the autocorrelation function graph creating an early; a punctual and a late sample of the autocorrelation function;

a MULTIPLEXER MEANS 2 connected to said CODE MIXER MEANS 5 and connected to said CODE MIXER MEANS 4 for selecting, under the control of MICROPROCESSOR MEANS the mode of operation when Y code is ON and OFF; and wherein when Y code is OFF and satellite transmits the P code on L2 said MICROPROCESSOR MEANS selects the output of CODE MIXER MEANS 5; and wherein when Y code is ON said MICROPROCESSOR MEANS selects the output of CODE MIXER MEANS 4; and a block CORRELATORS MEANS 2 connected to said MULTIPLEXER MEANS 2 for integrating said early, punctual and late samples of said autocorrelation function; wherein said CORRELATORS MEANS 2 output signal is fed to said MICROPROCESSOR MEANS system at a rate of sent by said L1 TRACKER MEANS said L1 C/A code epoch (EP), and wherein said MICROPROCESSOR MEANS uses said CORRELATORS MEANS 2 output signal to develop feedback signals for the carrier tracking loop and for the code tracking loop; and wherein said DIGITAL FILTER MEANS 2 further comprises an infinite impulse response (IIR) DIGITAL FILTER 2; and wherein said IIR DIGITAL FILTER 2 performs the enhanced cross correlation operation by matching the observed W-code spectrum and by optimizing the signal-to-noise (STN) ratio of the cross-correlation process.

16. The system of claim 15, wherein said IIR DIGITAL FILTER 2 is implemented using a direct form transfer function.

17. The system of claim 15, wherein said IIR DIGITAL FILTER 2 is implemented using a cascade form transfer function.

18. The system of claim 15, wherein said IIR DIGITAL FILTER 2 is implemented using a parallel form transfer function.

19. The system of claim 11, wherein said FIR DIGITAL FILTER 2 further comprises a first L-bit SHIFT REGISTER MEANS (X1, X2, ... Xm), m being an integer, for making an m- number of delayed copies of an input signal X, wherein a first copy of said input signal X1 is delayed by one sample clock SCLK, a second copy of said input signal X2 is delayed by two sample clocks, an (i) copy of said input signal Xi is delayed by (i) sample clocks, i being an integer, and an m-copy of said input signal Xm is delayed by (m) sample clocks;

an m-number of MULTIPLIER MEANS (C1, ... Cm), wherein a first MULTIPLIER MEANS C1 transforms said X1 signal into a C1X1 signal; and wherein a second MULTIPLIER MEANS C2 transforms said X2 signal into a C2X2 signal, and wherein an (i) MULTIPLIER MEANS Ci transform said Xi signal into a CiXi signal, and wherein an (m) MULTIPLIER MEANS transforms said Xm signal into a CmXm signal;

and an ADDER MEANS connected to each of said Ci MULTIPLIER MEANS for adding each said CiXi signals into an output function Yout, wherein said output function Yout is equal to:

$$Yout = C1X1 + C2X2 + \ldots CmXm;$$

wherein said FIR DIGITAL FILTER MEANS 2 optimizes the signal-to-noise ratio by adapting to changes in the input signal X frequency spectrum.

20. The system of claim 15, wherein said IIR DIGITAL FILTER 2 further comprises

- a first L-bit SHIFT REGISTER MEANS (X1, X2, ... Xm), m being an integer, for making an m- number of delayed copies of an input signal X, wherein said input signal X comprises said I estimate of L2 W code, and wherein a first copy of said input signal X1 is delayed by one sample clock SCLK, a second copy of said input signal X2 is delayed by two sample clocks, an (i) copy of said input signal Xi is delayed by (i) sample clocks, i being an integer, and an m-copy of said input signal Xm is delayed by (m) sample clocks;
- an m-number of MULTIPLIER MEANS (C1, ... Cm), wherein a first MULTIPLIER MEANS C1 transforms said X1 signal into a C1X1 signal; and wherein a second MULTIPLIER MEANS C2 transforms said X2 signal into a C2X2 signal, and wherein an (i) MULTIPLIER MEANS Ci transform said Xi signal into a CiXi signal, and wherein an (M) MULTIPLIER MEANS transforms said Xm signal into a CmXm signal;
- a second L-bit SHIFT REGISTER MEANS (Y1, Y2, ... Yn), n being an integer, for making an n- number of delayed copies of an output signal Y, and wherein a first copy of said output signal Y1 is delayed by one sample clock SCLK, a second copy of said output signal Y2 is delayed by two sample clocks, an (i) copy of said output signal Yi is delayed by (i) sample clocks, i being an integer, and an n-copy of said output signal Yn is delayed by (n) sample clocks;
- an n-number of MULTIPLIER MEANS (B1, ... Bn), wherein a first MULTIPLIER MEANS B1 transforms said Y1 signal into a B1Y1 signal; and wherein a second MULTIPLIER MEANS B2 transforms said Y2 signal into a B2Y2 signal, and wherein an (i) MULTIPLIER MEANS Bi transform said Yi signal into a BiYi signal, and wherein an (n) MULTIPLIER MEANS Bn transforms said Yn signal into a BnYn signal;
- and an ADDER MEANS connected to each of said Ci and Bi MULTIPLIER MEANS for adding each said CiXi and BiYi signals into an output function Yout, wherein said output function Yout is equal to:

$$Yout = C1X1 + C2X2 + \ldots + CmXm + B1Y1 + B2Y2 + \ldots + BnYn;$$

and wherein said FIR DIGITAL FILTER MEANS 2 optimizes the signal-to-noise ratio by adapting to changes in the input signal X frequency spectrum.

\* \* \* \* \*